(12) United States Patent
Boquist et al.

(10) Patent No.: US 11,074,342 B1
(45) Date of Patent: Jul. 27, 2021

(54) SI DATA SCANNING PROCESS

(71) Applicant: STATE FARM MUTUAL AUTOMOBILE INSURANCE COMPANY, Bloomington, IL (US)

(72) Inventors: William Boquist, Bloomington, IL (US); Can Van Ha, Bloomington, IL (US); Steve Schierholz, Bloomington, IL (US); Richard James Bush, Wylie, TX (US); Andrew Baumann, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 225 days.

(21) Appl. No.: 15/675,867

(22) Filed: Aug. 14, 2017

Related U.S. Application Data

(60) Provisional application No. 62/375,778, filed on Aug. 16, 2016, provisional application No. 62/453,265, filed on Feb. 1, 2017.

(51) Int. Cl.
*G06F 21/55* (2013.01)
*G06F 21/62* (2013.01)

(52) U.S. Cl.
CPC ........ *G06F 21/554* (2013.01); *G06F 21/6218* (2013.01)

(58) Field of Classification Search
CPC .............. G06F 21/554; G06F 21/6218; G06F 17/30985; G06F 2207/025; H04L 29/06904

USPC .......................................................... 726/25
See application file for complete search history.

(56) References Cited

U.S. PATENT DOCUMENTS

| | | | | |
|---|---|---|---|---|
| 5,608,874 A | * | 3/1997 | Ogawa | H04N 1/00204 709/246 |
| 5,850,480 A | * | 12/1998 | Scanlon | G06K 9/723 382/229 |
| 6,279,828 B1 | * | 8/2001 | Fann | G06K 19/06028 235/462.01 |
| 6,301,575 B1 | * | 10/2001 | Chadha | G06F 16/2465 |
| 6,363,411 B1 | * | 3/2002 | Dugan | H04M 3/42136 379/201.01 |

(Continued)

*Primary Examiner* — Tae K Kim
*Assistant Examiner* — Peiliang Pan

(57) ABSTRACT

A computer-implemented method for scanning data including accessing a reference table including a grid of data cells arranged in columns and rows and containing reference data elements. Each of the rows may relate to one of a plurality of data subjects. The method may also include generating a list of reference subcombinations. The list of reference subcombinations may be generated by designating a primary column for uniquely identifying the data subjects and generating a plurality of first preliminary reference subcombinations. Each of the first preliminary reference subcombinations may include reference data elements gathered from the primary column and a second column of a single row of the reference table. The method may also include accessing a subject file having a plurality of data entries. Each of the data entries may include a plurality of logically-related and delimited subject data elements. The method may also include identifying and generating a match record for each instance in which one of the data entries contains all reference data elements of one of the reference subcombinations.

20 Claims, 24 Drawing Sheets

(56) References Cited

U.S. PATENT DOCUMENTS

| | | | | |
|---|---|---|---|---|
| 6,779,030 B1* | 8/2004 | Dugan | H04M 3/42136 | 379/221.08 |
| 7,076,438 B1* | 7/2006 | Tobelmann | G06F 19/3475 | 705/7.32 |
| 7,437,362 B1* | 10/2008 | Ben-Natan | G06F 21/6227 | |
| 7,603,344 B2* | 10/2009 | Bousquet | G06Q 50/18 | |
| 8,458,465 B1* | 6/2013 | Stern | G06F 21/32 | 713/166 |
| 8,468,595 B1* | 6/2013 | Huang | G06F 21/602 | 726/22 |
| 8,526,743 B1* | 9/2013 | Campbell | G06K 9/6202 | 382/181 |
| 9,405,799 B1* | 8/2016 | Kapoor | G06F 16/24564 | |
| 9,659,062 B1* | 5/2017 | Kapoor | G06F 16/24561 | |
| 9,898,610 B1* | 2/2018 | Hadsall | G06F 21/32 | |
| 10,158,639 B1* | 12/2018 | Goben | H04L 51/08 | |
| 10,454,950 B1* | 10/2019 | Aziz | H04L 63/1441 | |
| 2002/0095454 A1* | 7/2002 | Reed | G06Q 30/0601 | 709/201 |
| 2002/0178074 A1* | 11/2002 | Bloom | G06Q 10/08 | 705/26.81 |
| 2004/0133927 A1* | 7/2004 | Sternberg | G06K 9/00624 | 725/136 |
| 2004/0221311 A1* | 11/2004 | Dow | G06K 9/00718 | 725/52 |
| 2006/0080819 A1* | 4/2006 | McAllister | G06K 17/00 | 29/403.3 |
| 2006/0178954 A1* | 8/2006 | Thukral | G06Q 10/087 | 705/28 |
| 2006/0200480 A1* | 9/2006 | Harris | G06Q 30/06 | |
| 2006/0291537 A1* | 12/2006 | Fullerton | G01S 7/4052 | 375/145 |
| 2007/0061393 A1* | 3/2007 | Moore | G06F 19/325 | 709/201 |
| 2007/0198535 A1* | 8/2007 | Oliver | G06Q 10/10 | |
| 2008/0114801 A1* | 5/2008 | Singh | G06F 16/217 | |
| 2009/0216746 A1* | 8/2009 | Aubin | G06Q 10/00 | |
| 2009/0287628 A1* | 11/2009 | Indeck | H03M 13/00 | 706/47 |
| 2011/0040983 A1* | 2/2011 | Grzymala-Busse | G06F 21/6245 | 713/189 |
| 2011/0077048 A1* | 3/2011 | Busch | G06K 9/2054 | 455/556.1 |
| 2011/0166898 A1* | 7/2011 | Zarrow | G06Q 10/02 | 705/5 |
| 2012/0016901 A1* | 1/2012 | Agarwal | G06F 16/258 | 707/769 |
| 2013/0091120 A1* | 4/2013 | Ganjam | G06F 16/2458 | 707/714 |
| 2013/0124466 A1* | 5/2013 | Naidu | G06F 8/453 | 707/610 |
| 2013/0167192 A1* | 6/2013 | Hickman | G06F 21/60 | 726/1 |
| 2013/0179887 A1* | 7/2013 | Sato | G06F 9/46 | 718/100 |
| 2013/0275367 A1* | 10/2013 | Shuma | G06F 16/284 | 707/609 |
| 2015/0324606 A1* | 11/2015 | Grondin | H04L 63/205 | 726/1 |
| 2015/0326601 A1* | 11/2015 | Grondin | G06F 16/24578 | 726/25 |
| 2015/0331905 A1* | 11/2015 | Brand | H04L 67/1095 | 707/770 |
| 2017/0004487 A1* | 1/2017 | Hagen | G06Q 20/4016 | |
| 2017/0060973 A1* | 3/2017 | Liu | G06F 16/215 | |
| 2017/0225073 A1* | 8/2017 | Laulund | A63F 13/20 | |
| 2018/0040059 A1* | 2/2018 | Cruz | G06Q 30/0643 | |
| 2018/0204225 A1* | 7/2018 | Bennefeld | H04L 67/22 | |
| 2018/0350180 A1* | 12/2018 | Onischuk | G07C 13/00 | |
| 2019/0037354 A1* | 1/2019 | Johnson | H04W 4/023 | |
| 2019/0050445 A1* | 2/2019 | Griffith | G06F 16/213 | |
| 2019/0205244 A1* | 7/2019 | Smith | G06F 3/0613 | |

* cited by examiner

Table 6

| | | | |
|---|---|---|---|
| ~~11166,11166,101~~ | ~~99210,51680,110~~ | Burns,since,0 | New,cust,0 |
| ~~11166,11166,110~~ | ~~99210,202139821,2010~~ | Burns,sister,0 | New,SSN,0 |
| ~~11166,34470,210~~ | ~~99210,495672216,202~~ | claim,21398,0 | purch,51680,0 |
| 11166,621551680,0 | 99210,Burns,0 | claim,Jack,0 | purch,3yo,0 |
| 11166,621551680,201 | 99210,Burns,310 | claim,last,0 | purch,sedan,0 |
| 11166,621551680,2010 | 99210,family,0 | claim,White,0 | purch,white,0 |
| 11166,cust,0 | 99210,home,0 | cust,11166,0 | ~~Santo,11166,102~~ |
| 11166,new,0 | 99210,sister,0 | cust,51680,0 | ~~Santo,621551680,203~~ |
| ~~11166,Santo,310~~ | ~~202139821,21551,220~~ | cust,621551680,0 | sedan,51680,0 |
| 11166,SSN,0 | ~~202139821,51680,120~~ | cust,Burns,0 | sedan,3yo,0 |
| ~~21398,51680,101~~ | ~~202139821,99210,1020~~ | cust,Mike,0 | sedan,purch,0 |
| ~~21398,495672216,201~~ | ~~202139821,Burns,320~~ | cust,New,0 | sedan,white,0 |
| 21398,claim,0 | ~~495672216,21398,120~~ | cust,since,0 | since,51680,0 |
| 21398,Jack,0 | ~~495672216,51680,1020~~ | cust,SSN,0 | since,Burns,0 |
| 21398,last,0 | ~~495672216,99210,220~~ | family,99210,0 | since,cust,0 |
| 21398,White,0 | ~~495672216,White,320~~ | family,Burns,0 | since,Mike,0 |
| ~~21551,99210,102~~ | 621551680,11166,0 | family,home,0 | sister,99210,0 |
| ~~21551,202139821,202~~ | 621551680,11166,120 | family,sister,0 | sister,Burns,0 |
| ~~34470,11166,102~~ | 621551680,11166,1020 | home,99210,0 | siser,family,0 |
| ~~34470,621551680,202~~ | ~~621551680,34470,220~~ | home,Burns,0 | sister,home,0 |
| ~~51680,21398,110~~ | 621551680,cust,0 | home,family,0 | SSN,11166,0 |
| ~~51680,99210,101~~ | 621551680,New,0 | home,sister,0 | SSN,621551680,0 |
| ~~51680,99210,210~~ | ~~621551680,Santo,320~~ | Jack,21398,0 | SSN,cust,0 |
| ~~51680,202139821,201~~ | 621551680,SSN,0 | Jack,claim,0 | SSN,New,0 |
| ~~51680,495672216,2010~~ | 3yo,51680,0 | Jack,last,0 | White,21398,0 |
| 51680,3yo,0 | 3yo,purch,0 | Jack,White,0 | white,51680,0 |
| 51680,Burns,0 | 3yo,sedan,0 | last,21398,0 | White,51680,103 |
| 51680,cust,0 | 3yo,white,0 | last,claim,0 | ~~White,495672216,203~~ |
| 51680,Mike,0 | Burns,51680,0 | last,Jack,0 | white,3yo,0 |
| 51680,purch,0 | Burns,99210,0 | last,White,0 | White,claim,0 |
| 51680,sedan,0 | Burns,99210,103 | Mike,51680,0 | White,Jack,0 |
| 51680,since,0 | ~~Burns,202139821,203~~ | Mike,Burns,0 | White,last,0 |
| 51680,White,0 | Burns,cust,0 | Mike,cust,0 | white,purch,0 |
| 51680,White,310 | Burns,family,0 | Mike,since,0 | white,sedan,0 |
| ~~99210,21551,210~~ | Burns,home,0 | New,11166,0 | |
| ~~99210,51680,102~~ | Burns,Mike,0 | New,621551680,0 | |

FIG. 9

Table 7

| | | | |
|---|---|---|---|
| 11166,621551680,2010 | ~~621551680,New,0~~ | ~~family,Burns,0~~ | ~~sedan,3yo,0~~ |
| 11166,621551680,201 | ~~6216551680,SSN,0~~ | ~~family,home,0~~ | ~~sedan,purch,0~~ |
| 11166,621551680,0 | ~~3yo,51680,0~~ | ~~family,sister,0~~ | ~~sedan,white,0~~ |
| ~~11166,cust,0~~ | ~~3yo,purch,0~~ | ~~home,99210,0~~ | ~~since,51680,0~~ |
| ~~11166,New,0~~ | ~~3yo,sedan,0~~ | ~~home,Burns,0~~ | ~~since,Burns,0~~ |
| ~~11166,SSN,0~~ | ~~3yo,white,0~~ | ~~home,family,0~~ | ~~since,cust,0~~ |
| ~~21389,claim,0~~ | ~~Burns,51680,0~~ | ~~home,sister,0~~ | ~~since,Mike,0~~ |
| ~~21398,Jack,0~~ | Burns,99210,103 | ~~Jack,21398,0~~ | ~~sister,99210,0~~ |
| ~~21398,last,0~~ | Burns,99210,0 | ~~Jack,claim,0~~ | ~~sister,Burns,0~~ |
| ~~21398,White,0~~ | ~~Burns,cust,0~~ | ~~Jack,last,0~~ | ~~siser,family,0~~ |
| ~~51680,3yo,0~~ | ~~Burns,family,0~~ | ~~Jack,White,0~~ | ~~sister,home,0~~ |
| ~~51680,Burns,0~~ | ~~Burns,home,0~~ | ~~last,21398,0~~ | ~~SSN,11166,0~~ |
| ~~51680,cust,0~~ | ~~Burns,Mike,0~~ | ~~last,claim,0~~ | ~~SSN,621551680,0~~ |
| ~~51680,Mike,0~~ | ~~Burns,since,0~~ | ~~last,Jack,0~~ | ~~SSN,cust,0~~ |
| ~~51680,purch,0~~ | ~~Burns,sister,0~~ | ~~last,White,0~~ | ~~SSN,New,0~~ |
| ~~51680,sedan,0~~ | ~~claim,21398,0~~ | ~~Mike,51680,0~~ | ~~White,21398,0~~ |
| ~~51680,since,0~~ | ~~claim,Jack,0~~ | ~~Mike,Burns,0~~ | White,51680,103 |
| 51680,White,310 | ~~claim,last,0~~ | ~~Mike,cust,0~~ | white,51680,0 |
| 51680,White,0 | ~~claim,White,0~~ | ~~Mike,since,0~~ | ~~white,3yo,0~~ |
| 99210,Burns,310 | ~~cust,11166,0~~ | ~~New,11166,0~~ | ~~White,claim,0~~ |
| 99210,Burns,0 | ~~cust,51680,0~~ | ~~New,621551680,0~~ | ~~White,Jack,0~~ |
| ~~99210,family,0~~ | ~~cust,621551680,0~~ | ~~New,cust,0~~ | ~~White,last,0~~ |
| ~~99210,home,0~~ | ~~cust,Burns,0~~ | ~~New,SSN,0~~ | ~~white,purch,0~~ |
| ~~99210,sister,0~~ | ~~cust,Mike,0~~ | ~~purch,51680,0~~ | ~~white,purch,0~~ |
| 621551680,11166,1020 | ~~cust,New,0~~ | ~~purch,3yo,0~~ | ~~white,sedan,0~~ |
| 621551680,11166,120 | ~~cust,since,0~~ | ~~purch,sedan,0~~ | ~~white,sedan,0~~ |
| 621551680,11166,0 | ~~cust,SSN,0~~ | ~~purch,white,0~~ | ~~white,sedan,0~~ |
| ~~621551680,cust,0~~ | ~~family,99210,0~~ | ~~sedan,51680,0~~ | |

FIG. 10

Table 8

| | | | |
|---|---|---|---|
| 11166,621551680,2010 | 51680,White,310 | 621551680, 11166,1020 | Burns,99210, 103 |
| 11166,621551680,201 | 51680,white,0 | 621551680, 11166,120 | Burns,99210,0 |
| 11166,621551680,0 | 99210,Burns,310 | 621551680,11166,0 | White,51680, 103 |
| -- | 99210,Burns, 0 | -- | white,51680,0 |

FIG. 11

Table 9

| Customer Account Number (10) | Date of Birth (1) | Zip Code of Birthplace (2) | Mother's Maiden Name (3) | Social Security Number (20) |
|---|---|---|---|---|
| 99210 | 5/16/80 | 21551 | Burns | 202-13-9821 |
| 51680 | 2/13/98 | 99210 | White | 495-67-2216 |
| 11166 | 1/11/66 | 34470 | Santo | 621-55-1680 |

FIG. 12

Table 10

| | | |
|---|---|---|
| 99210,51680, 110 | 51680,21398, 110 | 11166,11166,110 |
| 99210,21551,210 | 51680,99210,210 | 11166,34470,210 |
| 99210,Burns,310 | 51680,White,310 | 11166,Santo,310 |
| 99210,202139821,2010 | 51680,495672216,2010 | 11166,621551680,2010 |
| 51680,99210,101 | 21398,51680,101 | 11166,11166,101 |
| 51680,202139821,201 | 21398,495672216,201 | 11166,621551680,201 |
| 21551,99210, 102 | 99210,51680, 102 | 34470,11166,102 |
| 21551,202139821,202 | 99210,495672216,202 | 34470,621551680,202 |
| Burns,99210, 103 | White,51680, 103 | Santo,11166,103 |
| Burns,202139821,203 | White,495672216,203 | Santo,621551680,203 |
| 202139821,99210,1020 | 495672216,51680,1020 | 621551680, 11166,1020 |
| 202139821,51680,120 | 495672216,21398,120 | 621551680, 11166,120 |
| 202139821,21551,220 | 495672216,99210,220 | 621551680,34470,220 |
| 202139821,Burns,320 | 495672216,White,320 | 621551680,Santo,320 |

FIG. 13

Table 11

| |
|---|
| Mike Burns – cust since 5/16/80 |
| Jack White, last claim 2/13/98 |
| Burns family (& sister, #99210) – home |
| 3y/o white sedan purch. 5/16/80 |
| New cust #11166 (SSN 621551680) |

FIG. 14

Table 12

| | | | | |
|---|---|---|---|---|
| Mike,Burns, 0 | Jack,White,0 | Burns,family,0 | 3yo,white,0 | New,cust,0 |
| Mike,cust,0 | Jack,last,0 | Burns,sister,0 | 3yo,sedan,0 | New,11166,0 |
| Mike,since,0 | Jack,claim,0 | Burns,99210,0 | 3yo,purch,0 | New,SSN,0 |
| Mike,51680,0 | Jack,21398,0 | Burns,home,0 | 3yo,51680,0 | New,621551680,0 |
| Burns,Mike,0 | White,Jack,0 | family,Burns,0 | white,3yo,0 | cust,New,0 |
| Burns,cust,0 | White,last,0 | family,sister,0 | white,sedan,0 | cust,11166,0 |
| Burns,since, 0 | White,claim,0 | family,99210,0 | white, purch,0 | cust,SSN,0 |
| Burns,51680,0 | White,21398,0 | family,home,0 | white,51680,0 | cust,621551680,0 |
| cust,Mike, 0 | last,Jack,0 | sister,Burns, 0 | sedan,3yo,0 | 11166,New,0 |
| cust,Burns, 0 | last,White,0 | sister,family,0 | sedan,white,0 | 11166,cust,0 |
| cust,since,0 | last,claim,0 | sister,99210,0 | sedan,purch,0 | 11166,SSN,0 |
| cust,51680,0 | last,21398,0 | sister,home,0 | sedan,51680,0 | 11166,621551680,0 |
| since,Mike,0 | claim,Jack,0 | 99210,Burns,0 | purch,3yo,0 | SSN,New,0 |
| since,Burns, 0 | claim,White,0 | 99210,family,0 | purch,white,0 | SSN,cust,0 |
| since,cust,0 | claim,last,0 | 99210,sister,0 | purch,sedan,0 | SSN,11166,0 |
| since,51680,0 | claim,21398,0 | 99210,home,0 | purch,51680,0 | SSN,621551680,0 |
| 51680,Mike,0 | 21398,Jack,0 | home,Burns,0 | 51680,3yo,0 | 621551680,New,0 |
| 51680,Burns,0 | 21398,White,0 | home,family,0 | 51680,white,0 | 621551680,cust,0 |
| 51680,cust,0 | 21398,last,0 | home,sister,0 | 51680,sedan,0 | 621551680, 11166,0 |
| 51680,since,0 | 21398,claim,0 | home,99210,0 | 51680,purch,0 | 621551680,SSN,0 |

FIG. 15

Table 13

| | | | |
|---|---|---|---|
| 99210,51680, 110 | Santo,11166,103 | sister,99210, 0 | cust,SSN,0 |
| 99210,21551,210 | Santo,621551680,203 | sister,home, 0 | cust,621551680,0 |
| 99210,Burns,310 | 621551680, 11166,1020 | 99210,Burns,0 | 11166,New,0 |
| 99210,202139821,2010 | 621551680, 11166,120 | 99210,family,0 | 11166,cust,0 |
| 51680,99210,101 | 621551680,34470,220 | 99210,sister,O | 11166,SSN,0 |
| 51680,202139821,201 | 621551680,Santo,320 | 99210,home,0 | 11166,621551680,0 |
| 21551,99210, 102 | Mike,Burns,0 | home,Burns, 0 | SSN,New,0 |
| 21551,202139821,202 | Mike,cust,0 | home,family,0 | SSN,cust,0 |
| Burns,99210, 103 | Mike,since,0 | home,sister,0 | SSN,11166,0 |
| Burns,202139821,203 | Mike,51680,0 | home,99210,0 | SSN,621551680,0 |
| 202139821,99210,1020 | Burns,Mike,0 | 3yo,white,0 | 621551680,New,0 |
| 202139821,51680,120 | Burns,cust,0 | 3yo,sedan,0 | 621551680,cust,0 |
| 202139821,21551,220 | Burns,since,0 | 3yo,purch,0 | 621551680, 11166,0 |
| 202139821,Burns,320 | Burns,51680,0 | 3yo,51680,0 | 621551680,SSN,0 |
| 51680,21398, 110 | cust,Mike, 0 | white,3yo,0 | Jack,White,0 |
| 51680,99210,210 | cust,Burns,0 | white,sedan,0 | Jack,last,0 |
| 51680,White,310 | cust,since,0 | white, purch,0 | Jack,claim,0 |
| 51680,495672216,2010 | cust,51680,0 | white,51680,0 | Jack,21398,0 |
| 21398,51680,101 | since,Mike, 0 | sedan,3yo,0 | White,Jack,0 |
| 21398,495672216,201 | since,Burns, 0 | sedan,white,0 | White,last,0 |
| 99210,51680, 102 | since,cust,0 | sedan,purch,0 | White,claim,0 |
| 99210,495672216,202 | since,51680,0 | sedan,51680,0 | White,21398,0 |
| White,51680, 103 | 51680,Mike,0 | purch,3yo,0 | last,Jack,0 |
| White,495672216,203 | 51680,Burns,0 | purch,white,0 | last,White,0 |
| 495672216,51680,1020 | 51680,cust,0 | purch,sedan,0 | last,claim,0 |
| 495672216,21398,120 | 51680,since,0 | purch,51680,0 | last,21398,0 |
| 495672216,99210,220 | Burns,family,0 | 51680,3yo,0 | claim,Jack,0 |
| 495672216,White,320 | Burns,sister, 0 | 51680,white,0 | claim,White,0 |
| 11166,11166,110 | Burns,99210,0 | 51680,sedan,0 | claim,last, 0 |
| 11166,34470,210 | Burns,home, 0 | 51680,purch,0 | claim,21398,0 |
| 11166,Santo,310 | family,Burns,0 | New,cust,0 | 21398,Jack,0 |
| 11166,621551680,2010 | family,sister,0 | New,11166,0 | 21398,White,0 |
| 11166,11166,101 | family,99210,0 | New,SSN,0 | 21398,last,0 |
| 11166,621551680,201 | family,home,0 | New,621551680,0 | 21398,claim,0 |
| 34470,11166,102 | sister,Burns,0 | cust,New,0 | |
| 34470,621551680,202 | sister,family,0 | cust,11166,0 | |

FIG. 16

Table 14

| | | | |
|---|---|---|---|
| ~~11166,11166,101~~ | ~~99210,51680,110~~ | Burns,since,0 | New,cust,0 |
| ~~11166,11166,110~~ | ~~99210,202139821,2010~~ | Burns,sister,0 | New,SSN,0 |
| ~~11166,34470,210~~ | ~~99210,495672216,202~~ | claim,21398,0 | purch,51680,0 |
| 11166,621551680,0 | 99210,Burns,0 | claim,Jack,0 | purch,3yo,0 |
| 11166,621551680,201 | 99210,Burns,310 | claim,last,0 | purch,sedan,0 |
| 11166,621551680,2010 | 99210,family,0 | claim,White,0 | purch,white,0 |
| 11166,cust,0 | 99210,home,0 | cust,11166,0 | ~~Santo,11166,103~~ |
| 11166,New,0 | 99210,sister,0 | cust,51680,0 | ~~Santo,621551680,203~~ |
| ~~11166,Santo,310~~ | ~~202139821,21551,220~~ | cust,621551680,0 | sedan,51680,0 |
| 11166,SSN,0 | ~~202139821,51680,120~~ | cust,Burns,0 | sedan,3yo,0 |
| ~~21398,51680,101~~ | ~~202136821,99210,1020~~ | cust,Mike,0 | sedan,purch,0 |
| ~~21398,495672216,201~~ | ~~202139821,Burns,320~~ | cust,New,0 | sedan,white,0 |
| 21398,claim,0 | ~~495672216,21398,120~~ | cust,since,0 | since,51680,0 |
| 21398,Jack,0 | ~~495672216,99210,1020~~ | cust,SSN,0 | since,Burns,0 |
| 21398,last,0 | ~~495672216,99210,220~~ | family,99210,0 | since,cust,0 |
| 21398,White,0 | ~~495672216,White,320~~ | family,Burns,0 | since,Mike,0 |
| ~~21551,99210,102~~ | 621551680,11166,0 | family,home,0 | sister,99210,0 |
| ~~21551,202139821,202~~ | 621551680,11166,120 | family,sister,0 | sister,Burns,0 |
| ~~34470,11166,102~~ | 621551680,11166,1020 | home,99210,0 | sister,family,0 |
| ~~34470,621551680,202~~ | ~~621551680,34470,220~~ | home,Burns,0 | sister,home,0 |
| ~~51680,21398,110~~ | 621551680,cust,0 | home,family,0 | SSN,11166,0 |
| ~~51680,99210,101~~ | 621551680,New,0 | home,sister,0 | SSN,621551680,0 |
| ~~51680,99210,210~~ | ~~621551680,Santo,320~~ | Jack,21398,0 | SSN,cust,0 |
| ~~51680,202139821,201~~ | 621551680,SSN,0 | Jack,claim,0 | SSN,New,0 |
| ~~51680,495672216,2010~~ | 3yo,51680,0 | Jack,last,0 | White,21398,0 |
| 51680,3yo,0 | 3yo,purch,0 | Jack,White,0 | white,51680,0 |
| 51680,Burns,0 | 3yo,sedan,0 | last,21398,0 | White,51680,103 |
| 51680,cust,0 | 3yo,white,0 | last,claim,0 | ~~White,495672216,203~~ |
| 51680,Mike,0 | Burns,51680,0 | last,Jack,0 | white,3yo,0 |
| 51680,purch,0 | Burns,99210,0 | last,White,0 | White,claim,0 |
| 51680,sedan,0 | Burns,99210,103 | Mike,51680,0 | White,Jack,0 |
| 51680,since,0 | ~~Burns,202139821,203~~ | Mike,Burns,0 | White,last,0 |
| 51680,white,0 | Burns,cust,0 | Mike,cust,0 | white,purch,0 |
| 51680,White,310 | Burns,family,0 | Mike,since,0 | white,sedan,0 |
| ~~99210,21551,210~~ | Burns,home,0 | New,11166,0 | |
| ~~99210,51680,102~~ | Burns,Mike,0 | New,621551680,0 | |

FIG. 17

Table 15

| | | | |
|---|---|---|---|
| 11166,621551680,2010 | ~~621551680,New,0~~ | ~~family,Burns,0~~ | ~~sedan,3yo,0~~ |
| 11166,621551680,201 | ~~621551680,SSN,0~~ | ~~family,home,0~~ | ~~sedan,purch,0~~ |
| 11166,621551680,0 | ~~3yo,51680,0~~ | ~~family,sister,0~~ | ~~sedan,white,0~~ |
| ~~11166,cust,0~~ | ~~3yo,purch,0~~ | ~~home,99210,0~~ | ~~since,51680,0~~ |
| ~~11166,New,0~~ | ~~3yo,sedan,0~~ | ~~home,Burns,0~~ | ~~since,Burns,0~~ |
| ~~11166,SSN,0~~ | ~~3yo,white,0~~ | ~~home,family,0~~ | ~~since,cust,0~~ |
| ~~21398,claim,0~~ | ~~Burns,51680,0~~ | ~~home,sister,0~~ | ~~since,Mike,0~~ |
| ~~21398,Jack,0~~ | Burns,99210,103 | ~~Jack,21398,0~~ | ~~sister,99210,0~~ |
| ~~21398,last,0~~ | Burns,99210,0 | ~~Jack,claim,0~~ | ~~sister,Burns,0~~ |
| ~~21398,White,0~~ | ~~Burns,cust,0~~ | ~~Jack,last,0~~ | ~~sister,family,0~~ |
| ~~51680,3yo,0~~ | ~~Burns,family,0~~ | ~~Jack,White,0~~ | ~~sister,home,0~~ |
| ~~51680,Burns,0~~ | ~~Burns,home,0~~ | ~~last,21398,0~~ | ~~SSN,11166,0~~ |
| ~~51680,cust,0~~ | ~~Burns,Mike,0~~ | ~~last,claim,0~~ | ~~SSN,621551680,0~~ |
| ~~51680,Mike,0~~ | ~~Burns,since,0~~ | ~~last,Jack,0~~ | ~~SSN,cust,0~~ |
| ~~51680,purch,0~~ | ~~Burns,sister,0~~ | ~~last,White,0~~ | ~~SSN,New,0~~ |
| ~~51680,sedan,0~~ | ~~claim,21398,0~~ | ~~Mike,51680,0~~ | ~~White,21398,0~~ |
| ~~51680,since,0~~ | ~~claim,Jack,0~~ | ~~Mike,Burns,0~~ | White,51680,103 |
| 51680,White,310 | ~~claim,last,0~~ | ~~Mike,cust,0~~ | white,51680,0 |
| 51680,white,0 | ~~claim,White,0~~ | ~~Mike,since,0~~ | ~~white,3yo,0~~ |
| 99210,Burns,310 | ~~cust,11166,0~~ | ~~New,11166,0~~ | ~~White,claim,0~~ |
| 99210,Burns,0 | ~~cust,51680,0~~ | ~~New,621551680,0~~ | ~~White,Jack,0~~ |
| ~~99210,family,0~~ | ~~cust,621551680,0~~ | ~~New,cust,0~~ | ~~White,last,0~~ |
| ~~99210,home,0~~ | ~~cust,Burns,0~~ | ~~New,SSN,0~~ | ~~white,purch,0~~ |
| ~~99210,sister,0~~ | ~~cust,Mike,0~~ | ~~purch,51680,0~~ | ~~white,purch,0~~ |
| 621551680,11166,1020 | ~~cust,New,0~~ | ~~purch,3yo,0~~ | ~~white,sedan,0~~ |
| 621551680,11166,120 | ~~cust,since,0~~ | ~~purch,sedan,0~~ | ~~white,sedan,0~~ |
| 621551680,11166,0 | ~~cust,SSN,0~~ | ~~purch,white,0~~ | ~~white,sedan,0~~ |
| ~~621551680,cust,0~~ | ~~family,99210,0~~ | ~~sedan,51680,0~~ | |

FIG. 18

Table 16

| 11166,621551680,2010 | 51680,White,310 | 621551680, 11166,1020 | Burns,99210, 103 |
|---|---|---|---|
| 11166,621551680,201 | 51680,white,0 | 621551680, 11166,120 | Burns,99210,0 |
| 11166,621551680,0 | 99210,Burns,310 | 621551680,11166,0 | White,51680, 103 |
| -- | 99210,Burns, 0 | -- | white,51680,0 |

FIG. 19

Table 17

| Customer Account Number (10) | Date of Birth (1) | Zip Code of Birthplace (2) | Mother's Maiden Name (3) | Social Security Number (20) |
|---|---|---|---|---|
| 99210 | 5/16/80 | 21551 | Burns | 202-13-9821 |
| 51680 | 2/13/98 | 99210 | White | 495-67-2216 |
| 11166 | 1/11/66 | 34470 | Santo | 621-55-1680 |

FIG. 20

Table 18

| 99210,51680, 110 | 51680,21398, 110 | 11166,11166,110 |
|---|---|---|
| 99210,21551,210 | 51680,99210,210 | 11166,34470,210 |
| 99210,Burns,310 | 51680,White,310 | 11166,Santo,310 |
| 99210,202139821,2010 | 51680,495672216,2010 | 11166,621551680,2010 |
| 51680,99210,101 | 21398,51680,101 | 11166,11166,101 |
| 51680,202139821,201 | 21398,495672216,201 | 11166,621551680,201 |
| 21551,99210, 102 | 99210,51680, 102 | 34470,11166,102 |
| 21551,202139821,202 | 99210,495672216,202 | 34470,621551680,202 |
| Burns,99210, 103 | White,51680, 103 | Santo,11166,103 |
| Burns,20213 9821,203 | White,495672216,203 | Santo,621551680,203 |
| 202139821,99210,1020 | 495672216,51680,1020 | 621551680, 11166,1020 |
| 202139821,51680,120 | 495672216,21398,120 | 621551680, 11166,120 |
| 202139821,21551,220 | 495672216,99210,220 | 621551680,34470,220 |
| 202139821,Burns,320 | 495672216,White,320 | 621551680,Santo,320 |

FIG. 21

Table 19

| |
|---|
| Mike Burns – cust since 5/16/80 |
| Jack White, last claim 2/13/98 |
| Burns family (& sister, #99210) – home |
| 3y/o white sedan purch. 5/16/80 |
| New cust #11166 (SSN 621551680) |

FIG. 22

Table 20

| | | | | |
|---|---|---|---|---|
| Mike,Burns, 0 | Jack,White,0 | Burns,family,0 | 3yo,white,0 | New,cust,0 |
| Mike,cust,0 | Jack,last,0 | Burns,sister,0 | 3yo,sedan,0 | New,11166,0 |
| Mike,since,0 | Jack,claim,0 | Burns,99210,0 | 3yo,purch,0 | New,SSN,0 |
| Mike,51680,0 | Jack,21398,0 | Burns,home,0 | 3yo,51680,0 | New,621551680,0 |
| Burns,Mike,0 | White,Jack,0 | family,Burns,0 | white,3yo,0 | cust,New,0 |
| Burns,cust,0 | White,last,0 | family,sister,0 | white,sedan,0 | cust,11166,0 |
| Burns,since, 0 | White,claim,0 | family,99210,0 | white, purch,0 | cust,SSN,0 |
| Burns,51680,0 | White,21398,0 | family,home,0 | white,51680,0 | cust,621551680,0 |
| cust,Mike, 0 | last,Jack,0 | sister,Burns, 0 | sedan,3yo,0 | 11166,New,0 |
| cust,Burns, 0 | last,White,0 | sister,family,0 | sedan,white,0 | 11166,cust,0 |
| cust,since,0 | last,claim,0 | sister,99210,0 | sedan,purch,0 | 11166,SSN,0 |
| cust,51680,0 | last,21398,0 | sister,home,0 | sedan,51680,0 | 11166,621551680,0 |
| since,Mike,0 | claim,Jack,0 | 99210,Burns,0 | purch,3yo,0 | SSN,New,0 |
| since,Burns, 0 | claim,White,0 | 99210,family,0 | purch,white,0 | SSN,cust,0 |
| since,cust,0 | claim,last,0 | 99210,sister,0 | purch,sedan,0 | SSN,11166,0 |
| since,51680,0 | claim,21398,0 | 99210,home,0 | purch,51680,0 | SSN,621551680,0 |
| 51680,Mike,0 | 21398,Jack,0 | home,Burns,0 | 51680,3yo,0 | 621551680,New,0 |
| 51680,Burns,0 | 21398,White,0 | home,family,0 | 51680,white,0 | 621551680,cust,0 |
| 51680,cust,0 | 21398,last,0 | home,sister,0 | 51680,sedan,0 | 621551680,11166,0 |
| 51680,since,0 | 21398,claim,0 | home,99210,0 | 51680,purch,0 | 621551680,SSN,0 |

FIG. 23

Table 21

| | | | |
|---|---|---|---|
| 99210,51680,110 | Santo,11166,103 | sister,99210, 0 | cust,SSN,0 |
| 99210,21551,210 | Santo,621551680,203 | sister,home, 0 | cust,621551680,0 |
| 99210,Burns,310 | 621551680,11166,1020 | 99210,Burns,0 | 11166,New,0 |
| 99210,202139821,2010 | 621551680,11166,120 | 99210,family,0 | 11166,cust,0 |
| 51680,99210,101 | 621551680,34470,220 | 99210,sister,0 | 11166,SSN,0 |
| 51680,202139821,201 | 621551680,Santo,320 | 99210,home,0 | 11166,621551680,0 |
| 21551,99210, 102 | Mike,Burns,0 | home,Burns, 0 | SSN,New,0 |
| 21551,202139821,202 | Mike,cust,0 | home,family,0 | SSN,cust,0 |
| Burns,99210,103 | Mike,since,0 | home,sister,0 | SSN,11166,0 |
| Burns,202139821,203 | Mike,51680,0 | home,99210,0 | SSN,621551680,0 |
| 202139821,99210,1020 | Burns,Mike,0 | 3yo,white,0 | 621551680,New,0 |
| 202139821,51680,120 | Burns,cust,0 | 3yo,sedan,0 | 621551680,cust,0 |
| 202139821,21551,220 | Burns,since,0 | 3yo,purch,0 | 621551680, 11166,0 |
| 202139821,Burns,320 | Burns,51680,0 | 3yo,51680,0 | 621551680,SSN,0 |
| 51680,21398,110 | cust,Mike, 0 | white,3yo,0 | Jack,White,0 |
| 51680,99210,210 | cust,Burns,0 | white,sedan,0 | Jack,last,0 |
| 51680,White,310 | cust,since,0 | white, purch,0 | Jack,claim,0 |
| 51680,495672216,2010 | cust,51680,0 | white,51680,0 | Jack,21398,0 |
| 21398,51680,101 | since,Mike, 0 | sedan,3yo,0 | White,Jack,0 |
| 21398,495672216,201 | since,Burns, 0 | sedan,white,0 | White,last,0 |
| 99210,51680,102 | since,cust,0 | sedan,purch,0 | White,claim,0 |
| 99210,495672216,202 | since,51680,0 | sedan,51680,0 | White,21398,0 |
| White,51680,103 | 51680,Mike,0 | purch,3yo,0 | last,Jack,0 |
| White,495672216,203 | 51680,Burns,0 | purch,white,0 | last,White,0 |
| 495672216,51680,1020 | 51680,cust,0 | purch,sedan,0 | last,claim,0 |
| 495672216,21398,120 | 51680,since,0 | purch,51680,0 | last,21398,0 |
| 495672216,99210,220 | Burns,family,0 | 51680,3yo,0 | claim,Jack,0 |
| 495672216,White,320 | Burns,sister, 0 | 51680,white,0 | claim,White,0 |
| 11166,11166,110 | Burns,99210,0 | 51680,sedan,0 | claim,last, 0 |
| 11166,34470,210 | Burns,home, 0 | 51680,purch,0 | claim,21398,0 |
| 11166,Santo,310 | family,Burns,0 | New,cust,0 | 21398,Jack,0 |
| 11166,621551680,2010 | family,sister,0 | New,11166,0 | 21398,White,0 |
| 11166,11166,101 | family,99210,0 | New,SSN,0 | 21398,last,0 |
| 11166,621551680,201 | family,home,0 | New,621551680,0 | 21398,claim,0 |
| 34470,11166,102 | sister,Burns,0 | cust,New,0 | |
| 34470,621551680,202 | sister,family,0 | cust,11166,0 | |

FIG. 24

Table 22

| | | | |
|---|---|---|---|
| ~~11166,11166,101~~ | ~~99210,51680,110~~ | Burns,since,0 | New,cust,0 |
| ~~11166,11166,110~~ | ~~99210,202139821,2010~~ | Burns,sister,0 | New,SSN,0 |
| ~~11166,34470,210~~ | ~~99210,495672216,202~~ | claim,21398,0 | purch,51680,0 |
| 11166,621551680,0 | 99210,Burns,0 | claim,Jack,0 | purch,3yo,0 |
| 11166,621551680,201 | 99210,Burns,310 | claim,last,0 | purch,sedan,0 |
| 11166,621551680,2010 | 99210,family,0 | claim,White,0 | purch,white,0 |
| 11166,cust,0 | 99210,home,0 | cust,11166,0 | ~~Santo,11166,103~~ |
| 11166,New,0 | 99210,sister,0 | cust,51680,0 | ~~Santo,621551680,203~~ |
| ~~11166,Santo,310~~ | ~~202139821,21551,220~~ | cust,621551680,0 | sedan,51680,0 |
| 11166,SSN,0 | ~~202139821,51680,120~~ | cust,Burns,0 | sedan,3yo,0 |
| ~~21398,51680,101~~ | ~~202139821,99210,1020~~ | cust,Mike,0 | sedan,purch,0 |
| ~~21398,495672216,201~~ | ~~202139821,Burns,320~~ | cust,New,0 | sedan,white,0 |
| 21398,claim,0 | ~~495672216,21398,120~~ | cust,since,0 | since,51680,0 |
| 21398,Jack,0 | ~~495672216,51680,1020~~ | cust,SSN,0 | since,Burns,0 |
| 21398,last,0 | ~~495672216,99210,220~~ | family,99210,0 | since,cust,0 |
| 21398,White,0 | ~~495672216,White,320~~ | family,Burns,0 | since,Mike,0 |
| ~~21551,99210,102~~ | 621551680,11166,0 | family,home,0 | sister,99210,0 |
| ~~21551,202139821,202~~ | 621551680,11166,120 | family,sister,0 | sister,Burns,0 |
| ~~34470,11166,102~~ | 621551680,11166,1020 | home,99210,0 | sister,family,0 |
| ~~34470,621551680,202~~ | ~~621551680,34470,220~~ | home,Burns,0 | sister,home,0 |
| ~~51680,21398,110~~ | 621551680,cust,0 | home,family,0 | SSN,11166,0 |
| ~~51680,99210,101~~ | 621551680,New,0 | home,sister,0 | SSN,621551680,0 |
| ~~51680,99210,210~~ | ~~621551680,Santo,320~~ | Jack,21398,0 | SSN,cust,0 |
| ~~51680,202139821,201~~ | 621551680,SSN,0 | Jack,claim,0 | SSN,New,0 |
| ~~51680,495672216,2010~~ | 3yo,51680,0 | Jack,last,0 | White,21398,0 |
| 51680,3yo,0 | 3yo,purch,0 | Jack,White,0 | white,51680,0 |
| 51680,Burns,0 | 3yo,sedan,0 | last,21398,0 | White,51680,103 |
| 51680,cust,0 | 3yo,white,0 | last,claim,0 | ~~White,495672216,203~~ |
| 51680,Mike,0 | Burns,51680,0 | last,Jack,0 | white,3yo,0 |
| 51680,purch,0 | Burns,99210,0 | last,White,0 | White,claim,0 |
| 51680,sedan,0 | Burns,99210,103 | Mike,51680,0 | White,Jack,0 |
| 51680,since,0 | ~~Burns,202139821,203~~ | Mike,Burns,0 | White,last,0 |
| 51680,white,0 | Burns,cust,0 | Mikie,cust,0 | white,purch,0 |
| 51680,White,310 | Burns,family,0 | Mike,since,0 | white,sedan,0 |
| ~~99210,21551,210~~ | Burns,home,0 | New,11166,0 | |
| ~~99210,51680,102~~ | Burns,Mike,0 | New,621551680,0 | |

FIG. 25

Table 23

| | | | |
|---|---|---|---|
| 11166,621551680,2010 | ~~621551680,New,0~~ | ~~family,Burns,0~~ | ~~sedan,3yo,0~~ |
| 11166,621551680,201 | ~~621551680,SSN,0~~ | ~~family,home,0~~ | ~~sedan,purch,0~~ |
| 11166,621551680,0 | ~~3yo,51680,0~~ | ~~family,sister,0~~ | ~~sedan,white,0~~ |
| ~~11166,cust,0~~ | ~~3yo,purch,0~~ | ~~home,99210,0~~ | ~~since,51680,0~~ |
| ~~11166,New,0~~ | ~~3yo,sedan,0~~ | ~~home,Burns,0~~ | ~~since,Burns,0~~ |
| ~~11166,SSN,0~~ | ~~3yo,white,0~~ | ~~home,family,0~~ | ~~since,cust,0~~ |
| ~~21398,claim,0~~ | ~~Burns,51680,0~~ | ~~home,sister,0~~ | ~~since,Mike,0~~ |
| ~~21398,Jack,0~~ | Burns,99210,103 | ~~Jack,21398,0~~ | ~~sister,99210,0~~ |
| ~~21398,last,0~~ | Burns,99210,0 | ~~Jack,claim,0~~ | ~~sister,Burns,0~~ |
| ~~21398,White,0~~ | ~~Burns,cust,0~~ | ~~Jack,last,0~~ | ~~sister,family,0~~ |
| ~~51680,3yo,0~~ | ~~Burns,family,0~~ | ~~Jack,White,0~~ | ~~sister,home,0~~ |
| ~~51680,Burns,0~~ | ~~Burns,home,0~~ | ~~last,21398,0~~ | ~~SSN,11166,0~~ |
| ~~51680,cust,0~~ | ~~Burns,Mike,0~~ | ~~last,claim,0~~ | ~~SSN,621551680,0~~ |
| ~~51680,Mike,0~~ | ~~Burns,since,0~~ | ~~last,Jack,0~~ | ~~SSN,cust,0~~ |
| ~~51680,purch,0~~ | ~~Burns,sister,0~~ | ~~last,White,0~~ | ~~SSN,New,0~~ |
| ~~51680,sedan,0~~ | ~~claim,21398,0~~ | ~~Mike,51680,0~~ | ~~White,21398,0~~ |
| ~~51680,since,0~~ | ~~claim,Jack,0~~ | ~~Mike,Burns,0~~ | White,51680,103 |
| 51680,White,310 | ~~claim,last,0~~ | ~~Mike,cust,0~~ | white,51680,0 |
| 51680,white,0 | ~~claim,White,0~~ | ~~Mike,since,0~~ | ~~white,3yo,0~~ |
| 99210,Burns,310 | ~~cust,11166,0~~ | ~~New,11166,0~~ | ~~White,claim,0~~ |
| 99210,Burns,0 | ~~cust,51680,0~~ | ~~New,621551680,0~~ | ~~White,Jack,0~~ |
| ~~99210,family,0~~ | ~~cust,621551680,0~~ | ~~New,cust,0~~ | ~~White,last,0~~ |
| ~~99210,home,0~~ | ~~cust,Burns,0~~ | ~~New,SSN,0~~ | ~~white,purch,0~~ |
| ~~99210,sister,0~~ | ~~cust,Mike,0~~ | ~~purch,51680,0~~ | ~~white,purch,0~~ |
| 621551680,11166,1020 | ~~cust,New,0~~ | ~~purch,3yo,0~~ | ~~white,sedan,0~~ |
| 621551680,11166,120 | ~~cust,since,0~~ | ~~purch,sedan,0~~ | ~~white,sedan,0~~ |
| 621551680,11166,0 | ~~cust,SSN,0~~ | ~~purch,white,0~~ | ~~white,sedan,0~~ |
| ~~621551680,cust,0~~ | ~~family,99210,0~~ | ~~sedan,51680,0~~ | |

FIG. 26

Table 24

| | | | |
|---|---|---|---|
| 11166,621551680,2010 | 51680,White,310 | 621551680,11166,1020 | Burns,99210,103 |
| 11166,621551680,201 | 51680,white,0 | 621551680,11166,120 | Burns,99210,0 |
| 11166,621551680,0 | 99210,Burns,310 | 621551680,11166,0 | White,51680,103 |
| -- | 99210,Burns, 0 | -- | white,51680,0 |

FIG. 27

Table 25

| Customer ID | Name | Birth Date | SSN | DL |
|---|---|---|---|---|
| 2 | Jane | 1972-05-10 | 222334444 | A5489346 |
| 8 | Tom | 1984-08-31 | 555667777 | H66416458 |

FIG. 28

Table 26

| Customer ID | Name | Gender | Birth Date | SSN |
|---|---|---|---|---|
| 1 | Tom | M | 1998-10-26 | 111223333 |
| 2 | Jane | F | 1972-05-10 | 222334444 |
| 3 | Harry | M | 1955-04-27 | 333445555 |

FIG. 29

Table 27

| Key | Value |
|---|---|
| 1, SUBJECT DATA | SUBJECT DATA, Row1, customer id, 1 |
| tom, SUBJECT DATA | SUBJECT DATA, Row1, name, 1 |
| m, SUBJECT DATA | SUBJECT DATA, Row1, gender, 1 |
| 1998-10-26, SUBJECT DATA | SUBJECT DATA, Row1, birth date, 1 |
| 111223333, SUBJECT DATA | SUBJECT DATA, Row1, ssn, 1 |
| 2, SUBJECT DATA | SUBJECT DATA, Row2, customer id, 2 |
| jane, SUBJECT DATA | SUBJECT DATA, Row2, name, 2 |
| f, SUBJECT DATA | SUBJECT DATA, Row2, gender, 2 |
| 1972-05-10, SUBJECT DATA | SUBJECT DATA, Row2, birth date, 2 |
| 222334444, SUBJECT DATA | SUBJECT DATA, Row2, ssn, 2 |
| 3, SUBJECT DATA | SUBJECT DATA, Row3, customer id, 3 |
| harry, SUBJECT DATA | SUBJECT DATA, Row3, name, 3 |
| m, SUBJECT DATA | SUBJECT DATA, Row3, gender, 3 |
| 1955-04-27, SUBJECT DATA | SUBJECT DATA, Row3, birth date, 3 |
| 333445555, SUBJECT DATA | SUBJECT DATA, Row3, ssn, 3 |
| 2, CLIENT DATA | CLIENT DATA, 2, ID |
| jane, CLIENT DATA | CLIENT DATA, 2, FIRST NAME |
| 1972-05-10, CLIENT DATA | CLIENT DATA, 2, BIRTH DATE |
| 222334444, CLIENT DATA | CLIENT DATA, 2, SSN |
| a5489346, CLIENT DATA | CLIENT DATA, 2, DL |
| 8, CLIENT DATA | CLIENT DATA, 8, ID |
| tom, CLIENT DATA | CLIENT DATA, 8, FIRST NAME |
| 1984-08-31, CLIENT DATA | CLIENT DATA, 8, BIRTH DATE |
| 555667777, CLIENT DATA | CLIENT DATA, 8, SSN |
| h66416458, CLIENT DATA | CLIENT DATA, 8, DL |

FIG. 30

Table 28

| Key | Value |
|---|---|
| 1, SUBJECT DATA | SUBJECT DATA, Row1, customer id, 1 |
| | |
| tom, SUBJECT DATA | SUBJECT DATA, Row1, name, 1 |
| tom, CLIENT DATA | CLIENT DATA, 8, FIRST NAME |
| | |
| m, SUBJECT DATA | SUBJECT DATA, Row1, gender, 1 |
| m, SUBJECT DATA | SUBJECT DATA, Row3, gender, 3 |
| 1998-10-26, SUBJECT DATA | SUBJECT DATA, Row1, birth date, 1 |
| | |
| 111223333, SUBJECT DATA | SUBJECT DATA, Row1, ssn, 1 |
| | |
| 2, SUBJECT DATA | SUBJECT DATA, Row2, customer id, 2 |
| 2, CLIENT DATA | CLIENT DATA, 2, ID |
| | |
| jane, SUBJECT DATA | SUBJECT DATA, Row2, name, 2 |
| jane, CLIENT DATA | CLIENT DATA, 2, FIRST NAME |
| f, SUBJECT DATA | SUBJECT DATA, Row2, gender, 2 |
| | |
| 1972-05-10, SUBJECT DATA | SUBJECT DATA, Row2, birth date, 2 |
| 1972-05-10, CLIENT DATA | CLIENT DATA, 2, BIRTH DATE |
| | |
| 222334444, SUBJECT DATA | SUBJECT DATA, Row2, ssn, 2 |
| 222334444, CLIENT DATA | CLIENT DATA, 2, SSN |
| | |
| 3, SUBJECT DATA | SUBJECT DATA, Row3, customer id, 3 |
| | |
| harry, SUBJECT DATA | SUBJECT DATA, Row3, name, 3 |
| | |
| m, SUBJECT DATA | SUBJECT DATA, Row3, gender, 3 |
| | |
| 1955-04-27, SUBJECT DATA | SUBJECT DATA, Row3, birth date, 3 |
| | |
| 333445555, SUBJECT DATA | SUBJECT DATA, Row3, ssn, 3 |

FIG. 31

Table 29

| Key | Value |
|---|---|
| tom, CLIENT DATA | CLIENT DATA, 8, FIRST NAME |
| tom, SUBJECT DATA | SUBJECT DATA, Row1, name, 1 |
|  |  |
| 2, CLIENT DATA | CLIENT DATA, 2, ID |
| 2, SUBJECT DATA | SUBJECT DATA, Row2, customer id, 2 |
|  |  |
| jane, CLIENT DATA | CLIENT DATA, 2, FIRST NAME |
| jane, SUBJECT DATA | SUBJECT DATA, Row2, name, 2 |
|  |  |
| 1972-05-10, CLIENT DATA | CLIENT DATA, 2, BIRTH DATE |
| 1972-05-10, SUBJECT DATA | SUBJECT DATA, Row2, birth date, 2 |
|  |  |
| 222334444, CLIENT DATA | CLIENT DATA, 2, SSN |
| 222334444, SUBJECT DATA | SUBJECT DATA, Row2, ssn, 2 |

FIG. 32

Table 30

| Key | Value |
|---|---|
| CLIENT DATA, Row1, 8 | FIRST NAME, tom, name, 1 |
| CLIENT DATA, Row2, 2 | ID, 2, customer id, 2 |
| CLIENT DATA, Row2, 2 | FIRST NAME, jane, name, 2 |
| CLIENT DATA, Row2, 2 | BIRTH DATE, 1972-05-10, birth date, 2 |
| CLIENT DATA, Row2, 2 | SSN, 222334444, ssn, 2 |

FIG. 33

SI DATA SCANNING PROCESS

RELATED APPLICATIONS

The current patent application is a non-provisional patent application which claims priority benefit to the following identically-titled U.S. Provisional Applications: Ser. No. 62/375,778, filed Aug. 16, 2016; and Ser. No. 62/453,265, filed Feb. 1, 2017. The listed earlier-filed provisional applications are hereby incorporated by reference in their entireties into the current patent application.

COMPUTER PROGRAM LISTING APPENDIX

Eight (8) computer files having ".txt." file extensions were provided with the present disclosure, collectively referred to here as "Appendix A" Appendix A includes excerpts in the form of annotated source code from two computer programs for implementing embodiments of the present inventive concept. Appendix A is hereby incorporated in its entirety herein by reference. The contents of Appendix A are as follows:

| File Name | Date of Creation | Size (bytes) |
|---|---|---|
| Program 1 Excerpt A [RefereneeKeyValueMapper] | Jul. 22, 2016 1:15 PM | 2KB |
| Program 1 Excerpt B [SubjectKeyValueMapPer] | Jul. 22, 2016 1:15 PM | 4KB |
| Program 1 Excerpt C [KeyValueReducer] | Jul. 22, 2016 1:15 PM | 3KB |
| Program 2 Excerpt A [ReferenceValueLineMapper] | Jul. 22, 2016 1:15 PM | 3KB |
| Program 2 Excerpt B [SubjectValueLineMapper] | Jul. 22, 2016 1:15 PM | 6KB |
| Program 2 Excerpt C [SubjectValueReducer] | Jul. 22, 2016 1:15 PM | 3KB |
| Program 2 Excerpt D [ValueLineReducer] | Jul. 22, 2016 1:15 PM | 3KB |
| Program 2 Excerpt E [ReportReducer] | Jul. 22, 2016 1:15 PM | 3KB |

FIELD OF THE DISCLOSURE

The present disclosure generally relates to systems, methods and computer-readable media for scanning and/or scrubbing sensitive information and/or for preventing the introduction of unscrubbed data into computer files.

BACKGROUND

Data scrubbing helps control risks relating to the collection and storage of personal and sensitive information regarding, for example, a business's customers. Such risks become greater as corporate strategies increasingly exploit big data to realize revenue growth. Large companies sometimes store billions of lines of personal information in support of the services they provide and/or for exploitation in other ways. Many companies store such data in unstructured formats and/or in multiple formats. These factors contribute to massive and growing challenges for companies seeking to control risk using existing data scrubbing or scanning technologies.

Current technology relies on pattern matching algorithms to detect sensitive information embedded in data files. For example, a delimited data item may be of the form XX/XX/XXXX—where "X" represents a number—and therefore may be flagged as potentially being a date of birth or another type of sensitive date. Flagged data items may be compiled for further review by humans to determine definitively whether they are truly "sensitive." Current pattern matching methods require an exorbitant amount of computer memory and processing power, and are inefficient for processing large data stores. Moreover, current computer pattern matching systems are methodologically flawed, resulting in high rates of false positives.

BRIEF SUMMARY

Embodiments of the present technology relate to systems, computer-implemented methods and computer-readable media for scanning and/or scrubbing data of sensitive information and/or for preventing the introduction of unscrubbed data into computer files. Embodiments of the present inventive concept include a plurality of reference subcombinations for use in analyzing structured and/or unstructured subject files for sensitive information. More particularly, embodiments of the present inventive concept analyze a subject file to determine each instance in which two or more data elements of a reference subcombination are present in any one entry of the subject file.

The advantages of the present inventive concept are significant. For example, the reduced and/or distributed processor load resulting from use of one embodiment of the present inventive concept can lead to significantly faster scanning of subject files. Moreover, embodiments of the present inventive concept enable data scanning and/or scrubbing with lower rates of false positives returned.

In a first aspect, a computer-implemented method may be provided for scanning and/or scrubbing data, broadly comprising the following. The computer-implemented method may include accessing a reference table including a grid of data cells arranged in columns and rows and containing reference data elements. Each of the rows may relate to one of a plurality of data subjects. The method may also include generating a list of reference subcombinations. The list of reference subcombinations may be generated by designating a primary column for uniquely identifying the data subjects and generating a plurality of first preliminary reference subcombinations. Each of the first preliminary reference subcombinations may include reference data elements gathered from the primary column and a second column of a single row of the reference table. The method may also include accessing a subject file having a plurality of data entries. Each of the data entries may include a plurality of logically-related and delimited subject data elements. The method may also include identifying and generating a match record for each instance in which one of the data entries contains all reference data elements of one of the reference subcombinations. The computer-implemented method may include additional, less, or alternate actions, including those discussed herein, and may be implemented via one or more processors and/or computer-executable instructions stored on non-transitory computer-readable medium or media.

In a second aspect, a system may be provided for scanning and/or scrubbing data, broadly comprising the following. The system may include an electronic memory configured to store a subject file having a plurality of data entries. Each data entry may include a plurality of logically-related and delimited subject data elements. The electronic memory may also be configured to store a reference table including a grid of data cells arranged in columns and rows and containing reference data elements. Each of the rows may relate to one of a plurality of data subjects. The system may also include an electronic processor in communication with the electronic memory. The electronic processor may be configured to generate a list of reference subcombinations by designating a primary column of the reference table for uniquely identifying the data subjects and generating a plurality of first preliminary reference subcombinations. Each of the first preliminary reference subcombinations may include reference data elements gathered from the primary column and a second column of a single row of the reference table. The electronic processor may also be configured to identify and generate a match record for each instance in which one of the data entries contains all reference data elements of one of the reference subcombinations. The system may include additional, less, or alternate functionality, including that discussed elsewhere herein.

In a third aspect, a non-transitory computer-readable medium with an executable program stored thereon may be provided for scanning and/or scrubbing data, wherein, broadly speaking, the computer program may be configured to instruct an electronic processor to perform the following actions. The electronic processor may be instructed to access a reference table including a grid of data cells arranged in columns and rows and containing reference data elements. Each of the rows may relate to one of a plurality of data subjects. The electronic processor may also be instructed to generate a list of reference subcombinations by designating a primary column for uniquely identifying the data subjects and generating a plurality of first preliminary reference subcombinations. Each first preliminary reference subcombination may include reference data elements gathered from the primary column and a second column of a single row of the reference table. The electronic processor may also be instructed to access a subject file having a plurality of data entries. Each data entry may include a plurality of logically-related and delimited subject data elements. The electronic processor may also be instructed to identify and generate a match record for each instance in which one of the data entries contains all reference data elements of one of the reference subcombinations. The instructions may direct additional, less, or alternate functionality, including that discussed elsewhere herein.

In a fourth aspect, a computer-implemented method may be provided for mapping a subject file, broadly comprising the following. The method may include accessing a reference table including a grid of data cells containing reference data elements and arranged in columns and rows. Each of the rows may relate to one of a plurality of data subjects. The method may also include generating a list of reference subcombinations by designating a primary column for uniquely identifying the data subjects and generating a plurality of first preliminary reference subcombinations. Each first preliminary reference subcombination may include reference data elements gathered from the primary column and a second column within a single row of the reference table. The method may also include accessing a subject file having a plurality of data entries. Each data entry may include a plurality of logically related, delimited subject data elements. The method may also include identifying and generating a match record for each instance in which one of the data entries contains all reference data elements of one of the reference subcombinations. The method may include additional, less, or alternate actions, including those discussed herein, and may be implemented via one or more processors and/or computer-executable instructions stored on non-transitory computer-readable medium or media.

In a fifth aspect, a system may be provided for monitoring data entered into a free form text form, the system broadly comprising the following. The system may include an electronic memory configured to store a list of reference subcombinations. Each reference subcombination may correspond to a data subject. Each reference subcombination may include a primary reference data element for uniquely identifying the data subject and a secondary reference data element. The electronic memory may also be configured to store a plurality of delimited subject data elements. The system may also include an electronic processor in communication with the electronic memory. The electronic processor may be configured to identify and generate a match record for each instance in which a subject subcombination of the plurality of delimited subject data elements matches one of the reference subcombinations. The system may include additional, less, or alternate functionality, including that discussed elsewhere herein.

In a sixth aspect, a non-transitory computer-readable medium with an executable program stored thereon may be provided for scanning and/or scrubbing data to be shared between a source and a destination, wherein, broadly speaking, the computer program may be configured to instruct a system including an electronic processor to perform the following actions. The electronic processor may be instructed to access a list of reference subcombinations. Each reference subcombination may correspond to a data subject and may include a primary reference data element for uniquely identifying the data subject and a secondary reference data element. The electronic processor may also be instructed to access a subject file including a plurality of delimited subject data elements. The electronic processor may also be instructed to identify and generate a match record for each instance in which all reference data elements of one of the reference subcombinations appear among the plurality of subject data elements. The instructions may direct additional, less, or alternate functionality, including that discussed elsewhere herein.

In a seventh aspect, a non-transitory computer-readable medium with an executable program stored thereon may be provided for identifying and logging sensitive information in a subject file, wherein, broadly speaking, the computer program may be configured to instruct a system including an electronic processor to perform the following actions. The electronic processor may be instructed to access a list of reference subcombinations. Each reference subcombination may correspond to a data subject and may include a primary reference data element for uniquely identifying the data subject and a secondary reference data element. The electronic processor may also be instructed to access a subject file including a plurality of delimited subject data elements. The electronic processor may also be instructed to identify and generate a match record for each instance in which all reference data elements of one of the reference subcombinations appear among the plurality of subject data elements. The instructions may direct additional, less, or alternate functionality, including that discussed elsewhere herein.

Various implementations of any or all of the foregoing aspects may include any one or more of the following additional features. Identifying instances in which a data entry includes all the reference data elements of a reference subcombination may include comparing each of the reference data elements of the reference subcombination against each of the subject data elements of the data entry at least until one of the reference data elements fails to match any subject data element of the data entry.

Alternatively or additionally, such identification may include generating a list of subject subcombinations. The list of subject subcombinations may be generated by generating a plurality of first preliminary subject subcombinations. Each first preliminary subject subcombination may include two subject data elements from a single data entry. The list of subject subcombinations may be combined with the list of reference subcombinations to generate a combined list. The combined list may be sorted to place like subcombinations together in groups. Groups may be identified that include at least one reference subcombination and at least one subject subcombination. Higher order control characters may also be added to reference subcombinations, and one or more lower order control characters may be added to the subject subcombinations. Identifying groups having at least one of each may include subsorting the grouped subcombinations in ascending order of control character and removing groups having a first-listed reference subcombination from consideration for generation of match records. Such identification may also include subsorting the grouped subcombinations in descending order of control character and removing groups having a first-listed subject subcombination from consideration for generation of match records.

Generating the list of reference subcombinations may include designating a second primary column for uniquely identifying the data subjects and generating a plurality of second preliminary reference subcombinations. Each second preliminary reference subcombination may include reference data elements gathered from the second primary column and another column of a single row of the reference table.

Following generation of a match record for each instance in which a data entry includes all the reference data elements of a reference subcombination, one or more of the following actions may be performed: log the match record, automatically mask the matching subject data elements of the match record within the subject file, automatically remove the matching subject data elements of the match record from the subject file, and encrypt the plurality of subject data elements.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals. The present embodiments are not limited to the precise arrangements and instrumentalities shown in the Figures.

FIGS. 9-33 illustrate various examples of subcombinations.

Figure 1:
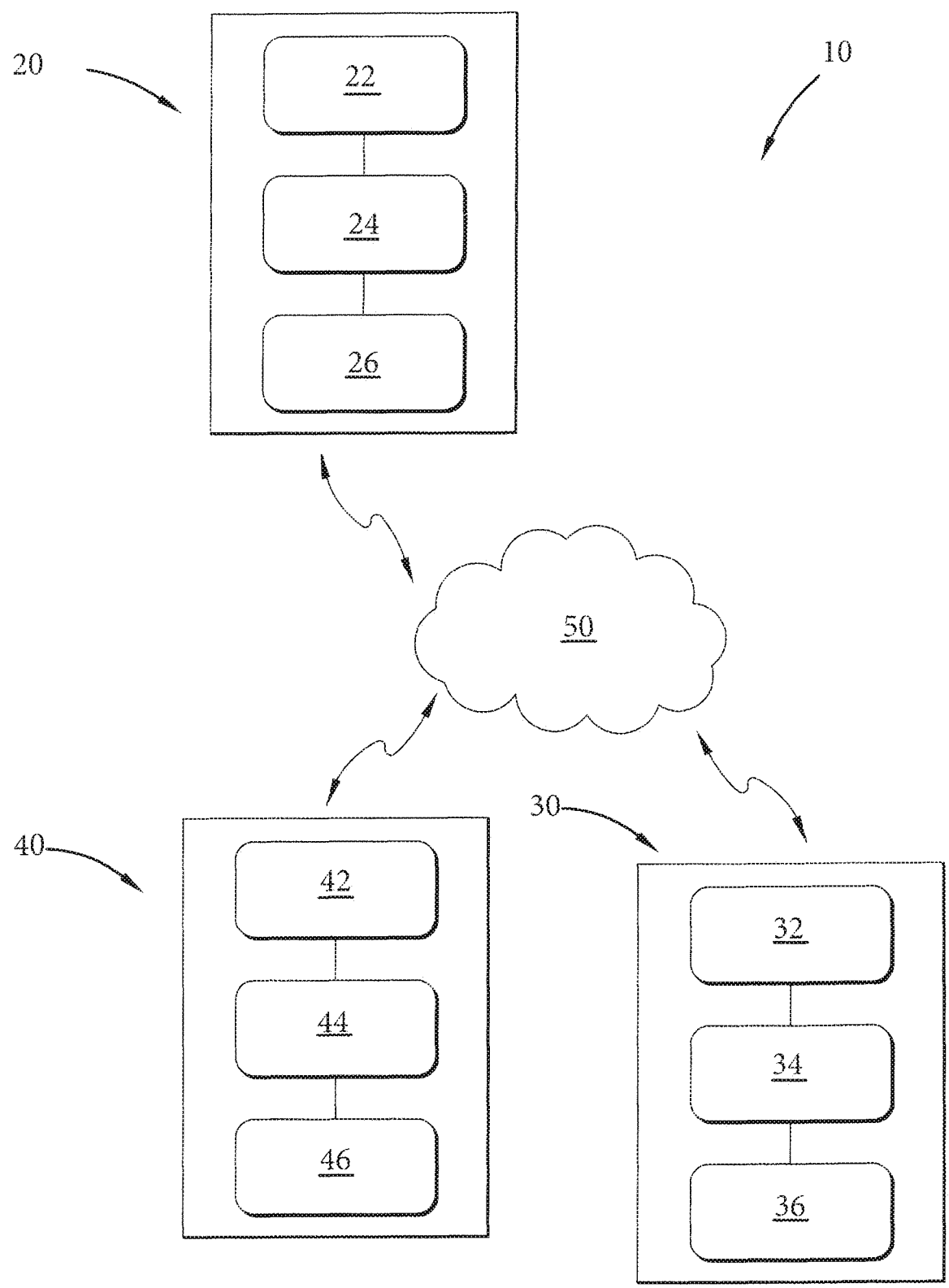
FIG. 1 is a depiction of exemplary computing resources for implementing a system and method for scanning and/or scrubbing data and/or for preventing the introduction of unscrubbed data.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems, computer-implemented methods and computer-readable media for scanning and/or scrubbing data of sensitive information and/or preventing the introduction of sensitive information into an electronic memory of a system.

Existing data analysis for the presence of sensitive information is performed by computer systems implementing pattern-matching programs. Exemplary pattern matching technology includes brute force and/or linear-time exact pattern matching algorithms and regular expression pattern matching algorithms. Such pattern matching technology may focus on defining and searching for contiguous character class patterns that together indicate the likely presence of sensitive information. For example, five consecutive contiguous numbers followed by a capitalized word or words may indicate a street address. Each time a piece of data exhibits such a contiguous character class pattern, the pattern matching algorithm returns a hit for further examination.

However, many of the hits resulting from the use of existing pattern matching technologies are false positives. For example, a hit may be generated by the pattern matching technology for a date even though the date may not be a birthdate or any other "sensitive" date and may not directly relate to an individual at all. Such false positives lead to wasted computer processing and often to wasted human efforts in sifting through scores of computer-generated false positives. Further, a piece of data that is correctly identified as personal information regarding an individual may nonetheless be too isolated or remote from other personal information regarding that individual to truly constitute sensitive information. Yet existing technologies are ill-equipped to recognize and deal with such nuances encountered in operations scanning for sensitive information. Still further and more generally, existing pattern matching technologies are slow, requiring large processor and memory capacities and a great deal of time to complete scanning data samples of even modest size.

Embodiments of the present inventive concept address the aforementioned problems. In one embodiment of the present inventive method, these problems are addressed by providing a reference table comprising a grid of data cells containing reference data elements. The reference table may be structured, with each column labeled with a data type. At least one data type may comprise information unique to data subjects represented in the rows of the table. The unique data may be customer identification numbers assigned solely to single customers or accounts, social security numbers, or similar information discussed below. The unique data may also or alternatively comprise any other information or grouping of information reasonably expected to apply to or describe a single individual, account or related group of individuals, for example a primary residence address of a single family dwelling, without departing from the spirit of the present inventive concept. Other columns may contain reference data elements that are not likely to be unique to a single individual/account or group of related individuals, and that may instead be expected to be found in multiple rows of a large data file. For example, a date of birth may reasonably be expected to appear in multiple rows of a large data file containing many types of information about tens of thousands of individuals.

The method may include preparing a list of reference subcombinations from the reference table. The list of reference subcombinations may comprise preliminary reference subcombinations prepared on a row-by-row basis from the reference table, with each preliminary reference subcombination including reference data elements from a single row assigned to a particular individual/account or related group. The reference data elements selected from that row may be from a column containing data considered likely to be unique to the individual described as well as from another column in that row (the other column may contain unique or non-unique data).

The list of reference subcombinations may be used to analyze a subject file for sensitive information by determining which data entries within the subject file contain all the reference data elements of one or more of the reference subcombinations. The subject file may be prepared for this analysis by generating preliminary subject subcombinations. In embodiments where the reference subcombinations each include two reference data elements, each preliminary subject subcombination may include two subject data elements from a single entry. However, it is foreseen that the subcombinations may include additional data elements without departing from the spirit of the present inventive concept. Moreover, the list of subject subcombinations may be sorted initially and duplicate subject subcombinations deleted without departing from the spirit of the present inventive concept, provided that like subcombinations arising from different entries of the subject file are preferably not deleted.

In many embodiments, the number of reference data elements (referred to as "n–" data elements) in each reference subcombination may equal the number of subject data elements in each subject subcombination against which it is to be compared and matched. The list of reference subcombinations may include all possible data combinations of n– data elements—excluding those that would include nullified or de-selected elements—that may be generated from each row and that include a reference data element from a unique data column (or a "primary" column). Similarly, the list of subject subcombinations may include all possible combinations of n– subject data elements that may be generated from each data entry of the subject file.

It is also foreseen that in embodiments where n– is larger, designation of primary reference data columns may be omitted because of the reduced likelihood of false positives. In such embodiments, the list of reference subcombinations may include all possible permutations or combinations of n– elements—excluding those that would include nullified or de-selected elements—that may be generated from each row, without the requirement that at least one element of each combination be from a primary column.

Analysis of the reference subcombinations against the subject subcombinations may include sorting a combined list into groups of like subcombinations. Groups not including at least one reference subcombination and at least one subject subcombination may be disregarded for purposes of generating match records at this stage. In certain embodiments, each group may be subsorted according to control characters assigned to each subcombination. Each control character may indicate the source of the subcombination (i.e., either the reference table or the subject file) and/or may indicate the types of data represented in the subcombination.

Subsorting by control character within each group of like subcombinations may reduce the processing time required to identify matches. For example, higher order control characters may be assigned to reference subcombinations and lower order control characters to subject subcombinations. Each group may be subsorted initially in ascending order of control character. All groups not beginning with a subject subcombination may be initially disregarded for purposes of match record generation. Additionally, subsorting within each such group in descending order of control character permits groups not beginning with a reference subcombination to be initially disregarded. In this manner, large and even unstructured subject data stores may be quickly and efficiently scanned for sensitive information with a low rate of false positives.

I. Exemplary System

The systems and methods described herein may be employed in various computer and network environments without departing from the spirit of the present inventive concept. For example, and as discussed in more detail below, data scanning and/or scrubbing using a reference data table according to embodiments of the present inventive concept may be conducted locally on locally stored subject files, locally on text being prepared for local storage and/or remote transmission, remotely on locally stored subject files, remotely on files exchanged between systems, remotely on text being prepared for local storage and/or remote transmission, and in other system configurations.

Referring to FIG. 1, system 10 may include a first device 20, which may have certain computing resources such as a first electronic memory 22, a first electronic processor 24, and a first electronic communication element 26. A second device 30 may have certain computing resources such as a second electronic memory 32, a second electronic processor 34, and a second electronic communication element 36. A third device 40 may have certain computing resources such as a third electronic memory 42, a third electronic processor 44, and a third electronic communication element 46. The devices 20, 30, 40 may be configured to communicate with each other via a communication network 50. Embodiments of a method 100 of the present invention, discussed in more detail below, may be implemented by the system 10, including device 20, device 30 and/or device 40.

The electronic memory elements 22, 32, 42 may be computer-readable media configured to store instructions for performing the various embodiments of the present inventive concept, the scanned, scrubbed and/or unscrubbed data tables and/or subject files, and/or the scanning results and reports and the like based thereon, that are discussed below. The memory elements 22, 32, 42 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic processors 24, 34, 44 may be configured to execute embodiments of the functionality of the present invention, which may involve accessing the programs and/or data stored in the memory elements 22, 32, 42, and communicating through the communication elements 26, 36, 46.

The electronic communication elements 26, 36, 46 may be configured to communicate data via the communication network 50. According to some embodiments, the communication elements 26, 36, 46 may include one or more transceivers (e.g., WWAN, WLAN, and/or WPAN transceivers) functioning in accordance with IEEE standards, 3GPP standards, or other standards, and configured to receive and transmit data via one or more external ports. The communication network 50 may facilitate substantially any type of data communication via any standard or technology (e.g., GSM, CDMA, TDMA, WCDMA, LTE, EDGE, OFDM, GPRS, EV-DO, UWB, WiFi, IEEE 802 including Ethernet, WiMAX, and/or others). The network 50 may also support various local area networks (LANs), personal area networks (PAN), or short range communication protocols.

The devices 20, 30, 40 may each comprise one or more application servers, database servers, file servers, gaming servers, mail servers, print servers, web servers, smart phones, laptops, tablets, electronic wearables, desktop computers, smart watches, personal digital assistants (PDAs), palmtops, smart glasses, workstation computers, and other computing devices or the like, or combinations thereof.

Figure 2:
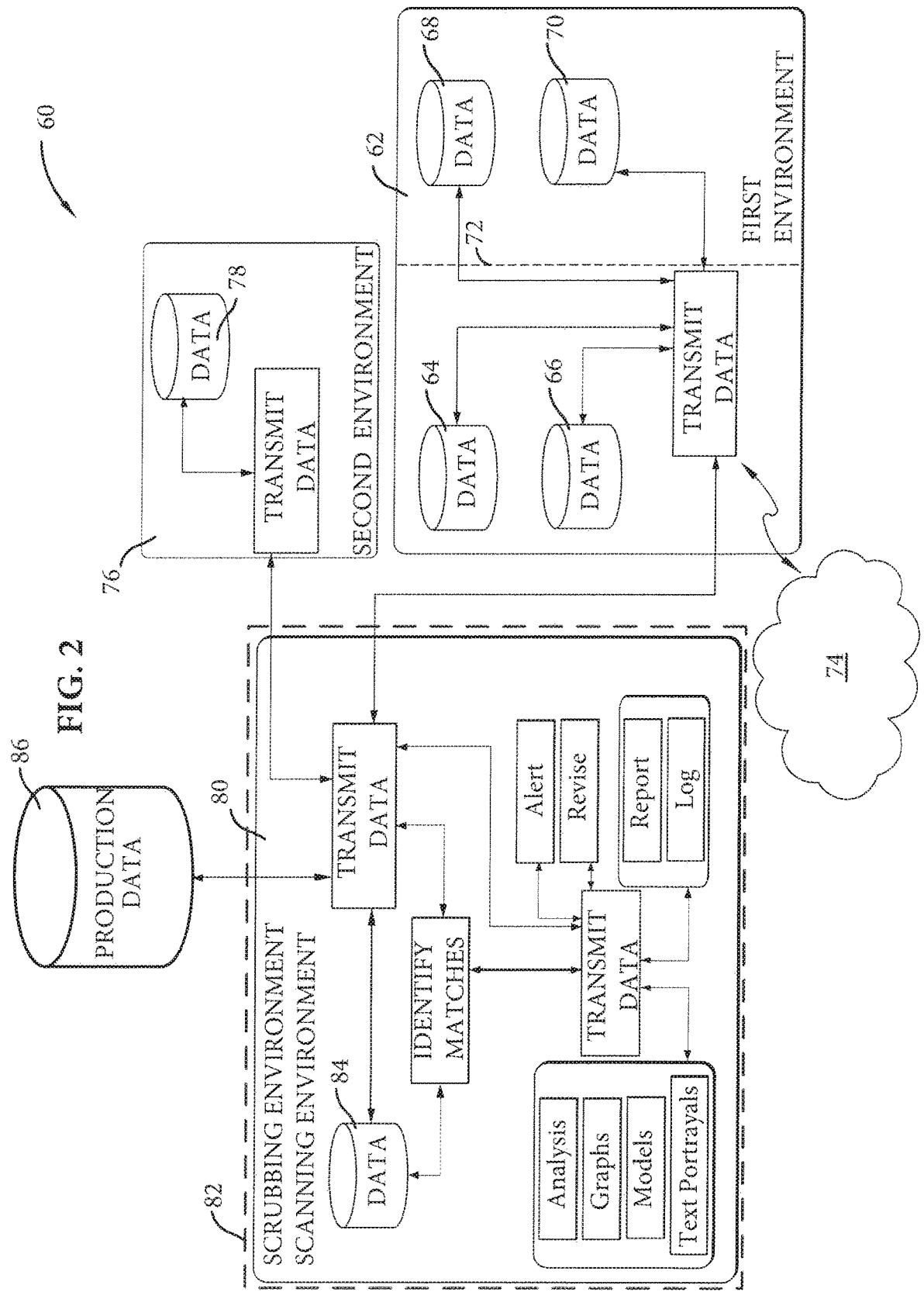
FIG. 2 is a block diagram of an exemplary embodiment of the system for scanning and/or scrubbing of data to be shared between a source and a destination.

Referring also to FIG. 2, a block diagram of a system 60 for scanning and/or scrubbing data and/or for preventing the introduction of unscrubbed data is shown according to one embodiment of the present invention. The components illustrated in FIG. 2 may be implemented variously across one or more of devices 20, 30, 40, which may communicate via communication network 50 shown in FIG. 1.

The system 60 may include a first environment 62 having four data locations 64, 66, 68, 70 that may individually or collectively store subject files. The first environment 62 may also include an access barrier 72, which may comprise user-level password protection, certificated authentication and/or firewalls, or other known security mechanisms for protecting access to areas of memory and other system components. Moreover, the first environment 62 may be in communication with a communication network 74 over which communication with external devices and/or networks may be achieved. The system 60 may also include a second environment 76 having at least one data location 78.

The first and second environments 62, 76 may be in communication with a scanning and/or scrubbing environment 80. Scanning and/or scrubbing environment 80 may be secured behind one or more access barriers 82, which may comprise user-level password protection, certificated authentication and/or firewalls, or other known security mechanisms for protecting access to areas of memory and other system components.

The system may include more, fewer, or alternative components and/or perform more, fewer, or alternative actions, including those discussed elsewhere herein, and particularly those discussed in the following section describing the computer-implemented method.

II. Exemplary Computer-Implemented Method

Broadly, a computer program in accordance with one embodiment of the present invention may include a computer usable storage medium (e.g., standard random access memory (RAM), an optical disc, a universal serial bus (USB) drive, or the like) having computer-readable program code embodied therein, wherein the computer-readable program code is adapted to be executed by one or more of the processors 24, 34, 44 to facilitate the functionality described herein. In this regard, the program code may be implemented in any desired language, and may be implemented as machine code, assembly code, byte code, interpretable source code or the like (e.g., via C, C++, Java, Actionscript, Objective-C, Javascript, CSS, XML).

Referring to FIGS. 1 and 2 together, first environment 62 may be implemented by first device 20, second environment 76 may be implemented by the second device 30, and scanning/scrubbing environment 80 may be implemented by the third device 40. It is foreseen that in certain embodiments two or more of the environments illustrated in FIG. 2 may be implemented by a single device. Further, data transmission operations do not necessarily connote transmissions external to a device or between devices.

Figure 3:
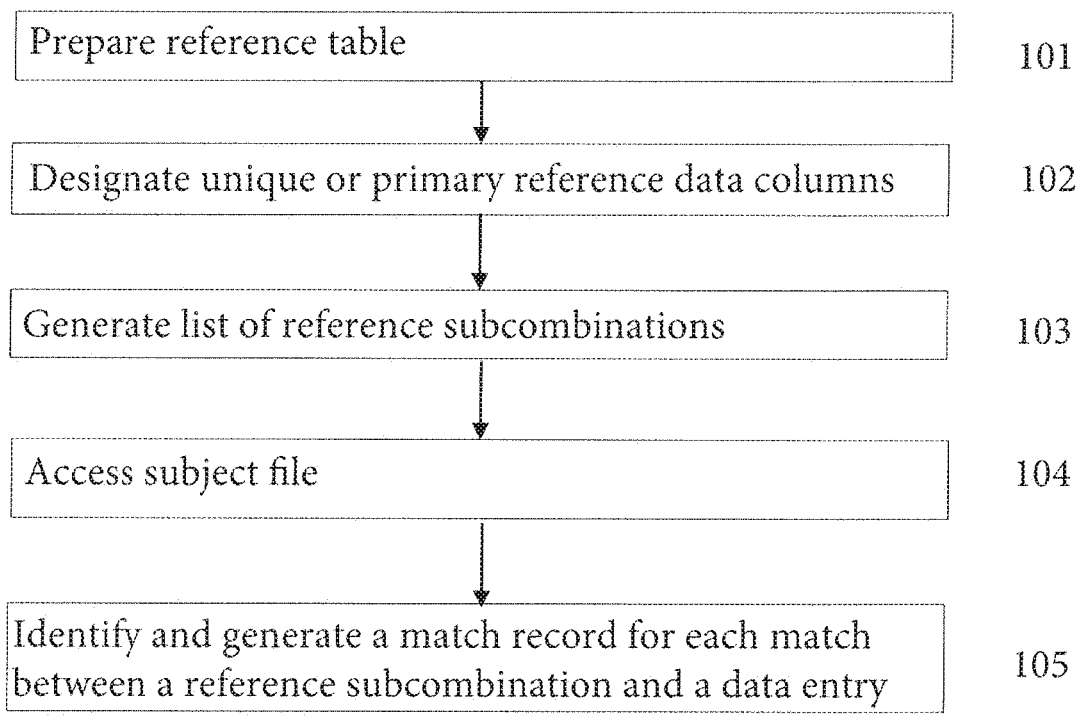
FIG. 3 is a flowchart of an exemplary embodiment of the method for scanning and/or scrubbing data.

Referring to FIG. 3, one embodiment of a computer-implemented method 100 is shown for scanning and/or scrubbing data of sensitive information and/or preventing the introduction of unscrubbed data. For example, the method 100 may be used to scrub data to be exchanged between a source and a destination. Broadly, the method 100 may proceed substantially as follows. A reference table may be prepared 101. The reference table may comprise a grid of data cells containing reference data elements. The grid may be arranged in columns and rows, with each row relating to one of a plurality of data subjects. Each data subject may be a person—whether an individual or corporate entity—or a group of logically related individuals and/or entities such as a family. The data subjects may be customers of a business venture. The reference table may be structured with column labels indicating the nature of the information or data contained therein. Table 1 below illustrates an exemplary reference table.

TABLE 1

| Customer Account Number (10) | Date of Birth (1) | Zip Code of Birthplace (2) | Mother's Maiden Name (3) | Social Security Number (20) |
|---|---|---|---|---|
| 99210 | May 16, 1980 | 21551 | Burns | 202-13-9821 |
| 51680 | Feb. 13, 1998 | 99210 | White | 495-67-2216 |
| 11166 | Jan. 11, 1966 | 34470 | Santo | 621-55-1680 |

Each row of the reference table of Table 1 relates to an individual data subject. Each column includes a label indicating a data type and a preliminary control character (in parentheses) signifying that each reference data element taken therefrom is of that data type and is from the reference table.

A reference table of the present inventive concept may include more or fewer columns and/or rows without departing from the spirit of the present inventive concept. Moreover, the reference table may be prepared 101 by joining and merging multiple constituent reference tables. For instance, Table 1 may be prepared by joining a first constituent reference table containing account number, date of birth and zip code information with a second constituent reference table containing account number, maiden name, and social security number information.

Returning to FIG. 3, one or more columns may be designated 102 as containing or likely containing unique data regarding the plurality of data subjects. With reference to Table 1, the Customer Account Number and Social Security Number columns may reasonably be expected to contain data unique to the data subjects of the reference table because each number is typically assigned to one and only one individual and/or account. In contrast, the Date of Birth, Zip Code of Birthplace and Mother's Maiden Name columns can reasonably be expected to contain data shared by several data subjects and may therefore be considered non-unique in this example.

It should be noted here that selecting unique data and/or primary columns will be within the capabilities of one having ordinary skill following review of this specification, it being understood that the threshold between "unique" and "non-unique" data may vary depending on project parameters, tolerance for false negatives and/or false positives, subject file(s) at issue, and other factors. Moreover, column designation may occur at any stage of the method 100, including prior to formation of the reference table and/or following identification and generation of match records, without departing from the spirit of the present inventive concept.

It should also be noted here that the method 100 may include de-selecting one or more columns containing non-personal and/or unspecific information for exclusion from the subcombination generation process outlined below, without departing from the spirit of the present inventive concept. For example, the Zip Code of Birthplace column may be considered in some embodiments (not illustrated herein) to be too unspecific to be considered for inclusion in certain scanning and/or scrubbing inquiries.

The data contained in one or more of the constituent reference tables and the reference table may originate in one or more of electronic memory elements 22, 32, 42 of devices 20, 30, 40. Referring to FIG. 2, the data in the constituent reference tables and/or reference table may be stored in data location 84 within the scanning/scrubbing environment 80. The data stored at memory location 84 may be periodically refreshed from a production data location 86, which may reside outside access barriers 82. The designation 102 of primary column(s) (and/or de-selection of non-personal information column(s)) may occur at a user interface of third device 40 and/or may be automated via execution of executable code by processor 44. Automated column designation 102 and/or selection may involve keyword recognition—for example, within column labels of the reference table—to identify data types pre-determined as likely to be unique, such as "account number" and/or "social security number," and/or that are likely to be non-personal, such as "policy type" (not shown). Moreover, a machine-learning algorithm may be employed to improve such keyword recognition by calculating rates of false positives and/or false negatives realized through use of various keyword matching strategies, patterns and/or keywords.

The method may also include generating 103 a list of reference subcombinations from the reference table. To generate 103 the list, first preliminary subcombinations may be prepared based on a first primary column, such as the Customer Account Number column of Table 1. The first preliminary subcombinations may include all combinations, from within each row of the reference table, of a reference data element from the first primary column and a reference data element from another column. For instance, the contents of Table 1 may be used to generate first preliminary subcombinations of the reference data elements within each row in the Customer Account Number column and a second column, such as the Date of Birth column. Additional preliminary subcombinations may also be generated within each row for all other combinations of reference data elements from the Customer Account Number column and the other columns of Table 1. Likewise, a second primary column, for example the Social Security Number column of Table 1, may be used with another column of the reference table to generate second preliminary subcombinations. Additional preliminary subcombinations may also be generated within each row for all other combinations of reference data elements from the Social Security Number column and the other columns of Table 1. The preliminary subcombinations generated according to this process may include all possible permutations—excluding those that would include nullified or de-selected elements—from within each row of reference data elements gathered from a primary column and any other column of the reference table.

Each preliminary reference subcombination may also include a control character. The control character may signify the origin of the reference subcombination as being the reference table. The control character may also signify the type of data for one or more of the reference data elements comprising the reference subcombination. In the example derived from Table 1, a control character may comprise a concatenation of preliminary control characters indicated in parentheses in the column labels. For instance, the primary column Account Number is assigned preliminary control character "10" and non-primary column Date of Birth is assigned preliminary control character "1". For each reference subcombination including Account Number followed by Date of Birth, control character "101" is appended following the pair of reference data elements. Conversely, for each reference subcombination including Date of Birth followed by Account Number, control character "110" is appended following the pair of reference data elements. In this manner, a list of reference subcombinations with appended control characters may be generated.

It is foreseen that various scales, types and character combinations—including numeric, alphabetic and/or alphanumeric systems—may be used to generate control character sets for meaningfully representing all or some of the information discussed herein without departing from the spirit of the present inventive concept. Table 2 below illustrates an exemplary list of reference subcombinations with Customer Account Number and Social Security Number columns designated respectively as the first and second primary columns.

TABLE 2

| | | |
|---|---|---|
| 99210,51680, 110 | 51680,21398, 110 | 11166,11166,110 |
| 99210,21551,210 | 51680,99210,210 | 11166,34470,210 |
| 99210,Burns,310 | 51680,White,3 1 0 | 11166,Santo,310 |
| 99210,202139821,2010 | 51680,495672216,2010 | 11166,621551680,2010 |
| 51680,99210,101 | 21398,51680,101 | 11166,11166,101 |
| 51680,202139821,201 | 21398,495672216,201 | 11166,621551680,201 |
| 21551,99210, 102 | 99210,51680, 102 | 34470,11166,102 |
| 21551,202139821,202 | 99210,495672216,202 | 34470,621551680,202 |
| Burns,99210, 103 | White,51680, 103 | Santo,11166,103 |

TABLE 2-continued

| | | |
|---|---|---|
| Burns,20213 9821,203 | White,495672216,203 | Santo,621551680,203 |
| 202139821,99210,1020 | 495672216,51680,1020 | 621551680, 11166,1020 |
| 202139821,51680,120 | 495672216,21398,120 | 621551680, 11166,120 |
| 202139821,21551,220 | 495672216,99210,220 | 621551680,34470,220 |
| 202139821,Burns,320 | 495672216,White,320 | 621551680,Santo,320 |

It should be noted that various formatting and pre-processing operations instructed by a computer program of the present inventive concept may be performed on reference data elements during generation of the list of reference subcombinations. For instance, as illustrated in Table 2 above, all special characters may be removed. In some cases, all characters may be converted to lower case. Moreover, spaces between portions of each single reference data element may be removed. Spaces may also or alternatively be relied on to further divide each single reference data element into several reference data elements for use independently in forming reference subcombinations. Following pre-processing and pairing of the reference data elements, they may be combined to form reference subcombinations delimited using commas and appended with a control character, for example as seen in Table 2 above.

Generating 103 a list of reference subcombinations may be performed by one or more of electronic processors 24, 34, 44 of devices 20, 30, 40. Referring to FIG. 2, the list of reference subcombinations may be generated by an Analysis module within the scanning/scrubbing environment 80.

The method may also include accessing 104 a subject file comprising a plurality of data entries. The subject file may be stored at one or more of electronic memory elements 22, 32, 42 of devices 20, 30, 40. The subject file may contain a plurality of data entries, each of which may be presumed to contain logically related subject data elements (for example subject data elements regarding the same individual or entity). Data entries may be delineated across rows within a data table, delimited by a hard return, or otherwise segmented from one another. Each subject data element may be delimited from the others within a data entry by commas, spaces, semi-colons, columns, or by other known means. An exemplary subject file is illustrated as Table 3 below, comprising a plurality of free hand (unstructured) notes taken by a company's sales agents regarding customers. The notes of the subject file are separated into rows of data entries, with subject data elements separated in each entry by spaces.

TABLE 3

| |
|---|
| Mike Burns - cust since May 16, 1980 |
| Jack White, last claim Feb. 13, 1998 |
| Burns family (& sister, #99210) - home |
| 3y/o white sedan purch. May 16, 1980 |
| New cust #11166 (SSN 621551680) |

The exemplary subject file may be stored at one or more of data locations 64, 66, 68, 70 in first environment 62, which may be the source of the subject file. Moreover, the subject file may comprise one or more constituent subject files gathered from one or more memory locations. For instance, the subject file may combine the contents of a constituent subject file originating in memory location 64 and containing the first two rows of Table 3 with the contents of another constituent subject file originating in memory location 66 and containing the last three rows of Table 3. Constituent subject files may be selected based on their locations within first environment 62. For example, a security audit and/or network mapping process may note that memory locations 64, 66 of first environment 62 are likely vulnerable to the same attack vector. For example, a threat may be identified as originating in communication network 74, at least in part because access barrier 72 does not protect locations 64, 66 from the network 74 in the manner that barrier 72 protects locations 68, 70. This shared vulnerability may lead to combined scanning of constituent subject files stored at locations 64, 66. For example, the constituent subject files from locations 64, 66 may be joined to form the subject file. This combined analysis may lead to a better understanding of the value of the information an attacker is likely to glean from implementing the analyzed attack vector.

First device 20 may initiate transmission of all or part of the subject file to a destination such as the second device 30 via communication network 50, for example on an asynchronous basis. The third device 40 may be interposed along the communication pathway—for example within the communication network 50 and/or within middleware of one or more of devices 20, 30, 40—between memory locations of the first and second devices 20, 30.

Transmission by the first device 20 may trigger electronic processor 44 to implement the processes of the scanning/scrubbing environment 80 to scan and otherwise treat the subject file for sensitive data prior to or simultaneously with its delivery to the second device 30. The scanning and/or scrubbing performed according to computer-implemented method 100 may therefore be performed without the knowledge of the source or destination devices, in certain embodiments. It is also foreseen that the scanning and/or scrubbing may be performed at the request of the destination and/or source devices, such as where the scanning/scrubbing environment 80 is included in a business service that may be called by customers on an "on demand" basis. Moreover, transmission between devices or components triggering the scanning and/or scrubbing process may be synchronous or asynchronous without departing from the spirit of the present inventive concept.

The subject file may also be prepared for sensitive data scanning. More particularly, various formatting and pre-processing operations instructed by a computer program of the present inventive concept may be performed on subject data elements to prepare for scanning in the scanning/scrubbing environment 80. For instance, all special characters may be removed and, in some cases, all characters may be converted to lower case. Moreover, spaces between portions of each single subject data element may be removed. Spaces may also or alternatively be relied on to further divide each single subject data element into several subject data elements. In one embodiment, the pre-processing and formatting of the subject file mirrors that performed on the reference table and/or reference subcombinations.

The method 100 may also include identifying and generating 105 a match record for each match between a reference subcombination and a data entry. In one embodiment, the list of reference subcombinations and the subject file may be forwarded to an analysis module within the scanning/scrubbing environment 80. Each reference data element of each reference subcombination may be checked against the subject file. Initially, any reference subcombination containing a reference data element that does not have a match anywhere in the subject file may be disregarded for purposes of generating match records at this stage. Alternatively, each reference data element of the reference data table may be checked against the subject file prior to generation of the list of reference subcombinations, with any unmatched reference data element being removed from consideration for the list of reference subcombinations. In such embodiments, the processor(s) responsible for generating the preliminary subcombinations may merely refuse to generate a subcombination in each instance in which one of the reference data elements would be a null (i.e., where the corresponding cell contains no value, for instance because it was removed based on this initial match checking process).

The analysis module may compare each reference subcombination against each data entry, in each case by comparing each of the reference data elements of the reference subcombination against each of the subject data elements of the data entry at least until one of the reference data elements does not match any subject data element of the data entry. It is foreseen that all reference data elements of each reference subcombination may be checked against all subject data elements of each data entry without departing from the spirit of the present inventive concept. A match record may be generated for each instance in which one of the data entries contains all reference data elements of one reference subcombination.

It is foreseen that additional pre-processing may be employed to reduce the number of false negatives generated according to embodiments of the present inventive concept as well. For example, an equivalency algorithm may be used to transform all known variations on a single concept into a single variation selected to represent that concept. For instance, the single concept may be a date. Known variations in presentation of a date may include XX/XX/XX, X/XX/XX, XX/X/XX, X/X/XX, XX/XX/XXXX, X/XX/XXXX, XX/X/XXXX and X/X/XXXX. The single variation chosen to represent all dates may be XXDXXDXXXX, where each "X" is a number. Each missing number encountered in one of the first two delimited fields may be replaced by a "0", and a missing prefix in the final delimited field may replaced by either a "19" or a "20," depending on a series of rules incorporated into the equivalency algorithm. For another example, full and abbreviated versions of a given name may be related to a single representative, such as where each instance of "Tom," "Thomas," "Tomas," or "Tommy" is converted to a single representative variation such as "Tom". In this manner, fewer false negatives may be realized through ensuring that data elements that are formatted or represented differently, but are essentially of the same data type, appear in the same format or variation prior to comparing a subject file against reference subcombinations.

In addition, in one embodiment the subject file will be further processed for comparison against the reference subcombinations. Namely, a list of subject subcombinations may be generated by generating a plurality of first preliminary subject subcombinations. Each first preliminary subject subcombination may include a combination of subject data elements from the same data entry, with the number of subject data elements per preliminary subject subcombination equal to the number of reference data elements in each of the reference subcombinations against which it is to be compared. The list of subject subcombinations may include all permutations of subject data elements having that number of elements from each data entry. Moreover, a control character may be appended to each preliminary subject subcombination to indicate its origin in the subject file and/or the type of data for at least one of the subject data elements comprising the subject subcombination. Table 4 illustrates an exemplary list of subject subcombinations.

TABLE 4

| | | | | |
|---|---|---|---|---|
| Mike,Burns, 0 | Jack,White,0 | Burns,family,0 | 3yo,white,0 | New,cust,0 |
| Mike,cust,0 | Jack,last,0 | Burns,sister,0 | 3yo,sedan,0 | New,11166,0 |
| Mike,since,0 | Jack,claim,0 | Burns,99210,0 | 3yo,purch,0 | New,SSN,0 |
| Mike,51680,0 | Jack,21398,0 | Burns,home,0 | 3yo,51680,0 | New,621551680,0 |
| Burns,Mike,0 | White,Jack,0 | family,Burns,0 | white,3yo,0 | cust,New,0 |
| Burns,cust,0 | White,last,0 | family,sister,0 | white,sedan,0 | cust,11166,0 |
| Burns,sinee, 0 | White,claim,0 | family,99210,0 | white,purch,0 | cust,SSN,0 |
| Burns,51680,0 | White,21398,0 | family,home,0 | white,51680,0 | cust,621551680,0 |
| cust,Mike, 0 | last,Jack,0 | sister,Burns, 0 | sedan,3yo,0 | 11166,New,0 |
| cust,Burns, 0 | last,White,0 | sister,family,0 | sedan,white,0 | 11166,cust,0 |
| cust,since,0 | last,claim,0 | sister,99210,0 | sedan,purch,0 | 11166,SSN,0 |
| cust,51680,0 | last,21398,0 | sister,home,0 | sedan,51680,0 | 11 166,621551680,0 |
| since,Mike, 0 | claim,Jack,0 | 99210,Burns,0 | purch,3yo,0 | SSN,New,0 |
| since,Burns, 0 | claim,White,0 | 99210,family,0 | purch,white,0 | SSN,cust,0 |
| since,cust,0 | claim,last,0 | 99210,sister,0 | purch,sedan,0 | SSN,11166,0 |
| since,51680,0 | claim,21398,0 | 99210,home,0 | purch,51680,0 | SSN,621551680,0 |
| 51680,Mike,0 | 21398,Jack,0 | home,Burns,0 | 51680,3yo,0 | 621551680,New,0 |
| 51680,Burns,0 | 21398,White,0 | home,family,0 | 51680,white,0 | 621551680,cust,0 |
| 51680,cust,0 | 21398,last,0 | home,sister,0 | 51680,sedan,0 | 621551680, 11166,0 |
| 51680,since,0 | 21398,claim,0 | home,99210,0 | 51680,purch,0 | 621551680,SSN,0 |

The identification and matching step 105 in embodiments comprising a list of subject subcombinations such as that illustrated in Table 4 may include combining the list of reference subcombinations with the list of subject subcombinations. Table 5 below illustrates a combined list of subcombinations.

TABLE 5

| | | | |
|---|---|---|---|
| 99210,51680, 110 | Santo,11166,103 | sister,99210, 0 | cust,SSN,0 |
| 99210,21551,210 | Santo,621551680,203 | sister,home, 0 | cust,621551680,0 |
| 99210,Burns,310 | 621551680, 11166,1020 | 99210,Burns,0 | 11166,New,0 |
| 99210,202139821,2010 | 621551680, 11166,120 | 99210,family,0 | 11166,cust,0 |
| 51680,99210,101 | 621551680,34470,220 | 99210,sister,0 | 11166,SSN,0 |
| 51680,202139821,201 | 621551680,Santo,320 | 99210,home,0 | 11166,621551680,0 |
| 21551,99210, 102 | Mike,Burns,0 | home,Burns, 0 | SSN,New,0 |
| 21551,202139821,202 | Mike,cust,0 | home,family,0 | SSN,cust,0 |
| Burns,99210, 103 | Mike,since,0 | home,sister,0 | SSN,11166,0 |

TABLE 5-continued

| | | | |
|---|---|---|---|
| Burns,202139821,203 | Mike,51680,0 | home,99210,0 | SSN,621551680,0 |
| 202139821,99210,1020 | Burns,Mike,0 | 3yo,white,0 | 621551680,New,0 |
| 202139821,51680,120 | Burns,cust,0 | 3yo,sedan,0 | 621551680,cust,0 |
| 202139821,21551,220 | Burns,since,0 | 3yo,purch,0 | 621551680, 11166,0 |
| 202139821,Burris,320 | Burns,51680,0 | 3yo,51680,0 | 621551680,SSN,0 |
| 51680,21398, 110 | cust,Mike, 0 | white,3y0,0 | Jack,White,0 |
| 51680,99210,210 | cust,Burns,0 | white,sedan,0 | Jack,last,0 |
| 51680,White,310 | cust,since,0 | white, purch,0 | Jack,claim,0 |
| 51680,495672216,2010 | cust,51680,0 | white,51680,0 | Jack,21398,0 |
| 21398,51680,101 | since,Mike, 0 | sedan,3yo,0 | White,Jack,0 |
| 21398,495672216,201 | since,Burns, 0 | sedan,white,0 | White,last,0 |
| 99210,51680, 102 | since,cust,0 | sedan,purch,0 | White,claim,0 |
| 99210,495672216,202 | since,51680,0 | sedan,51680,0 | White,21398,0 |
| White,51680, 103 | 51680,Mike,0 | purch,3yo,0 | last,Jack,0 |
| White,495672216,203 | 51680,Burns,0 | purch,white,0 | last,White,0 |
| 495672216,51680,1020 | 51680,cust,0 | purch,sedan,0 | last,claim,0 |
| 495672216,21398,120 | 51680,since,0 | purch,51680,0 | last,21398,0 |
| 495672216,99210,220 | Burns,family,0 | 51680,3yo,0 | claim,Jack,0 |
| 495672216,White,320 | Burns,sister, 0 | 51680,white,0 | claim,White,0 |
| 11166,11166,110 | Burns,99210,0 | 51680,sedan,0 | claim,last, 0 |
| 11166,34470,210 | Burns,home, 0 | 51680,purch,0 | claim,21398,0 |
| 11166,Santo,310 | family,Burns,0 | New,cust,0 | 21398,Jack,0 |
| 11166,621551680,2010 | family,sister,0 | New,11166,0 | 21398,White,0 |
| 11166,11166,101 | family,99210,0 | New,SSN,0 | 21398,last,0 |
| 11166,621551680,201 | family,home,0 | New,621551680,0 | 21398,claim,0 |
| 34470,11166,102 | sister,Burns,0 | cust,New,0 | |
| 34470,621551680,202 | sister,family,0 | cust,11166,0 | |

To facilitate identification and matching 105 in embodiments including a combined list of subcombinations, the combined list may be sorted to place like subcombinations together in groups. Each group may be subsorted by descending order of control character, as illustrated in FIG. 9.

FIG. 9 illustrates in strikethrough groups of subcombinations that begin with a first-listed reference subcombination, which may be determined using the control character appended to the end of the subcombinations. These groups are disregarded and the combined list may be subsorted again, this time in ascending order of control character, as illustrated in Table 7 below FIG. 10.

FIG. 10 illustrates in strikethrough groups of subcombinations that begin with a first-listed subject subcombination, which, again, may be determined using the control character appended to the end of the subcombinations.

A match record may be generated for each group that includes at least one reference subcombination and at least one subject subcombination and/or for each instance of a match. In FIG. 10, eight match records may be generated from six matched groups, one record for each instance in which all reference data elements of a reference subcombination are found in a data entry. FIG. 11 illustrates the matched subcombinations gleaned from FIGS. 9 and 10.

The aforementioned embodiments comprise an improved method for quickly and efficiently utilizing computer algorithms for identifying sensitive data with a lower return of false positives. Nonetheless, as can be seen by the results of FIG. 11, false positives are still possible even with an improved method. Namely, the subject subcombination "51680,white,0" originated within the fourth row of the subject file of Table 3. There, "white" referred to the color of a car and "51680" was a date of purchase. Therefore, the data entry of the fourth row of the subject file of Table 3 was in fact a false positive match against the information provided for an individual described in the third row of Table 1. Improved pre-processing and formatting rules and/or increasing the number of data elements n– per subcombination may, for example, decrease the likelihood of false positives.

Returning to FIG. 2, the modules of the scanning/scrubbing environment 80 may perform a number of operations based on the match record(s) resulting from the identification and match record generation step 105. To facilitate such operations, each match record may include a description of the underlying subcombinations that led to the record's generation. For instance, each match record may include metadata regarding the reference and subject data elements of the underlying subcombinations. The metadata may include a description of the locations in the reference table and subject file from which the reference and subject data elements were respectively taken. For example, the metadata may reference a key or other means for tracking a row location or similar specific location within a table or file.

The metadata may also include additional detail about the columns from which the reference and/or subject data elements (if structured) were taken, which may include associated column label(s). Where the metadata includes column labels or other indicators that may provide context for the meaning of a subject data element, such metadata may be used to reduce false positive matches. For instance, in the example discussed above, if the "white" subject data element had originated in a structured data table column labeled "Car Color," further processing of the match records may permit identification of a false positive match against a reference subcombination in which "white" was a "Mother's Maiden Name."

It is also foreseen that, where a subject file comprises a structured data table, subcombinations may initially be segregated so that each reference data element originating in a column of the reference table with a particular column label may only be matched against subject data elements originating in a column in the subject file having the same or similar column label. Essentially, the combined list of subcombinations may initially be ordered into sublists, with each sublist including only those subcombinations having data elements originating in columns having similar column labels. For example, a reference subcombination with data elements respectively originating in "Account No." and "Last Name" columns may be placed in the same sublist as a subject subcombination with data elements respectively originating in "Account #" and "Name" columns. In such embodiments, even if a subject subcombination includes the same data elements as a reference combination, the two subcombinations may not be matched unless they appear in the same sublist. It is noted here that, with respect to generating sublists prior to match identification, any single subcombination may belong in multiple sublists, and may be duplicated accordingly for sublist population.

Particularly where column label or similar metadata is not available for the subject file—for instance where the subject file is not structured, as shown in Table 3—it is foreseen that additional analysis of subject data elements adjacent to matched subject data elements of a subject subcombination may be performed on match records to reduce false positives. For example, the analysis module of scanning/scrubbing environment 80 may be configured to automatically process data entries that led to at least one match record by examining subject data elements that are adjacent to the matched subject data elements. This additional analysis may help to determine if the matched subject data elements are more or less likely to be of the data type identified in the column labels of the reference data table from which the reference data elements of the matched reference subcombination were taken. In the example discussed above, automated analysis of the adjacent subject data elements of the fourth row of Table 3 may yield a conclusion that "white" was in fact a reference to a car's color and that 5/16/80 was a purchase date, leading to a conclusion that the matched data entry was a false positive. Moreover, a machine-learning algorithm may be employed to improve such automated analysis, preferably with the assistance of human input regarding the accuracy of the algorithm's initial conclusions regarding how a subject data element should be categorized.

The metadata introduced above may be generated and/or recorded and associated with the subcombinations at various times throughout execution of the method 100 without departing from the spirit of the present inventive concept.

The module(s) of the scanning/scrubbing environment 80 may generate an alert for transmission to one or more other devices and/or to one or more users, for example to the origin or source device. The module(s) may also or alternatively revise the contents of the subject file, for example by obscuring or masking sensitive subject data elements, encrypting all or part of the subject file, removing sensitive subject data elements, or taking similar actions to reduce the risk presented by the presence and/or storage of the sensitive information. The module(s) may also or alternatively log the match records for future reference. The module(s) may also perform additional analysis on the subject file based on the match records, for example to determine relationships between the data entries and/or subject data elements, to categorize and/or classify the subject data elements, to structure and/or key the subject data elements to one another, or to otherwise build a better understanding of the contents of the subject file. The results of such further analyses may include graphs, models and/or text portrayals of the composition of the subject file. The module(s) may also generate one or more reports including all or portions of match records and/or metadata alone or in connection with the logging processes outlined above. The reports may also include control characters, system, subsystem qualifier table(s), and the like without departing from the spirit of the present inventive concept. The reports may also list the match records by data entry in descending order of total number of reference subcombinations matched, which may provide a better ranking of the relative sensitivity of the data entries.

More specifically with reference to FIG. 1, the third device 40 may generate an alert relating to the match records and transmit the alert to the first device 20 (the source of the subject file) and/or to the second device 30 (the destination of the subject file). Log records and/or reports may optionally also be transmitted to the first device 20 and/or second device 30. The third device 40 may also transmit a revised or unrevised subject file to the second device 30, and may transmit the revised subject file to the first device 20. Additional analyses and results thereof, including graphs, models and/or text portrayals, may also be transmitted to the first device 20 and/or to the second device 30. All or some of the foregoing data and information may be stored at one or more of memory locations 84, 64, 66, 68, 70, 78.

It should be noted here that the various modules depicted in the first environment, second environment and/or the scanning/scrubbing environment may be encoded across the same or contiguous portions of a computer program and/or may be spread across multiple disparate code segments without departing from the spirit of the present inventive concept, it being understood that their arrangement in FIG. 2 is only one possible configuration among many.

The computer-implemented method may include more, fewer, or alternative actions, including those discussed elsewhere herein.

III. Exemplary System

Figure 4:
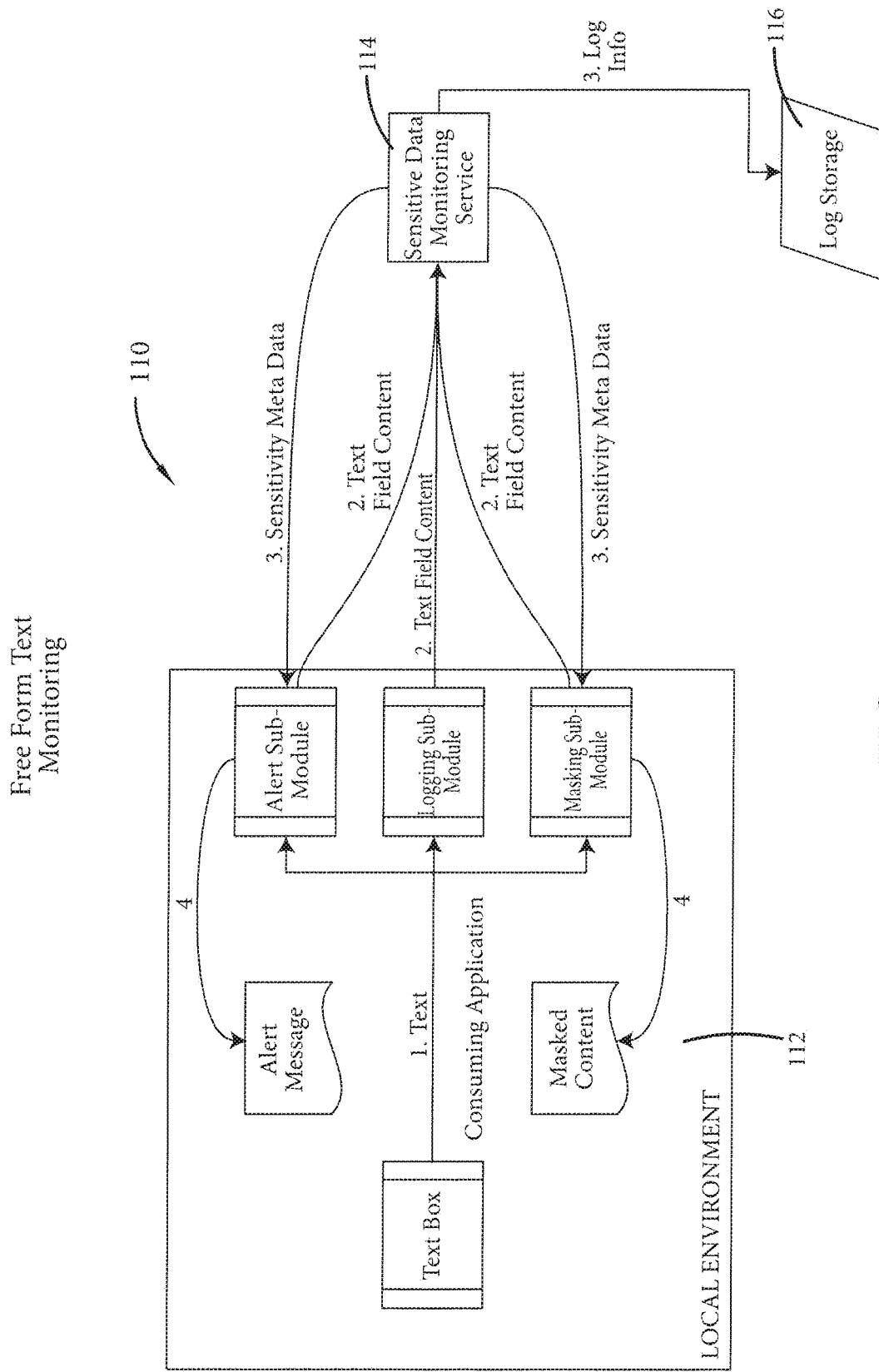
FIG. 4 is a block diagram of an exemplary embodiment of the system for monitoring data entered into a free form text form.

Referring to FIG. 4, a block diagram of a system 110 for monitoring data entered into a free form text form is shown according to one embodiment of the present invention. The system 110 may include a local environment 112 instructed by an entry application to display a text box along with data and/or text entered by a user at the user interface. The local environment 112 may also include alert, logging and masking sub-modules configured for transmitting instructions to the entry application and to at least one storage device in communication with the local environment 112. Each sub-module is also configured for transmitting data to and receiving data from a sensitive data monitoring service server 114 (SDMSS). The SDMSS 114 may also be configured for transmission of data and instructions to a log storage device 116.

The system may be employed in various computer and network environments without departing from the spirit of the present inventive concept. As discussed in more detail below, monitoring data entered into a free form text form using a reference data table according to embodiments of the present inventive concept may be conducted locally on text being prepared for local storage and/or remote transmission, remotely on locally entered data being prepared for local storage and/or remote transmission, and/or in other system configurations.

The components illustrated in FIG. 4 may be implemented variously across one or more of devices 20, 30, 40, which may communicate via communication network 50 shown in FIG. 1. Referring to FIGS. 1 and 4 together, local environment 112 may be implemented by first device 20, log storage device 116 may be implemented by the second device 30, and SDMSS 114 may be implemented by the third device 40. It is foreseen that in certain embodiments the functions described as being performed by two or more of the local environment 112, log storage device 116 and SDMSS 114 illustrated in FIG. 4 may be implemented by a single device. Further, data transmission operations do not necessarily connote transmissions external to a device or between devices.

Broadly, a computer program m accordance with one embodiment of the present invention may include a computer usable storage medium (e.g., standard random access memory (RAM), an optical disc, a universal serial bus (USB) drive, or the like) having computer-readable program code embodied therein, wherein the computer-readable program code is adapted to be executed by one or more of the processors 24, 34, 44 configured to facilitate the functionality described herein. In this regard, the program code may be implemented in any desired language, and may be implemented as machine code, assembly code, byte code, interpretable source code or the like (e.g., via C, C++, Java, Actionscript, Objective-C, Javascript, CSS, XML).

Broadly, the system 110 may be configured substantially as follows. Processor 44 may be configured to prepare, and/or memory element 42 may be configured to store, a reference table. The reference table may comprise a grid of data cells containing reference data elements. The grid may be arranged in columns and rows, with each row relating to one of a plurality of data subjects. Each data subject may be a person—whether an individual or corporate entity—or a group of logically related individuals and/or entities such as a family. The data subjects may be customers of a business venture. The reference table may be structured with column labels indicating the nature of the information or data contained therein. FIG. 12 illustrates an exemplary reference table.

Each row of the reference table of FIG. 12 relates to an individual data subject. Each column includes a label indicating a data type and a preliminary control character (in parentheses) signifying that each reference data element taken therefrom is of that data type and is from the reference table.

A reference table of the present inventive concept may include more or fewer columns and/or rows without departing from the spirit of the present inventive concept. Moreover, the reference table may be prepared by joining and merging multiple constituent reference tables. For instance, the table of FIG. 12 may be prepared by joining a first constituent reference table containing account number, date of birth and zip code information with a second constituent reference table containing account number, maiden name, and social security number information.

Processor 44 may also be configured for designation of one or more columns containing or likely containing unique data regarding the plurality of data subjects. With reference to FIG. 12, the Customer Account Number and Social Security Number columns may reasonably be expected to contain data unique to the data subjects of the reference table because each number is typically assigned to one and only one individual and/or account. In contrast, the Date of Birth, Zip Code of Birthplace and Mother's Maiden Name columns can reasonably be expected to contain data shared by several data subjects and may therefore be considered non-unique in this example.

It should be noted here that selecting unique data and/or primary columns will be within the capabilities of one having ordinary skill following review of this specification, it being understood that the threshold between "unique" and "non-unique" data may vary depending on project parameters, tolerance for false negatives and/or false positives, subject file(s) at issue, and other factors. Moreover, column designation may be carried out in any order with respect to the other functions of the system 110 described herein, including prior to formation of the reference table and/or following identification and generation of match records, without departing from the spirit of the present inventive concept.

It should also be noted here that processor 44 may be configured for de-selecting one or more columns containing non-personal and/or unspecific information for exclusion from the subcombination generation process outlined below, without departing from the spirit of the present inventive concept. For example, the Zip Code of Birthplace column may be considered in some embodiments (not illustrated herein) to be too unspecific to be considered for inclusion in certain scanning and/or scrubbing inquiries.

The data contained in one or more of the constituent reference tables and the reference table may originate in one or more of electronic memory elements 22, 32, 42 of devices 20, 30, 40. Referring to FIG. 1, the data in the constituent reference tables and/or reference table may be stored in memory element 42. The data stored at memory element 42 may be periodically refreshed from a production data location (not shown), which may be remote from device 40. The designation of primary column(s) (and/or de-selection of non-personal information column(s)) may occur at a user interface of third device 40 and/or may be automated via execution of executable code by processor 44. Automated column designation and/or de-selection may involve keyword recognition—for example, within column labels of the reference table—to identify data types pre-determined as likely to be unique, such as "account number" and/or "social security number," and/or that are likely to be non-personal, such as "policy type" (not shown). Moreover, a machine-learning algorithm may be employed by processor 44 to improve such keyword recognition by calculating rates of false positives and/or false negatives realized through use of various keyword matching strategies, patterns and/or keywords.

The processor 44 may also be configured to generate a list of reference subcombinations from the reference table. To generate the list, the processor 44 may be configured to prepare first preliminary subcombinations based on a first primary column, such as the Customer Account Number column of FIG. 12. The first preliminary subcombinations may include all combinations, from within each row of the reference table, of a reference data element from the first primary column and a reference data element from another column. For instance, the contents of FIG. 12 may be used to generate first preliminary subcombinations of the reference data elements within each row in the Customer Account Number column and a second column, such as the Date of Birth column. Additional preliminary subcombinations may also be generated within each row for all other combinations of reference data elements from the Customer Account Number column and the other columns of FIG. 12. Likewise, a second primary column, for example the Social Security Number column of FIG. 12, may be used with another column of the reference table to generate second preliminary subcombinations. Additional preliminary subcombinations may also be generated within each row for all other combinations of reference data elements from the Social Security Number column and the other columns of FIG. 12. The preliminary subcombinations generated according to this process may include all possible permutations—excluding those that would include nullified or de-selected elements—from within each row of reference data elements gathered from a primary column and any other column of the reference table.

The processor 44 may also be configured to assign a control character to each preliminary reference subcombination. The control character may signify the origin of the reference subcombination as being the reference table. The control character may also signify the type of data for one or more of the reference data elements comprising the reference subcombination. In the example derived from FIG. 12, a control character may comprise a concatenation of preliminary control characters indicated in parentheses in the column labels. For instance, the primary column Account Number is assigned preliminary control character "10" and non-primary column Date of Birth is assigned preliminary control character "1". For each reference subcombination including Account Number followed by Date of Birth, control character "101" is appended following the pair of reference data elements. Conversely, for each reference subcombination including Date of Birth followed by Account Number, control character "110" is appended following the pair of reference data elements. In this manner, a list of reference subcombinations with appended control characters may be generated.

It is foreseen that various scales, types and character combinations—including numeric, alphabetic and/or alphanumeric systems—may be used to generate control character sets for meaningfully representing all or some of the information discussed herein without departing from the spirit of the present inventive concept. FIG. 13 illustrates an exemplary list of reference subcombinations with Customer Account Number and Social Security Number columns designated respectively as the first and second primary columns.

It should be noted that the processor 44 may be configured to conduct various formatting and pre-processing operations, as instructed by a computer program of the present inventive concept, on reference data elements during generation of the list of reference subcombinations. For instance, as illustrated in FIG. 13, all special characters may be removed. In some cases, all characters may be converted to lower case. Moreover, spaces between portions of each single reference data element may be removed. Spaces may also or alternatively be relied on to further divide each single reference data element into several reference data elements for use independently in forming reference subcombinations. Following pre-processing and pairing of the reference data elements, they may be combined to form reference subcombinations delimited using commas and appended with a control character, for example as seen in FIG. 13.

It should be noted that generating a list of reference subcombinations may be performed by one or more of electronic processors 24, 34, 44 of devices 20, 30, 40, without departing from the spirit of the present inventive concept. Referring to FIG. 4, it is again noted that the list of reference subcombinations may be generated by SDMSS 114 implemented by processor 44.

The processor 44 may also be configured to access a subject file comprising a plurality of data entries. The subject file may be stored at one or more of electronic memory elements 22, 32, 42 of devices 20, 30, 40. Referring to FIG. 4, the local environment 112 may be implemented by the first device 20, and the subject file may be stored by memory element 22 and/or transmitted to device 40 by communication element 26 (see converging "2. Text Field Content" arrows) following entry at the user interface of device 20.

The subject file may contain a plurality of data entries, each of which may be presumed to contain logically related subject data elements (for example subject data elements regarding the same individual or entity). Data entries may be delineated across rows within a data table, delimited by a hard return, or otherwise segmented from one another. In the free form text monitoring embodiment described herein, data entries may be delimited by the processor 44 through processing of metadata accompanying the subject file. Referring to FIG. 4, the subject file metadata may be included in "2. Text Field Content" data flows.

The metadata accompanying the subject file may be generated by the entry application, and may include data entry timestamps, information to help delineate between user sessions and/or user source files from which the subject file was derived, and/or similar evidence providing context behind the circumstances of entry of the data in the subject file sufficient to delimit the data entries from one another. More particularly, processor 44 may delimit data entries in such scenarios by executing one or more pre-processing modules (not shown) comprising at least one delimitation rule for processing subject file metadata to determine data entry boundaries. The determination may include analyzing the metadata to determine breaks in data entry where it is likely the user entering the data intended to transition between data subjects. It is also foreseen that the entry application may instruct processor 24 to determine data entry boundaries in a similar fashion without departing from the spirit of the present inventive concept.

Each subject data element may be delimited from the others within a data entry by commas, spaces, semi-colons, columns, or by other known means. An exemplary subject file is illustrated as in FIG. 14, comprising a plurality of free hand (unstructured) notes regarding customers. The notes of the subject file are separated into rows of data entries, with subject data elements separated in each entry by spaces.

The exemplary subject file may comprise one or more constituent subject files gathered from one or more memory locations. One or both of processors 24, 44 may gather and/or join constituent subject files to form the subject file. For instance, the subject file may include the contents of a constituent subject file originating in a first user session of the entry application at device 20 and containing the first two rows of FIG. 14 and the contents of another constituent subject file originating in a second user session of the entry application and containing the last three rows of FIG. 14.

Processor 24 of first device 20 may be configured to initiate transmission of all or part of the subject file to the third device 40. Transmission by the first device 20 may trigger electronic processor 44 to implement the monitoring processes described herein to scan and otherwise treat the subject file for sensitive data prior to, simultaneously with and/or following storage of the subject file at a storage device (not shown) that is in communication with and/or that is within the local environment 112.

The processor 44 may be configured to prepare the subject file for sensitive data scanning. More particularly, various formatting and pre-processing operations instructed by a computer program of the present inventive concept may be performed by processor 44 on subject data elements to prepare for scanning. For instance, all special characters may be removed and, in some cases, all characters may be converted to lower case. Moreover, spaces between portions of each single subject data element may be removed. Spaces may also or alternatively be relied on to further divide each single subject data element into several subject data elements. In one embodiment, the pre-processing and formatting of the subject file mirrors that performed on the reference table and/or reference subcombinations.

The processor 44 may also be configured to identify and generate a match record for each match between a reference subcombination and a data entry. In one embodiment, the processor 44 checks each reference data element of each reference subcombination against the subject file. Initially, any reference subcombination containing a reference data element that does not have a match anywhere in the subject file may be disregarded for purposes of generating match records at this stage. Alternatively, each reference data element of the reference data table may be checked against the subject file prior to generation of the list of reference subcombinations, with any unmatched reference data element being removed from consideration for the list of reference subcombinations. In such embodiments, the processor 44 may merely refuse to generate a subcombination in each instance in which one of the reference data elements would be a null (i.e., where the corresponding cell contains no value, for instance because it was removed based on this initial match checking process).

The processor 44 may also be configured to compare each reference subcombination against each data entry. In each case, the processor 44 may compare each of the reference data elements of the reference subcombination against each of the subject data elements of the data entry at least until one of the reference data elements does not match any subject data element of the data entry. It is foreseen that all reference data elements of each reference subcombination may be checked against all subject data elements of each data entry without departing from the spirit of the present inventive concept. The processor 44 may be configured to generate a match record for each instance in which one of the data entries contains all reference data elements of one reference subcombination.

It is foreseen that the processor 44 may perform additional pre-processing to reduce the number of false negatives generated according to embodiments of the present inventive concept as well. For example, an equivalency algorithm may be executed by the processor 44 to transform all known variations on a single concept in a subject file and/or reference table into a single variation selected to represent that concept. For instance, the single concept may be a date. Known variations in presentation of a date may include XX/XX/XX, X/XX/XX, XX/X/XX, X/X/XX, XX/XX/XXXX, X/XX/XXXX, XX/X/XXXX and X/X/XXXX. The single variation chosen to represent all dates may be XXDXXDXXXX, where each "X" is a number. For each missing number encountered in one of the first two delimited fields a "0" prefix may be added, and either a "19" or a "20" may be substituted for a missing prefix in the final delimited field (depending on a series of rules incorporated into the equivalency algorithm for determining which century is likely being referenced). For another example, full and abbreviated versions of a given name may be related to a single representative, such as where each instance of "Tom," "Thomas," "Tomas," or "Tommy" is converted to a single representative variation such as "Tom". In this manner, fewer false negatives may be realized through ensuring that data elements that are formatted or represented differently, but are essentially of the same data type, appear in the same format or variation prior to comparing a subject file against reference subcombinations.

In addition, in one embodiment the processor 44 may further process the subject file to prepare for comparison against the reference subcombinations. Namely, the processor 44 may be configured to generate a list of subject subcombinations by generating a plurality of first preliminary subject subcombinations. Each first preliminary subject subcombination may include a combination of subject data elements from the same data entry, with the number of subject data elements per preliminary subject subcombination equal to the number of reference data elements in each of the reference subcombinations against which it is to be compared. The list of subject subcombinations may include all permutations of subject data elements having that number of elements from each data entry. Moreover, the processor 44 may be configured to append a control character to each preliminary subject subcombination to indicate its origin in the subject file and/or the type of data for at least one of the subject data elements comprising the subject subcombination. FIG. 15 illustrates an exemplary list of subject subcombinations.

In embodiments comprising a list of subject subcombinations such as that illustrated in FIG. 15, the processor 44 may be configured to combine the list of reference subcombinations with the list of subject subcombinations to identify matches. FIG. 16 illustrates a combined list of subcombinations.

To facilitate identification and matching in embodiments including a combined list of subcombinations, the processor 44 may be configured to sort the combined list to place like subcombinations together in groups. The processor 44 may be configured to subsort each group by descending order of control character, as illustrated in FIG. 17.

FIG. 17 illustrates in strikethrough groups of subcombinations that begin with a first-listed reference subcombination, which may be determined using the control character appended to the end of the subcombinations. The processor 44 may be configured to disregard these groups, and the processor 44 may be configured to subsort the combined list, this time in ascending order of control character, as illustrated in FIG. 18.

FIG. 18 illustrates in strikethrough groups of subcombinations that begin with a first-listed subject subcombination, which, again, may be determined using the control character appended to the end of the subcombinations.

The processor 44 may also be configured to generate a match record for each group that includes at least one reference subcombination and at least one subject subcombination and/or for each instance of a match. In FIG. 18, eight match records may be generated from six matched groups, one record for each instance in which all reference data elements of a reference subcombination are found in a data entry. FIG. 19 illustrates the matched subcombinations gleaned from FIGS. 17 and 18.

The aforementioned comprise an improved system 110 for quickly and efficiently utilizing computer algorithms for identifying sensitive data with a lower return of false positives. Nonetheless, as can be seen by the results of FIG. 19, false positives are still possible even with an improved system. Namely, the subject subcombination "51680,white, 0" originated within the fourth row of the subject file of FIG. 14. There, "white" referred to the color of a car and "51680" was a date of purchase. Therefore, the data entry of the fourth row of the subject file of FIG. 14 was in fact a false positive match against the information provided for an individual described in the third row of FIG. 12. Improved pre-processing and formatting rules and/or increasing the number of data elements n− per subcombination may, for example, decrease the likelihood of false positives.

Returning to FIG. 4, the SDMSS 114 may be configured to transmit match records to log storage device 116 ("3. Log Info") and/or back to local environment 112 ("3. Sensitivity Metadata"). The sub-modules of the local environment 112 may instruct processor 24 to perform a number of operations based on the match record(s) generated by SDMSS 114. To facilitate such operations, processor 44 may be configured to supplement each match record with additional metadata describing the underlying subcombinations that led to the record's generation. For instance, each match record may include metadata regarding the reference and subject data elements of the underlying subcombinations. The metadata may include a description of the locations in the reference table and subject file from which the reference and subject data elements were respectively taken. For example, the metadata may reference a key or other means for tracking a row location or similar specific location within a table or file.

The metadata may also include additional detail about the columns from which the reference and/or subject data elements (if structured) were taken, which may include associated column label(s). Where the metadata includes column labels or other indicators that may provide context for the meaning of a subject data element, such metadata may be used to reduce false positive matches. For instance, in the example discussed above, if the "white" subject data element had originated in a structured data table column labeled "Car Color," further processing of the match records by processor 44 may permit identification of a false positive match against a reference subcombination in which "white" was a "Mother's Maiden Name."

It is also foreseen that, where a subject file comprises a structured data table, subcombinations may initially be segregated so that each reference data element originating in a column of the reference table with a particular column label may only be matched against subject data elements originating in a column in the subject file having the same or similar column label. Essentially, the combined list of subcombinations may initially be ordered into sublists, with each sublist including only those subcombinations having data elements originating in columns having similar column labels. For example, a reference subcombination with data elements respectively originating in "Account No." and "Last Name" columns may be placed in the same sublist as a subject subcombination with data elements respectively originating in "Account #" and "Name" columns. In such embodiments, even if a subject subcombination includes the same data elements as a reference combination, the two subcombinations may not be matched unless they appear in the same sublist. It is noted here that, with respect to generating sublists prior to match identification, any single subcombination may belong in multiple sublists, and may be duplicated accordingly for sublist population.

Particularly where column label or similar metadata is not available for the subject file for—instance where the subject file is not structured as shown in FIG. 14—it is foreseen that one or both of processors 24, 44 may be configured to perform additional analysis of subject data elements adjacent to matched subject data elements of a subject subcombination to reduce false positives. For example, one or both of processors 24, 44 may be configured to automatically process data entries that led to at least one match record by examining subject data elements that are adjacent to the matched subject data elements. This additional analysis may help to determine if the matched subject data elements are more or less likely to be of the data type identified in the column labels of the reference data table from which the reference data elements of the matched reference subcombination were taken. In the example discussed above, automated analysis of the adjacent subject data elements of the fourth row of FIG. 14 may yield a conclusion that "white" was in fact a reference to a car's color and that 5/16/80 was a purchase date, leading to a conclusion that the matched data entry was a false positive. Moreover, a machine-learning algorithm may be employed by one or both of processors 24, 44 to improve such automated analysis, and may take into account human input regarding the accuracy of the algorithm's initial conclusions regarding how a subject data element should be categorized.

The metadata introduced above may be generated and/or recorded and associated with the subcombinations at various times throughout the operations performed by system 110 without departing from the spirit of the present inventive concept.

The sub-module(s) of the local environment 112 may instruct processor 24 to generate an alert for storage in a storage device in communication therewith, and/or for transmission to one or more other devices and/or to one or more users via the user interface of device 20. The sub-module(s) may also or alternatively instruct processor 24 to revise the contents of the subject file, for example by obscuring or masking sensitive subject data elements, encrypting all or part of the subject file, removing sensitive subject data elements, or taking similar actions to reduce the risk presented by the presence and/or storage of the sensitive information. The sub-module(s) may also or alternatively instruct processor 24 to log the match records for future reference.

The sub-modules may also instruct processor 24 to perform additional analysis on the subject file based on the match records. For example, such analysis may determine relationships between the data entries and/or subject data elements, may categorize and/or classify the subject data elements, may structure and/or key the subject data elements to one another, or may otherwise build a better understanding of the contents of the subject file and/or operation of the entry application. The results of such further analyses may include graphs, models and/or text portrayals of the composition of the subject file.

The sub-modules may also instruct processor 24 to generate one or more reports including all or portions of match records and/or metadata alone or in connection with the logging processes outlined above. The reports may also include control characters, system, subsystem qualifier table(s), and the like without departing from the spirit of the present inventive concept. The reports may also list the match records by data entry in descending order of total number of reference subcombinations matched, which may provide a better ranking of the relative sensitivity of the data entries.

More specifically with reference to FIG. 1, the first device 20 may generate an alert relating to the match records and transmit the alert to the third device 40 and/or to a user of the first device 20 via the user interface. The processor 24 may be configured to accept user input to alter portions of the subject file identified in the alert, for example through deleting such portions. Log records and/or reports may optionally also be transmitted to the third device 40 and/or stored at a storage device in communication with the local environment 112. The first device 20 may also transmit a revised subject file to the third device 40. Additional analyses and results thereof, including graphs, models and/or text portrayals, may also be transmitted to the third device 40. All or some of the foregoing data and information may be stored at one or more storage devices in communication with the local environment 112.

It should be noted here that the various sub-modules and functions depicted and described in connection with the local environment 112 and/or SDMSS 114 may be encoded across the same or contiguous portions of a computer program and/or may be spread across multiple disparate code segments without departing from the spirit of the present inventive concept, it being understood that their arrangement in FIG. 4 is only one possible configuration among many.

The system may include more, fewer, or alternative components and/or perform more, fewer, or alternative actions, including those discussed elsewhere herein, and particularly those discussed in the preceding sections describing a computer-implemented scanning and/or scrubbing method.

IV. Exemplary Computer-Readable Medium

Figure 5:
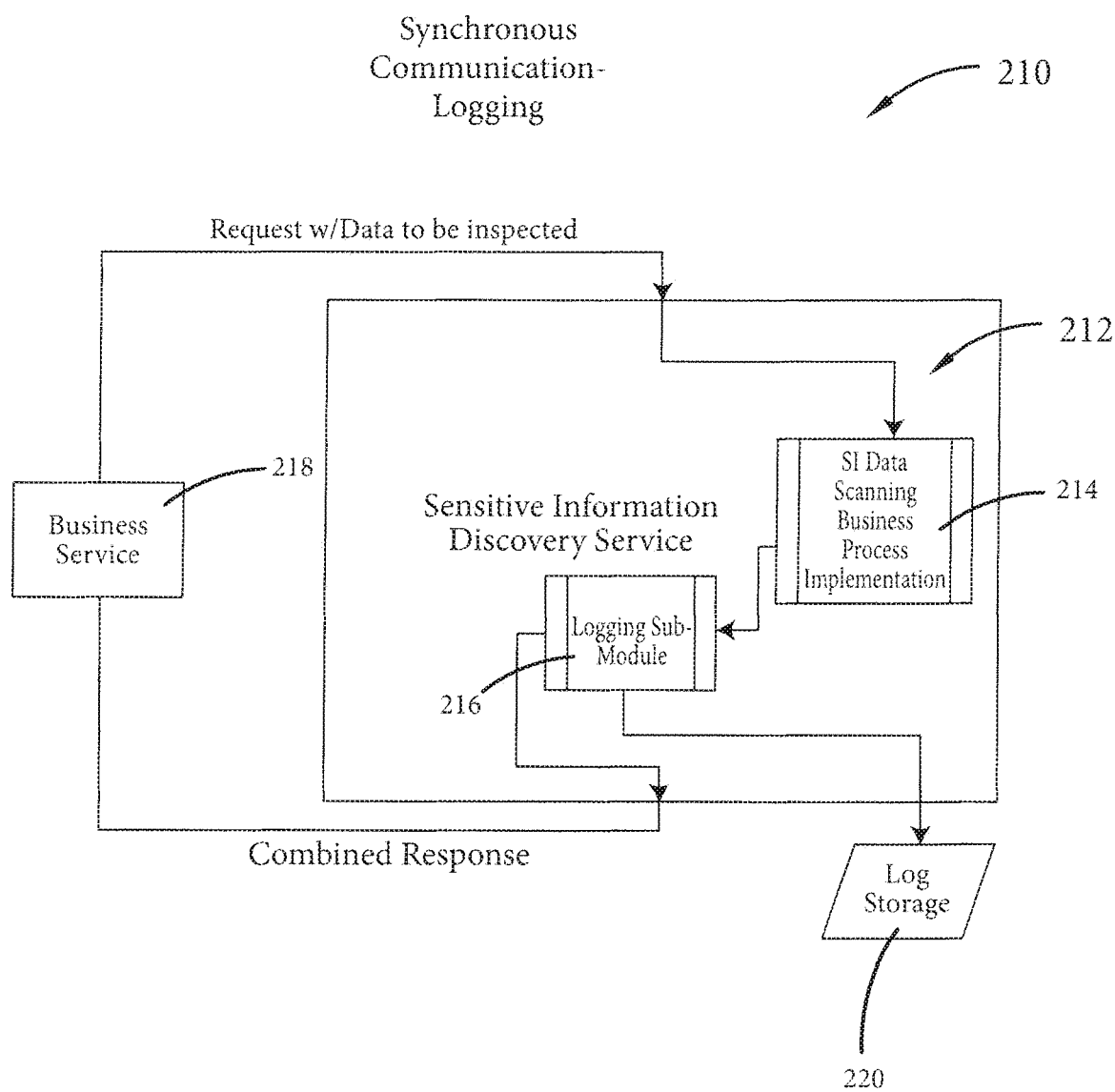
FIG. 5 is a block diagram of an exemplary embodiment of the system for synchronous scrubbing and/or scanning of data.

Referring to FIG. 5, an exemplary non-transitory computer-readable medium with an executable program 212 stored thereon for identifying sensitive information in connection with saving or storing it—e.g., by performing synchronous communication logging—is illustrated in a block diagram form. The program 212 may include an SI Data Scanning Business Process Implementation module 214 (SIBPM) and a logging sub-module 216. The program 212 may be configured to instruct a processor to communicate with a business service server 218 and/or a log storage device 220.

The executable program 212 may be employed in various computer and network environments without departing from the spirit of the present inventive concept. As discussed in more detail below, identifying and logging sensitive information in a subject file using a reference data table according to embodiments of the present inventive concept may be conducted locally on locally stored subject files, locally on text being prepared for local storage and/or remote transmission, remotely on locally stored subject files, remotely on files exchanged between or received from remote systems, remotely on text being prepared for local storage and/or remote transmission, and in other system configurations.

The components illustrated in FIG. 5 may be implemented variously across one or more of devices 20, 30, 40, which may communicate via communication network 50 shown in FIG. 1. Referring to FIGS. 1 and 5 together, business service server 218 may be implemented by first device 20, log storage device 220 may be implemented by the second device 30, and the executable program 212 may be implemented by the third device 40. It is foreseen that in certain embodiments the functions described herein as performed by two or more of the business service server 218, log storage device 220 and executable program 212 illustrated in FIG. 5 may be implemented by a single device. Further, data transmission operations do not necessarily connote transmissions external to a device or between devices.

The executable program 212 in accordance with one embodiment of the present invention may be adapted to be executed by processor 44 and be configured to facilitate the functionality described herein. In this regard, the program code may be implemented in any desired language, and may be implemented as machine code, assembly code, byte code, interpretable source code or the like (e.g., via C, C++, Java, Actionscript, Objective-C, Javascript, CSS, XML).

Broadly, the program 212 may be configured substantially as follows. Program 212 may be configured to instruct processor 44 to prepare, and/or to instruct memory element 42 to store, a reference table. The reference table may comprise a grid of data cells containing reference data elements. The grid may be arranged in columns and rows, with each row relating to one of a plurality of data subjects. Each data subject may be a person—whether an individual or corporate entity—or a group of logically related individuals and/or entities such as a family. The data subjects may be customers of a business venture. The reference table may be structured with column labels indicating the nature of the information or data contained therein. FIG. 20 illustrates an exemplary reference table.

Each row of the reference table of FIG. 20 relates to an individual data subject. Each column includes a label indicating a data type and a preliminary control character (in parentheses) signifying that each reference data element taken therefrom is of that data type and is from the reference table.

A reference table of the present inventive concept may include more or fewer columns and/or rows without departing from the spirit of the present inventive concept. Moreover, the reference table may be prepared by joining and merging multiple constituent reference tables. For instance, the table in FIG. 20 may be prepared by joining a first constituent reference table containing account number, date of birth and zip code information with a second constituent reference table containing account number, maiden name, and social security number information.

Program 212 may be configured to instruct processor 44 to designate one or more columns containing or likely containing unique data regarding the plurality of data subjects. With reference to FIG. 20, the Customer Account Number and Social Security Number columns may reasonably be expected to contain data unique to the data subjects of the reference table because each number is typically assigned to one and only one individual and/or account. In contrast, the Date of Birth, Zip Code of Birthplace and Mother's Maiden Name columns can reasonably be expected to contain data shared by several data subjects and may therefore be considered non-unique in this example.

It should be noted here that selecting unique data and/or primary columns will be within the capabilities of one having ordinary skill following review of this specification, it being understood that the threshold between "unique" and "non-unique" data may vary depending on project parameters, tolerance for false negatives and/or false positives, subject file(s) at issue, and other factors. Moreover, column designation may be carried out in any order with respect to the other functions of the program 212 described herein, including prior to formation of the reference table and/or following identification and generation of match records, without departing from the spirit of the present inventive concept.

It should also be noted here that program 212 may be configured to instruct processor 44 to de-select one or more columns containing non-personal and/or unspecific information for exclusion from the subcombination generation process outlined below, without departing from the spirit of the present inventive concept. For example, the Zip Code of Birthplace column may be considered in some embodiments (not illustrated herein) to be too unspecific to be considered for inclusion in certain scanning and/or scrubbing inquiries.

The data contained in one or more of the constituent reference tables and the reference table may originate in one or more of electronic memory elements 22, 32, 42 of devices 20, 30, 40. Referring to FIG. 1, the data in the constituent reference tables and/or reference table may be stored in memory element 42. The data stored at memory element 42 may be periodically refreshed from a production data location (not shown), which may be remote from device 40. The designation of primary column(s) (and/or de-selection of non-personal information column(s)) may occur at a user interface of third device 40 and/or may be automated via execution of executable program 212. Automated column designation and/or de-selection may involve keyword recognition—for example, within column labels of the reference table—to identify data types pre-determined as likely to be unique, such as "account number" and/or "social security number," and/or that are likely to be non-personal, such as "policy type" (not shown). Moreover, a machine-learning algorithm, which may be integrated with program 212, may be employed by processor 44 to improve such keyword recognition by calculating rates of false positives and/or false negatives realized through use of various keyword matching strategies, patterns and/or keywords.

The program 212 may be configured to instruct processor 44 to generate a list of reference subcombinations from the reference table. To generate the list, the program 212 may be configured to instruct processor 44 to prepare first preliminary subcombinations based on a first primary column, such as the Customer Account Number column of FIG. 20. The first preliminary subcombinations may include all combinations, from within each row of the reference table, of a reference data element from the first primary column and a reference data element from another column. For instance, the contents of FIG. 20 may be used to generate first preliminary subcombinations of the reference data elements within each row in the Customer Account Number column and a second column, such as the Date of Birth column. Additional preliminary subcombinations may also be generated within each row for all other combinations of reference data elements from the Customer Account Number column and the other columns of FIG. 20. Likewise, a second primary column, for example the Social Security Number column of FIG. 20, may be used with another column of the reference table to generate second preliminary subcombinations. Additional preliminary subcombinations may also be generated within each row for all other combinations of reference data elements from the Social Security Number column and the other columns of FIG. 20. The preliminary subcombinations generated according to this process may include all possible permutations—excluding those that would include nullified or de-selected elements—from within each row of reference data elements gathered from a primary column and any other column of the reference table.

The program 212 may be configured to instruct processor 44 to assign a control character to each preliminary reference subcombination. The control character may signify the origin of the reference subcombination as being the reference table. The control character may also signify the type of data for one or more of the reference data elements comprising the reference subcombination. In the example derived from FIG. 20, a control character may comprise a concatenation of preliminary control characters indicated in parentheses in the column labels. For instance, the primary column Account Number is assigned preliminary control character "10" and non-primary column Date of Birth is assigned preliminary control character "1". For each reference subcombination including Account Number followed by Date of Birth, control character "101" is appended following the pair of reference data elements. Conversely, for each reference subcombination including Date of Birth followed by Account Number, control character "110" is appended following the pair of reference data elements. In this manner, a list of reference subcombinations with appended control characters may be generated.

It is foreseen that various scales, types and character combinations—including numeric, alphabetic and/or alpha-numeric systems—may be used to generate control character sets for meaningfully representing all or some of the information discussed herein without departing from the spirit of the present inventive concept. FIG. 21 illustrates an exemplary list of reference subcombinations with Customer Account Number and Social Security Number columns designated respectively as the first and second primary columns.

It should be noted that the program 212 may be configured to instruct processor 44 to conduct various formatting and pre-processing operations on reference data elements during generation of the list of reference subcombinations. For instance, as illustrated in FIG. 21 above, all special characters may be removed. In some cases, all characters may be converted to lower case. Moreover, spaces between portions of each single reference data element may be removed. Spaces may also or alternatively be relied on to further divide each single reference data element into several reference data elements for use independently in forming reference subcombinations. Following pre-processing and pairing of the reference data elements, they may be combined to form reference subcombinations delimited using commas and appended with a control character, for example as seen in FIG. 21.

It should be noted that generating a list of reference subcombinations may be performed by one or more of electronic processors 24, 34, 44 of devices 20, 30, 40, without departing from the spirit of the present inventive concept. Referring to FIGS. 1 and 5, it is again noted that the list of reference subcombinations may be generated by processor 44 under the instruction of program 212.

The program 212 may be configured to instruct processor 44 to access a subject file comprising a plurality of data entries. The subject file may be stored at one or more of electronic memory elements 22, 32, 42 of devices 20, 30, 40. Referring to FIG. 5, business service server 218 may be implemented by the first device 20, and the subject file may be stored by memory element 22 and/or transmitted to device 40 by communication element 26 (see "Request w/Data to be inspected" arrow) following entry at the user interface of device 20, a user request to device 20 attempting a save operation on the subject file, an entry application's attempt to auto-save the subject file, or other triggering event. The transmission of the subject file and/or access by processor 44 of the subject file may be on a synchronous basis.

The subject file may contain a plurality of data entries, each of which may be presumed to contain logically related subject data elements (for example subject data elements regarding the same individual or entity). Data entries may be delineated across rows within a data table, delimited by a hard return, or otherwise segmented from one another. Data entries may be delimited by the program 212, which may be configured to instruct processor 44 to process metadata accompanying the subject file. Referring to FIG. 5, the subject file metadata may be included in "Request w/Data to be inspected" data flows.

The metadata accompanying the subject file may be generated by an entry application, and may include data entry timestamps, information to help delineate between user sessions and/or user source files from which the subject file was derived, and/or similar evidence providing context behind the circumstances of entry of the data in the subject file sufficient to delimit the data entries from one another. More particularly, program 212 may be configured to instruct processor 44 to delimit data entries in such scenarios by executing one or more pre-processing modules (not shown) comprising at least one delimitation rule for processing subject file metadata to determine data entry boundaries. The determination may include analyzing the metadata to determine breaks in data entry where it is likely the user entering the data intended to transition between data subjects. It is also foreseen that the entry application may instruct processor 24 (or another processor if data entry occurred on another device) to determine data entry boundaries in a similar fashion without departing from the spirit of the present inventive concept.

Each subject data element may be delimited from the others within a data entry by commas, spaces, semi-colons, columns, or by other known means. An exemplary subject file is illustrated in FIG. 22, comprising a plurality of free hand (unstructured) notes regarding customers. The notes of the subject file are separated into rows of data entries, with subject data elements separated in each entry by spaces.

The exemplary subject file may comprise one or more constituent subject files gathered from one or more memory locations. One or both of processors 24, 44 may gather and/or join constituent subject files to form the subject file, including pursuant to instruction from executable program 212. For instance, the subject file may include the contents of a constituent subject file originating in a first user session of the entry application at device 20 and containing the first two rows of FIG. 22 and the contents of another constituent subject file originating in a second user session of the entry application and containing the last three rows of FIG. 22.

Processor 24 of first device 20 may be configured to transmit multiple subject files to the third device 40 on a synchronous basis. Transmission by the first device 20 may trigger program 212 to instruct processor 44 to implement the logging processes described herein to scan and otherwise treat the subject file for sensitive data prior to, simultaneously with and/or following storage of the subject file at a storage device (not shown) that is in communication with and/or that is within the device 20 and/or another source device running the entry application.

The program 212 may be configured to instruct processor 44 to prepare the subject file for sensitive data scanning. More particularly, various formatting and pre-processing operations may be performed under instruction by program 212 on subject data elements to prepare for scanning. For instance, all special characters may be removed and, in some cases, all characters may be converted to lower case. Moreover, spaces between portions of each single subject data element may be removed. Spaces may also or alternatively be relied on to further divide each single subject data element into several subject data elements. In one embodiment, the pre-processing and formatting of the subject file mirrors that performed on the reference table and/or reference subcombinations.

The program 212 may be configured to instruct processor 44 to identify and generate a match record for each match between a reference subcombination and a data entry. In one embodiment, the program 212 may be configured to instruct processor 44 to check each reference data element of each reference subcombination against the subject file. Initially, any reference subcombination containing a reference data element that does not have a match anywhere in the subject file may be disregarded for purposes of generating match records at this stage. Alternatively, each reference data element of the reference data table may be checked against the subject file prior to generation of the list of reference subcombinations, with any unmatched reference data element being removed from consideration for the list of reference subcombinations. In such embodiments, the program 212 may be configured to instruct processor 44 to abstain from generating a subcombination in each instance in which one of the reference data elements would be a null (i.e., where the corresponding cell contains no value, for instance because it was removed based on this initial match checking process).

The program 212 may be configured to instruct processor 44 to compare each reference subcombination against each data entry. In each case, the program 212 may be configured to instruct processor 44 to compare each of the reference data elements of the reference subcombination against each of the subject data elements of the data entry at least until one of the reference data elements does not match any subject data element of the data entry. It is foreseen that all reference data elements of each reference subcombination may be checked against all subject data elements of each data entry without departing from the spirit of the present inventive concept. The program 212 may be configured to instruct processor 44 to generate a match record for each instance in which one of the data entries contains all reference data elements of one reference subcombination.

It is foreseen that the program 212 may be configured to instruct processor 44 to perform additional pre-processing to reduce the number of false negatives generated according to embodiments of the present inventive concept as well. For example, an equivalency algorithm may be executed by the program 212 to instruct processor 44 to transform all known variations on a single concept in a subject file and/or reference table into a single variation selected to represent that concept. For instance, the single concept may be a date. Known variations in presentation of a date may include XX/XX/XX, X/XX/XX, XX/X/XX, X/X/XX, XX/XX/XXXX, X/XX/XXXX, XX/X/XXXX and X/X/XXXX. The single variation chosen to represent all dates may be XXDXXDXXXX, where each "X" is a number. For each missing number encountered in one of the first two delimited fields a "0" prefix may added, and either a "19" or a "20" may be substituted for a missing prefix in the final delimited field (depending on a series of rules incorporated into the equivalency algorithm for determining which century is likely being referenced). For another example, full and abbreviated versions of a given name may be related to a single representative, such as where each instance of "Tom," "Thomas," "Tomas," or "Tommy" is converted to a single representative variation such as "Tom". In this manner, fewer false negatives may be realized through ensuring that data elements that are formatted or represented differently, but are essentially of the same data type, appear in the same format or variation prior to comparing a subject file against reference subcombinations.

In addition, in one embodiment the program 212 may be configured to instruct processor 44 to further process the subject file to prepare for comparison against the reference subcombinations. Namely, the program 212 may be configured to instruct processor 44 to generate a list of subject subcombinations by generating a plurality of first preliminary subject subcombinations. Each first preliminary subject subcombination may include a combination of subject data elements from the same data entry, with the number of subject data elements per preliminary subject subcombination equal to the number of reference data elements in each of the reference subcombinations against which it is to be compared. The list of subject subcombinations may include all permutations of subject data elements having that number of elements from each data entry. Moreover, the program 212 may be configured to instruct processor 44 to append a control character to each preliminary subject subcombination to indicate its origin in the subject file and/or the type of data for at least one of the subject data elements comprising the subject subcombination. FIG. 23 illustrates an exemplary list of subject subcombinations.

In embodiments comprising a list of subject subcombinations such as that illustrated in FIG. 23, the program 212 may be configured to instruct processor 44 to combine the list of reference subcombinations with the list of subject subcombinations to identify matches. FIG. 24 illustrates a combined list of subcombinations.

To facilitate identification and matching in embodiments including a combined list of subcombinations, the program 212 may be configured to instruct processor 44 to sort the combined list to place like subcombinations together in groups. The program 212 may be configured to instruct processor 44 to subsort each group by descending order of control character, as illustrated in FIG. 25.

FIG. 25 illustrates in strikethrough groups of subcombinations that begin with a first-listed reference subcombination, which may be determined using the control character appended to the end of the subcombinations. The program 212 may be configured to instruct processor 44 to disregard these groups, and the program 212 may be configured to instruct processor 44 to subsort the combined list, this time in ascending order of control character, as illustrated in FIG. 26.

FIG. 26 illustrates in strikethrough groups of subcombinations that begin with a first-listed subject subcombination, which, again, may be determined using the control character appended to the end of the subcombinations.

The program 212 may be configured to instruct processor 44 to generate a match record for each group that includes at least one reference subcombination and at least one subject subcombination and/or for each instance of a match. In FIG. 26, eight match records may be generated from six matched groups, one record for each instance in which all reference data elements of a reference subcombination are found in a data entry. FIG. 27 illustrates the matched subcombinations gleaned from FIGS. 25 and 26.

The aforementioned comprise an improved program 212 for quickly and efficiently utilizing computer algorithms for identifying sensitive data with a lower return of false positives. Nonetheless, as can be seen by the results of FIG. 27, false positives are still possible even with an improved program. Namely, the subject subcombination "51680, white,0" originated within the fourth row of the subject file of FIG. 22. There, "white" referred to the color of a car and "51680" was a date of purchase. Therefore, the data entry of the fourth row of the subject file of FIG. 22 was in fact a false positive match against the information provided for an individual described in the third row of FIG. 20. Improved pre-processing and formatting rules and/or increasing the number of data elements n- per subcombination may, for example, decrease the likelihood of false positives.

Returning to FIG. 5, the SIBPM 214 may be configured to transmit match records to logging sub-module 216, and from there to log storage device 220 and/or back to business service server 218 (see "Combined Response" data stream). The SIBPM 214 may instruct processor 44 to perform a number of operations based on the match record(s). To facilitate such operations, program 212 may also be configured to instruct processor 44 to supplement each match record with additional metadata describing the underlying subcombinations that led to the record's generation. For instance, each match record may include metadata regarding the reference and subject data elements of the underlying subcombinations. The metadata may include a description of the locations in the reference table and subject file from which the reference and subject data elements were respectively taken. For example, the metadata may reference a key or other means for tracking a row location or similar specific location within a table or file.

The metadata may also include additional detail about the columns from which the reference and/or subject data elements (if structured) were taken, which may include associated column label(s). Where the metadata includes column labels or other indicators that may provide context for the meaning of a subject data element, such metadata may be used to reduce false positive matches. For instance, in the example discussed above, if the "white" subject data element had originated in a structured data table column labeled "Car Color," further processing of the match records by program 212 may permit identification of a false positive match against a reference subcombination in which "white" was a "Mother's Maiden Name."

It is also foreseen that, where a subject file comprises a structured data table, subcombinations may initially be segregated so that each reference data element originating in a column of the reference table with a particular column label may only be matched against subject data elements originating in a column in the subject file having the same or similar column label. Essentially, the combined list of subcombinations may initially be ordered into sublists, with each sublist including only those subcombinations having data elements originating in columns having similar column labels. For example, a reference subcombination with data elements respectively originating in "Account No." and "Last Name" columns may be placed in the same sublist as a subject subcombination with data elements respectively originating in "Account #" and "Name" columns. In such embodiments, even if a subject subcombination includes the same data elements as a reference combination, the two subcombinations may not be matched unless they appear in the same sublist. It is noted here that, with respect to generating sublists prior to match identification, any single subcombination may belong in multiple sublists, and may be duplicated accordingly for sublist population.

Particularly where column label or similar metadata is not available for the subject file—for instance where the subject file is not structured as shown in FIG. 22—it is foreseen that one or both of processors 24, 44 may be configured to perform additional analysis of subject data elements adjacent to matched subject data elements of a subject subcombination to reduce false positives. Such analysis may be under the instruction of program 212. For example, one or both of processors 24, 44 may automatically process data entries that led to at least one match record by examining subject data elements that are adjacent to the matched subject data elements. This additional analysis may help to determine if the matched subject data elements are more or less likely to be of the data type identified in the column labels of the reference data table from which the reference data elements of the matched reference subcombination were taken. In the example discussed above, automated analysis of the adjacent subject data elements of the fourth row of FIG. 22 may yield a conclusion that "white" was in fact a reference to a car's color and that 5/16/80 was a purchase date, leading to a conclusion that the matched data entry was a false positive. Moreover, a machine-learning algorithm may be employed with the program 212 to improve such automated analysis, and may take into account human input regarding the accuracy of the algorithm's initial conclusions regarding how a subject data element should be categorized.

The metadata introduced above may be generated and/or recorded and associated with the subcombinations at various times throughout the operations performed by program 212 without departing from the spirit of the present inventive concept.

The program 212 may instruct processor 44 to generate an alert for storage in a storage device in communication therewith, such as in log storage device 220, and/or for transmission to one or more other devices and/or to one or more users via a user interface of device 20. The program 212 may also or alternatively instruct processor 44 to revise the contents of the subject file, for example by obscuring or masking sensitive subject data elements, encrypting all or part of the subject file, removing sensitive subject data elements, or taking similar actions to reduce the risk presented by the presence and/or storage of the sensitive information. The program 212 may also or alternatively instruct processor 44 to log the match records for future reference.

The program 212 may also or alternatively instruct processor 44 to perform additional analysis on the subject file based on the match records. For example, such analysis may determine relationships between the data entries and/or subject data elements, may categorize and/or classify the subject data elements, may structure and/or key the subject data elements to one another, or may otherwise build a better understanding of the contents of the subject file. The results of such further analyses may include graphs, models and/or text portrayals of the composition of the subject file.

The program 212 may also instruct processor 44 to generate one or more reports including all or portions of match records and/or metadata alone or in connection with the logging processes outlined above. The reports may also include control characters, system, subsystem qualifier table(s), and the like without departing from the spirit of the present inventive concept. The reports may also list the match records by data entry in descending order of total number of reference subcombinations matched, which may provide a better ranking of the relative sensitivity of the data entries.

More specifically with reference to FIGS. 1 and 5, the third device 40 may generate an alert relating to the match records and transmit the alert to the first device 20 and/or to a user of the first device 20 via the user interface. The program 212 may be configured to instruct processor 44 to accept user input to alter portions of the subject file identified in the alert, for example through deleting such portions. Log records and/or reports may optionally also be transmitted to the first device 20 and/or stored at a storage device in communication with the third device 40, such as the log storage device 220. The third device 40 may also transmit a revised subject file to the first device 20. Additional analyses and results thereof, including graphs, models and/or text portrayals, may also be transmitted to the first device 20. All or some of the foregoing data and information may be stored at one or more storage devices in communication with the program 212.

It should be noted here that the various functions depicted and described in connection with the program 212, including SIBPM 214, may be encoded across the same or contiguous portions of a computer program and/or may be spread across multiple disparate code segments without departing from the spirit of the present inventive concept, it being understood that their arrangement in FIG. 5 is only one possible configuration among many.

The executable program may include more, fewer, or alternative components and/or perform more, fewer, or alternative actions, including those discussed elsewhere herein, and particularly those discussed in the preceding sections such as those describing a computer-implemented scanning and/or scrubbing method.

V. Exemplary Embodiments

The solution may provide for scanning and/or scrubbing large and even unstructured subject data stores quickly and efficiently, with a low rate of false positives. Additional embodiments may comprise systems implementing an executable program in the manner described in the preceding sections of this disclosure in conjunction with one or more of the functions and/or components described below.

Figure 6:
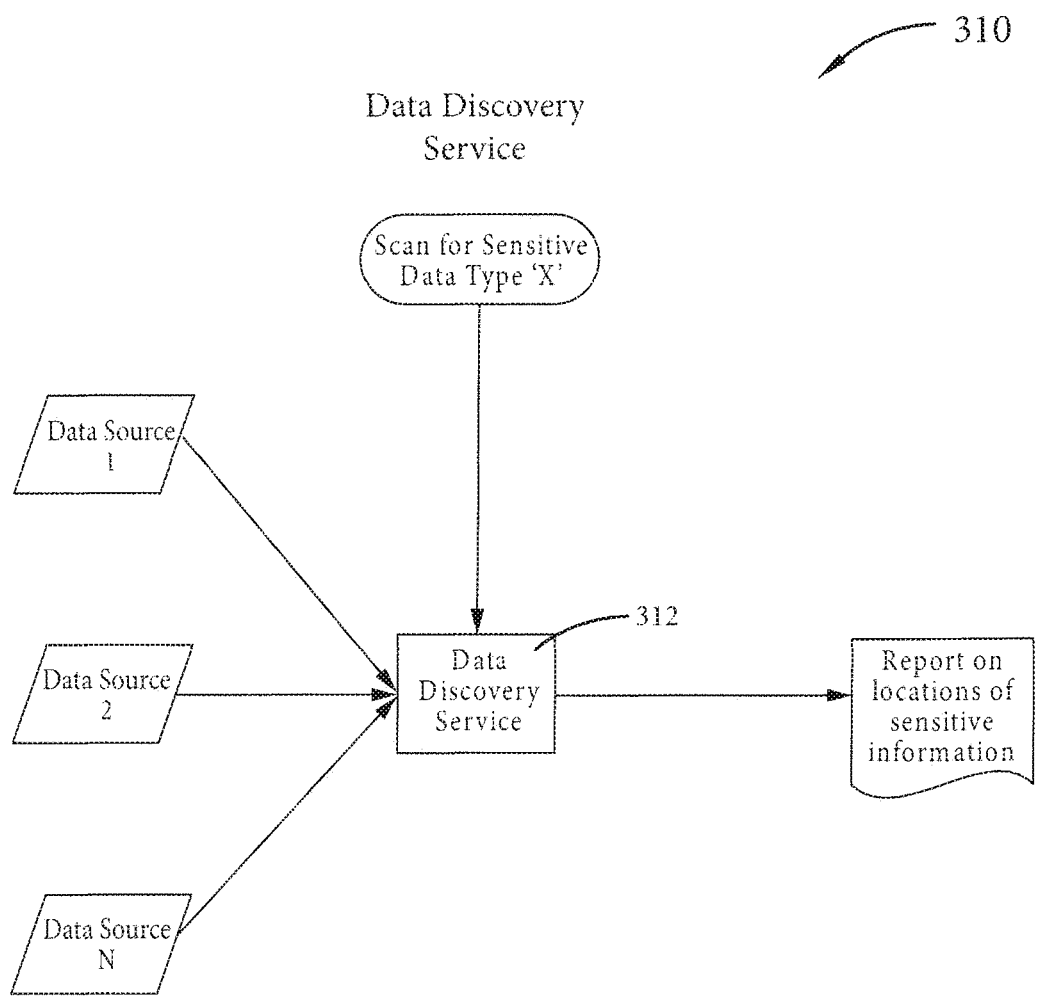
FIG. 6 is a block diagram of an exemplary embodiment of the system for a data discovery service.

Referring to FIG. 6, a Data Discovery Service system 310 may include a plurality of data sources including Data Source 1 and Data Source 2, and a Data Discovery Service server 312 configured to store and/or execute and/or implement instructions provided by an executable program described in the preceding sections. The Data Discovery Service server 312 may also store one or more constituent reference tables, reference tables and/or production reference data, and/or may periodically download one or more of these from a remote server (not shown).

The Data Discovery Service server 312 may synchronously and/or asynchronously receive from and/or access at one or more of the Data Sources at least one subject file and/or constituent subject file for scrubbing and/or scanning as instructed by the executable program. The reference table and/or columns therein that are used for scanning according to the present inventive concept may be narrow in scope in certain embodiments—for example to include only two specific data types or columns—to enable more specific data discovery. The Data Discovery Service server 312 may also generate reports including subject file metadata such as location of matched sensitive information discovered through scanning by the Data Discovery Service server 312.

Figure 7:
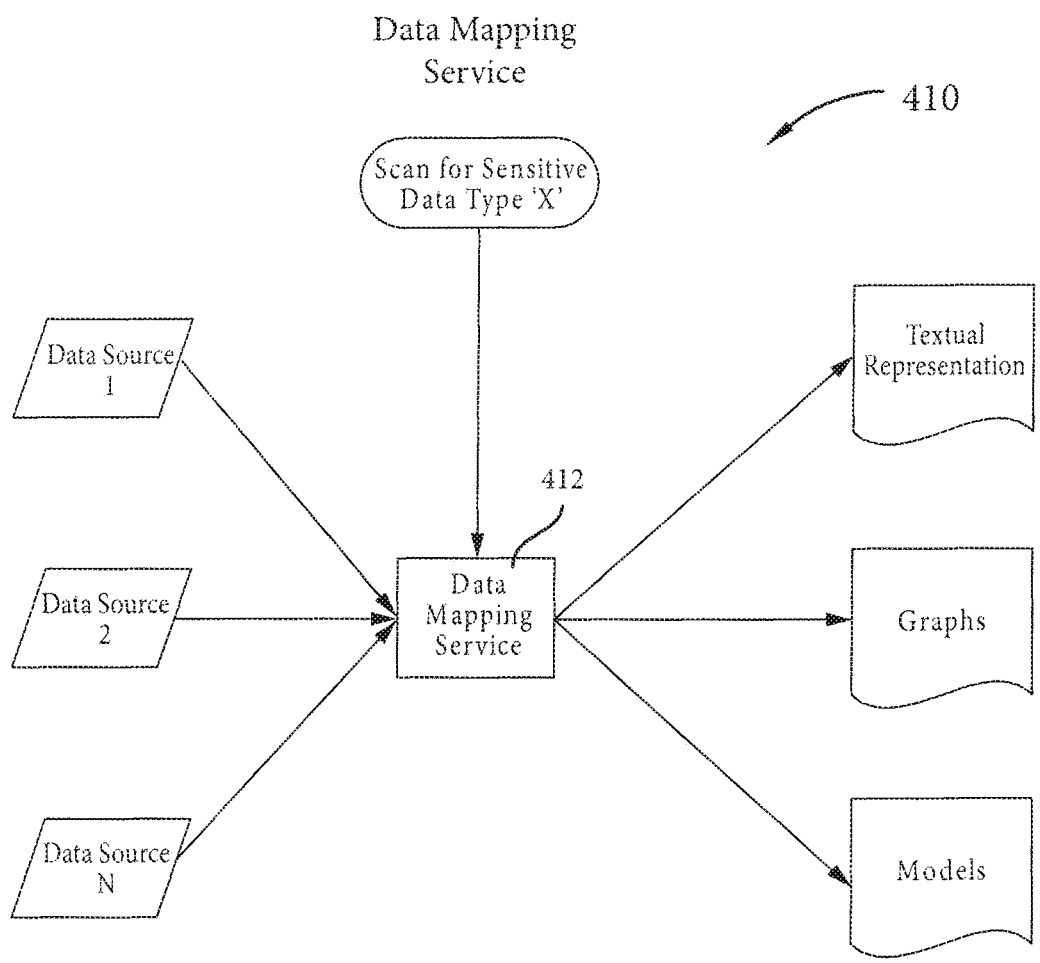
FIG. 7 is a block diagram of an exemplary embodiment of the system for a data mapping service.

Referring to FIG. 7, a Data Mapping Service system 410 may include a plurality of data sources including Data Source 1 and Data Source 2, and a Data Mapping Service server 412 configured to store and/or execute and/or implement instructions provided by an executable program described in the preceding sections. The Data Mapping Service server 412 may also store one or more constituent reference tables, reference tables and/or production reference data, and/or may periodically download one or more of these from a remote server (not shown).

The Data Mapping Service server 412 may synchronously and/or asynchronously receive from and/or access at one or more of the Data Sources at least one subject file and/or constituent subject file for scanning and/or scrubbing and/or mapping as instructed by the executable program. The reference table and/or columns therein that are used for scanning according to the present inventive concept may be narrow in scope in certain embodiments—for example to include only two specific data types or columns—to enable more specific data mapping within one or more of the Data Sources and/or within the subject file(s). The Data Mapping Service server 412 may also generate reports including subject file metadata such as location of matched sensitive information discovered through scanning by the Data Mapping Service server 412. The Data Mapping Service server 412 may also generate textual representations, graphs, and/or models to aid in mapping within one or more of the Data Sources and/or within the subject file(s).

Exemplary Embodiments of Appendix A—Program 1

Appendix A includes three excerpts taken from modules A, B and C of a Program 1. Program 1 includes executable code for performing portions of the operations described herein in connection with embodiments of the present inventive concept within a map reduction framework. Modules A and B are respectively configured to instruct a processor to prepare a reference table and subject file for matching. Module C is configured to instruct a processor to match reference subcombinations and subject subcombinations according to one embodiment of the present inventive concept. A more particular description of some of the operations instructed by the Excerpts is below.

ReferenceKeyValueMapper assumes its reference data is organized in pairs, with a flag digit in the first position, the first sensitive value, the second sensitive value, and commas separating the fields on that line. ReferenceKeyValueMapper re-orders its input file to prepare it for the KeyValueReducer.

SubjectKeyValueMapper assumes that one record is on one line, and that the fields are separated by commas. It further expects the (column) labels to have been passed, along with (column) labels of any id fields. This is so that a specific matched sensitive subject data elements can be reported with the information necessary to isolate the match to the field level. SubjectKeyValueMapper: (1) splits the data line based on the commas (field terminators); (2) finds the primary key values for reporting later, if necessary; (3) converts the data to a table of ids and corresponding values; and (4) for each label and corresponding value, evaluates it against every other label and value (including itself) in order to come up with as many key value pairs as is possible from that line. These pairs, along with a "0" to flag it as subject data, are outputted as the key of one line of output. The value of that line of output is a "0" to flag it as subject data, the column labels, and the primary keys if there are any.

The output of the ReferenceKeyValueMapper and the SubjectKeyValueMapper are merged as part of the MapReduce framework. For each individual pair, the KeyValueReducer is invoked. The KeyValueReducer expects reference data matches to be the first elements inputted (which is enforced through configuration of the map reduce framework). If subject data is encountered first, the batch of data for that pair is thrown out since a match will not be found. If reference data is first, the first bit of the line is evaluated to see if it subject data ("0") or reference data (not "0"). These are stored in separate caches. Once the input data is fully cached, the next piece of the algorithm generates a report from matches between the reference data and subject data. Each reference row is evaluated against each subject row. To have gotten this far, a pair of data must have matched between the reference data and subject data, and hence been sent to this one reducer, which is a method of joining data. The data is re-arranged and massaged into a report format and outputted. This algorithm works well for pairs of data, and is a very fast and efficient algorithm. To expand it to work with trio (fname,lastname,ssn) may involve duplicating one element of each pair (birth date, birthdate, ssn).

Exemplary Embodiments of Appendix A—Program 2

Appendix A includes five excerpts taken from modules A, B, C, D and E of a Program 2. Program 2 includes executable code for performing portions of the operations described herein in connection with embodiments of the present inventive concept within a map reduction framework. Modules A and B are respectively configured to instruct a processor to prepare a reference table and subject file for matching. Modules C and D are configured to instruct a processor to match reference subcombinations and subject subcombinations by analyzing a combined list of subcombinations to respectively identify groups that comprise only subject data or only reference data. Module E further analyzes the remaining data and generates reports regarding matches. A more particular description of some of the operations instructed by the Excerpts is below.

ReferenceValueLineMapper converts each line of the reference data from (sensitive data type, sensitive value 1, sensitive value 2) to two key value pairs, the first being (sensitive value 1, type of reference data|type of reference data, unique id representing line number it came from, reference data order number) and (sensitive value 2, type of reference data|type of reference data, unique id representing line number it came from, reference data order number).

SubjectValueLineMapper converts each line of subject data to multiple lines, in the key value format of (value n, 0|0,unique id representing the line number it came from, column label, primary id(s)).

Before SubjectValueReducer is called, the data is sorted first on primary key and then sub-sorted descending on the data type. SubjectValueReducer throws out any sets of data that contains only subject data (since reference data should be sorted to the front and you need both to have a match).

Before ValueLineReducer, the data is sorted again, first on the primary key and then sub-sorted ascending on the data type. ValueLineReducer throws out any sets that contain only reference data (since subject data should be sorted to the front and you need both to have a match). It then reorders the data to the format of (sensitive data type, subject data line number (unique id actually), reference data line number (unique id actually)|reference data order number, matching sensitive value, subject data column label, primary key(s)).

The ReportReducer caches values by the reference data order numbers. For each matching position 1 and position 2 value, it rearranges the data into the report format of primary ids, match message (example, Client Id+Birth Date), system, subsystem, qualifier, table, format.

Exemplary Embodiments—Commercial Implementation

Broadly, a computer program in accordance with one embodiment of the present invention may include a computer usable storage medium (e.g., standard random access memory (RAM), an optical disc, a universal serial bus (USB) drive, or the like) having computer-readable program code embodied therein, wherein the computer-readable program code is adapted to be executed by one or more of the processors 24, 34, 44 to facilitate the functionality described herein. In this regard, the program code may be implemented in any desired language, and may be implemented as machine code, assembly code, byte code, interpretable source code or the like (e.g., via C, C++, Java, Actionscript, Objective-C, Javascript, CSS, XML).

Referring to FIGS. 1 and 2 together, first environment 62 may be implemented by first device 20, second environment 76 may be implemented by the second device 30, and scanning/scrubbing environment 80 may be implemented by the third device 40. It is foreseen that in certain embodiments two or more of the environments illustrated in FIG. 2 may be implemented by a single device. Further, data transmission operations do not necessarily connote transmissions external to a device or between devices.

Figure 8:
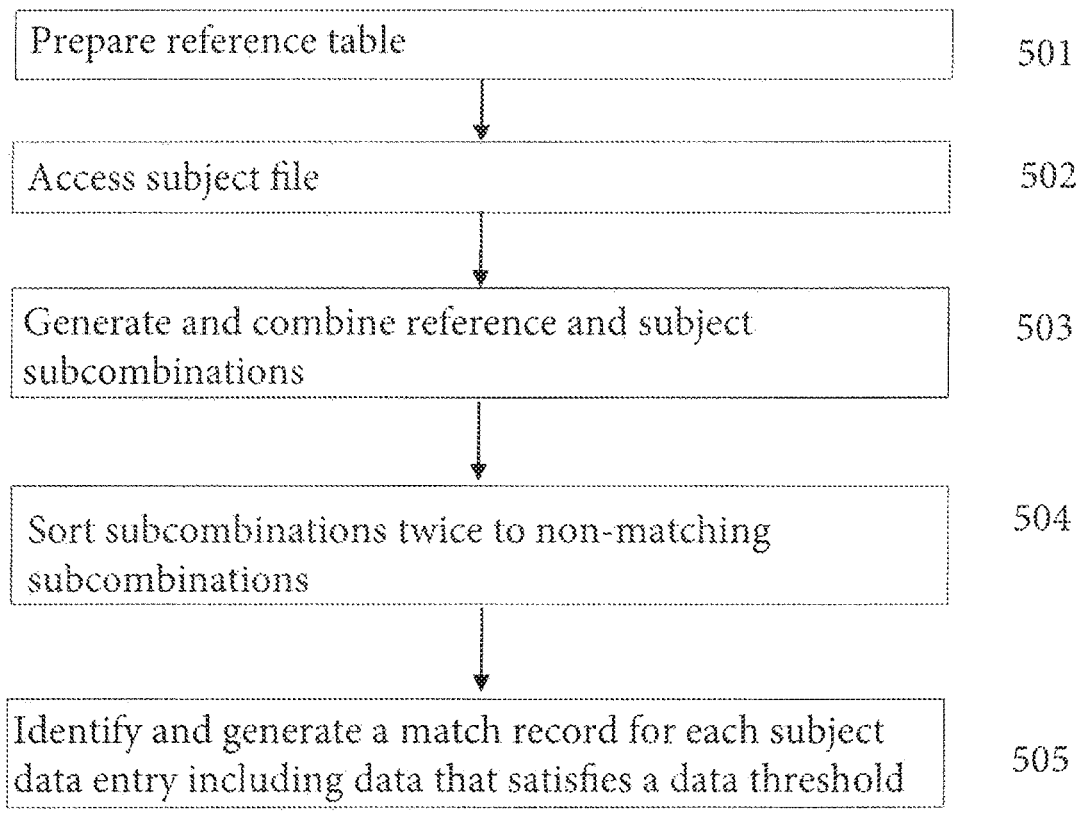
FIG. 8 is a flowchart of an exemplary embodiment of the method for scanning and/or scrubbing data.

Referring to FIG. 8, one embodiment of a computer-implemented method 500 is shown for scanning and/or scrubbing data of sensitive information and/or preventing the introduction of unscrubbed data. For example, the method 500 may be used to scrub data to be exchanged between a source and a destination. The method 500 may be metadata-mediated to at least some extent, as described in more detail below.

Broadly, the method 500 may proceed substantially as follows. A reference table may be prepared 501. The reference table may comprise a grid of data cells containing reference data elements. The grid may be arranged in columns and rows, with each row relating to one of a plurality of data subjects. Each data subject may be a person—whether an individual or corporate entity—or a group of logically related individuals and/or entities such as a family. The data subjects may be customers of a business venture. The reference table may be structured with column labels indicating the nature of the information or data contained therein. FIG. 28 illustrates an exemplary reference table.

Each row of the reference table of FIG. 28 relates to an individual data subject. Each column includes a label indicating a data type. A reference table of the present inventive concept may include more or fewer columns and/or rows without departing from the spirit of the present inventive concept. Moreover, the reference table may be prepared 501 by joining and merging multiple constituent reference tables. For instance, FIG. 28 may be prepared by joining a first constituent reference table containing customer ID, name and social security number with a second constituent reference table containing customer ID, name, birth date and driver's license number information.

Returning to FIG. 8, the method 500 may include accessing 502 a subject file comprising a plurality of data entries. The subject file may be stored at one or more of electronic memory elements 22, 32, 42 of devices 20, 30, 40. The subject file may contain a plurality of data entries, each of which may be presumed to contain logically related subject data elements (for example subject data elements regarding the same individual or entity). Data entries may be delineated across rows within a data table, delimited by a hard return, or otherwise segmented from one another. Each subject data element may be delimited from the others within a data entry by commas, spaces, semi-colons, columns, or by other known means. An exemplary subject file is illustrated as FIG. 29. The data entries of the subject file are separated into rows with subject data elements separated into columns having column labels indicating the nature of the information or data contained therein.

The exemplary subject file may be stored at one or more of data locations 64, 66, 68, 70 in first environment 62, which may be the source of the subject file. Moreover, the subject file may comprise one or more constituent subject files gathered from one or more memory locations. For instance, the subject file may combine the contents of a constituent subject file originating in memory location 64 and containing the first two rows of FIG. 29 with the contents of another constituent subject file originating in memory location 66 and containing the last row of FIG. 29. Constituent subject files may be selected based on their locations within first environment 62. For example, a security audit and/or network mapping process may note that memory locations 64, 66 of first environment 62 are likely vulnerable to the same attack vector. For example, a threat may be identified as originating in communication network 74, at least in part because access barrier 72 does not protect locations 64, 66 from the network 74 in the manner that barrier 72 protects locations 68, 70. This shared vulnerability may lead to combined scanning of constituent subject files stored at locations 64, 66. For example, the constituent subject files from locations 64, 66 may be joined to form the subject file. This combined analysis may lead to a better understanding of the value of the information an attacker is likely to glean from implementing the analyzed attack vector.

First device 20 may initiate transmission of all or part of the subject file to a destination such as the second device 30 via communication network 50, for example on an asynchronous basis. The third device 40 may be interposed along the communication pathway—for example within the communication network 50 and/or within middleware of one or more of devices 20, 30, 40—between memory locations of the first and second devices 20, 30.

Transmission by the first device 20 may trigger electronic processor 44 to implement the processes of the scanning/scrubbing environment 80 to scan and otherwise treat the subject file for sensitive data prior to or simultaneously with its delivery to the second device 30. The scanning and/or scrubbing performed according to computer-implemented method 500 may therefore be performed without the knowledge of the source or destination devices, in certain embodiments. It is also foreseen that the scanning and/or scrubbing may be performed at the request of the destination and/or source devices, such as where the scanning/scrubbing environment 80 is included in a business service that may be called by customers on an "on demand" basis. Moreover, transmission between devices or components triggering the scanning and/or scrubbing process may be synchronous or asynchronous without departing from the spirit of the present inventive concept.

It should be noted that various formatting and pre-processing operations instructed by a computer program of the present inventive concept may also be performed on reference data elements during preparation for data scanning. For instance, all special characters may be removed. In some cases, all characters may be converted to lower case. Moreover, spaces between portions of each single reference data element may be removed. Spaces may also or alternatively be relied on to further divide each single reference data element into several reference data elements for use independently in forming reference subcombinations.

The subject file may also be prepared for sensitive data scanning. More particularly, various formatting and pre-processing operations instructed by a computer program of the present inventive concept may be performed on subject data elements to prepare for scanning in the scanning/scrubbing environment 80. For instance, all special characters may be removed and, in some cases, all characters may be converted to lower case. Moreover, spaces between portions of each single subject data element may be removed. Spaces may also or alternatively be relied on to further divide each single subject data element into several subject data elements. In one embodiment, the pre-processing and formatting of the subject file mirrors that performed on the reference table and/or reference subcombinations.

It is foreseen that additional pre-processing may be employed to reduce the number of false negatives generated according to embodiments of the present inventive concept as well. For example, an equivalency algorithm may be used to transform all known variations on a single concept into a single variation selected to represent that concept. For instance, the single concept may be a date. Known variations in presentation of a date may include XX/XX/XX, X/XX/XX, XX/X/XX, X/X/XX, XX/XX/XXXX, X/XX/XXXX, XX/X/XXXX and X/X/XXXX. The single variation chosen to represent all dates may be XXDXXDXXXX, where each "X" is a number. Each missing number encountered in one of the first two delimited fields may be replaced by a "0", and a missing prefix in the final delimited field may replaced by either a "19" or a "20," depending on a series of rules incorporated into the equivalency algorithm. For another example, full and abbreviated versions of a given name may be related to a single representative, such as where each instance of "Tom," "Thomas," "Tomas," or "Tommy" is converted to a single representative variation such as "Tom". In this manner, fewer false negatives may be realized through ensuring that data elements that are formatted or represented differently, but are essentially of the same data type, appear in the same format or variation prior to comparing a subject file against reference subcombinations.

The method 500 may also include generating and combining 503 reference and subject subcombinations into a single list. Generating 503 a list of subcombinations may be performed by one or more of electronic processors 24, 34, 44 of devices 20, 30, 40. Referring to FIG. 2, the list of reference subcombinations may be generated by an Analysis module within the scanning/scrubbing environment 80. Generating reference and subject subcombinations—with each subcombination including one data element and various associated metadata—may include gathering, acquiring, identifying, tagging and/or organizing metadata from one or more resources of system 10 regarding each data element. For instance, the metadata may be gathered from within the reference and subject data tables and/or files and/or from one or more data locations in which the tables and/or files originated. Upon combination of the data elements with their respective metadata into a combined list of subcombinations, each reference and subject subcombination may populate a plurality of columns across a row of the combined subcombinations list. An exemplary combined list is illustrated in FIG. 30.

Each subject and reference subcombination illustrated in FIG. 30 occupies one row across two columns, the two columns being labeled "Key" and "Value," respectively. The Key column for each subcombination includes a data element from one of the subject and reference data tables delineated by a comma from an indicator regarding the subject or reference data table that originated the data element. The Value column for subject subcombinations includes an origin indicator delineated by commas from other metadata regarding the data entry in which the data element of the Key column originated—namely, a unique row ID, column label, and, if a primary column is or has been identified or designated within that table, the data element from the primary column. The Value column for reference subcombinations includes an origin indicator delineated by commas from other metadata regarding the data entry in which the data element of the Key column originated—namely, an individual ID and a column data type indicator for the data element of the Key column.

It is foreseen that various metadata for identifying the origin and characteristics of data elements may be selected for pairing with data elements of reference and/or subject data to form reference and/or subject subcombinations without departing from the spirit of the present inventive concept. It is also foreseen that the origin indicator of the Key and/or Value columns of subject and/or reference subcombinations may be selected or generated to convey a database type—such as by indicating the data source is a client, associate, medical or health database—without departing from the spirit of the present inventive concept.

The method may also include designating one or more columns of a reference and/or subject data table or file as containing "unique," "primary," "individual," "sensitive" and/or "identifying" data elements. For instance, with reference to FIGS. 28 and 29, the Birth Date column may be designated "sensitive" and the Client ID column may be designated "identifying." This designation may either be carried by reference and/or subject subcombinations throughout sorting in the form of metadata items appended to the subcombinations, and/or the designation may later be referenced when needed using the data table/file location metadata already embedded with each subcombination, without departing from the spirit of the present inventive concept.

It should also be noted here that making such designations will be within the capabilities of one having ordinary skill following review of this specification, it being understood that the threshold between data designations may vary depending on project parameters, tolerance for false negatives and/or false positives, subject file(s) at issue, and other factors. Moreover, column designation may occur at any stage of the method 500, including prior to formation of the reference table and/or following identification and generation of match records, without departing from the spirit of the present inventive concept.

It should also be noted here that the method 500 may include de-selecting one or more columns containing non-personal and/or unspecific information for exclusion from the subcombination generation process outlined above and/or reporting process outlined below, without departing from the spirit of the present inventive concept. For example, the Gender column may be considered in some embodiments (not illustrated herein) to be too unspecific to be considered for inclusion in certain scanning and/or scrubbing inquiries.

Moreover, the designation of column(s) (and/or de-selection of non-personal information column(s)) may occur at a user interface of third device 40 and/or may be automated via execution of executable code by processor 44. Automated column designation 102 and/or selection may involve keyword recognition—for example, within column labels of the reference table—to identify data types pre-determined as likely to be unique, such as "account number" and/or "social security number," and/or that are likely to be non-personal, such as "policy type" (not shown). Moreover, a machine-learning algorithm may be employed to improve such keyword recognition by calculating rates of false positives and/or false negatives realized through use of various keyword matching strategies, patterns and/or keywords.

The method 500 may also include sorting 504 the combined list of subcombinations to determine matches. More particularly, the combined list may be sorted to place like subcombinations—i.e., those having sufficiently similar first-listed data elements in the Key column—together in groups. Each group may be subsorted to place subject subcombinations at the head of each group. Groups not having a subject subcombination at the head may be disregarded or culled for purposes of generating match records at this stage. An exemplary sorted and culled combined list is illustrated in FIG. 31.

Sorting 504 the combined list may proceed by again subsorting the remaining subcombinations, this time with reference subcombinations at the head of each group. Groups not having a reference subcombination at the head may be disregarded or culled for purposes of generating match records at this stage. An exemplary subsorted and culled combined list is illustrated in FIG. 32.

It is noteworthy that the aforementioned sorting and culling steps rely on organization into groups having a common data element. However, a data element—such as a date—may appear in multiple columns of a structured data file. False positives may therefore be generated where, for instance, a date is matched despite its being a birth date in the reference data table and a date of insurance policy start coverage in the subject data table. It is foreseen that, where a subject file comprises a structured data table, subcombinations may initially be segregated so that each reference data element originating in a column of the reference table with a particular column label may only be matched against subject data elements originating in a column in the subject file having the same or similar column label. Essentially, the combined list of subcombinations may initially be ordered into sublists, with each sublist including only those subcombinations having data elements originating in columns having similar column labels. For example, a reference subcombination with data elements respectively originating in "Account No." and "Last Name" columns may be placed in the same sublist as a subject subcombination with data elements respectively originating in "Account #" and "Name" columns. In such embodiments, even if a subject subcombination includes the same data elements as a reference combination, the two subcombinations may not be matched unless they appear in the same sublist. It is noted here that, with respect to generating sublists prior to match identification, any single subcombination may belong in multiple sublists, and may be duplicated accordingly for sublist population.

Particularly where column label or similar metadata is not available for the subject file—for instance where the subject file is not structured—it is foreseen that additional analysis of subject data elements adjacent to matched subject data elements of a subject subcombination may be performed on match records to reduce false positives. For example, the analysis module of scanning/scrubbing environment 80 may be configured to automatically process data entries that led to at least one match record by examining subject data elements that are adjacent to the matched subject data elements. This additional analysis may help to determine if the matched subject data elements are more or less likely to be of the data type identified in the column labels of the reference data table from which the reference data elements of the matched reference subcombination were taken. Moreover, a machine-learning algorithm may be employed to improve such automated analysis, preferably with the assistance of human input regarding the accuracy of the algorithm's initial conclusions regarding how a subject data element should be categorized.

Returning to the ongoing example under method 500, following sorting, culling and matching, the remaining subcombinations may be reconstituted across the Key and Value columns using the data element and related metadata listed in FIG. 32 and/or subject and reference subcombinations of each group may be combined into a single data row. This may be performed to simplify reporting out procedures, for example. An exemplary group-combined list is illustrated in FIG. 33.

In the example illustrated in FIG. 33, subject and reference subcombinations for each matched data element are combined into a single row across Key and Value columns. More particularly, the Key column includes the origin indicator for the reference data table from which the matched data element originated, the subject data table row number, and the individual ID from the reference data table, with each of the foregoing items of metadata being separated by commas. The Value column includes the column data type indicator from the reference data table for the matched data element, the matched data element, the column label from the subject data table for the column containing the matched data element, and the subject data table unique row ID. Moreover, the new Key column illustrated in FIG. 33 has been used to sort the combined data rows and group data elements by location of origin in subject and reference data tables. This may enhance the efficiency and speed of reporting and/or further processing as described below, and may help identify false positives where, for example, a date and a first name are matched in different data entries in a subject data table, raising the question of whether they relate to the same entity and therefore whether the matching truly meets a data threshold as discussed in more detail below.

The method 500 may also include identifying and generating 505 a match record for each subject data entry including data that satisfies a data threshold. The data threshold may include a set of criteria that must be met by matches relating to a data entry for it to be subject to reporting, analysis, scrubbing, and/or additional processing. For instance, a data threshold may be established for each of several different business divisions, depending on the focus of each division, the types of subject files analyzed and/or the purposes for such analyses. Medical information subject files, for example, may be analyzed under a data threshold requiring that at least two sensitive data elements or one sensitive and one identifying data element be matched from a single subject data entry for further reporting and/or processing. For another example, a data entry from a Health information subject file may meet a data threshold merely by containing a single data element matched against a reference data element. Moreover, as mentioned above, the data threshold analysis in one business division may utilize different designations for each data type than those used for analysis in another business division.

Pursuant to the ongoing example for method 500, the aforementioned exemplary Medical information data threshold would only be met by the data in the second row of the subject data file illustrated in FIG. 29 (relating to "Jane"), assuming the matched data elements are properly designated. The lone match for data from the first row of the subject data file (relating to "Tom") would only meet the data threshold for Health information.

The aforementioned embodiments comprise an improved method for quickly and efficiently utilizing computer algorithms for identifying sensitive data with a lower return of false positives.

Returning to FIG. 2, the modules of the scanning/scrubbing environment 80 may perform a number of operations based on the match record(s) resulting from the identification and match record generation step 505. The module(s) of the scanning/scrubbing environment 80 may generate an alert for transmission to one or more other devices and/or to one or more users, for example to the origin or source device. The module(s) may also or alternatively revise the contents of the subject file, for example by obscuring or masking sensitive subject data elements, encrypting all or part of the subject file, removing sensitive subject data elements, or taking similar actions to reduce the risk presented by the presence and/or storage of the sensitive information. The module(s) may also or alternatively log the match records for future reference. The module(s) may also perform additional analysis on the subject file based on the match records, for example to determine relationships between the data entries and/or subject data elements, to categorize and/or classify the subject data elements, to structure and/or key the subject data elements to one another, or to otherwise build a better understanding of the contents of the subject file. The results of such further analyses may include graphs, models and/or text portrayals of the composition of the subject file. The module(s) may also generate one or more reports including all or portions of match records and/or metadata alone or in connection with the logging processes outlined above. The reports may also include control characters, system, subsystem qualifier table(s), and the like without departing from the spirit of the present inventive concept. The reports may also list the match records by data entry in descending order of total number of reference subcombinations matched, which may provide a better ranking of the relative sensitivity of the data entries.

More specifically with reference to FIG. 1, the third device 40 may generate an alert relating to the match records and transmit the alert to the first device 20 (the source of the subject file) and/or to the second device 30 (the destination of the subject file). Log records and/or reports may optionally also be transmitted to the first device 20 and/or second device 30. The third device 40 may also transmit a revised or unrevised subject file to the second device 30, and may transmit the revised subject file to the first device 20. Additional analyses and results thereof, including graphs, models and/or text portrayals, may also be transmitted to the first device 20 and/or to the second device 30. All or some of the foregoing data and information may be stored at one or more of memory locations 84, 64, 66, 68, 70, 78.

It should be noted here that the various modules depicted in the first environment, second environment and/or the scanning/scrubbing environment may be encoded across the same or contiguous portions of a computer program and/or may be spread across multiple disparate code segments without departing from the spirit of the present inventive concept, it being understood that their arrangement in FIG. 2 is only one possible configuration among many.

The computer-implemented method may include more, fewer, or alternative actions, including those discussed elsewhere herein.

VI. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor implemented. For example, at least some of the operations of a method may be performed by one or more processors or processor-implemented hardware modules. The performance of certain operations may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some exemplary embodiments, the one or more processors or processor implemented modules may be located in a single geographic location (e.g., within a home environment, an office environment, or a server farm). In other exemplary embodiments, the one or more processors or processor-implemented modules may be distributed across a number of geographic locations.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The terms "insurance policy" or "policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other systemal entity) that provides insurance products, e.g., by offering and issuing insurance policies. Typically, but not necessarily, an insurance provider may be an insurance company.

Although the embodiments discussed herein relate to property insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; pert insurance, personal article insurance; personal liability insurance; personal umbrella insurance; community system insurance (e.g., for associations, religious systems, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" may be used interchangeably herein to refer to a person, party, or entity (e.g., a business or other systemal entity) that is covered by the insurance policy, e.g., whose insured article or entity (e.g., property, life, health, auto, home, business) is covered by the policy.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

Unless specifically stated otherwise, discussions herein using words such as "processing," "computing," "calculating," "determining," "presenting," "displaying," or the like may refer to actions or processes of a machine (e.g., a computer) that manipulate or transform data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout this disclosure, sorting operations are described that are intended to place subcombinations of certain types or characteristics at the "head" and/or to make such subcombinations the "first-listed" within particular groups. These terms are used for the sake of convenience, it being understood that such sorting and culling steps may just as effectively be achieved by sorting subcombinations toward another extremity (i.e., in ascending vs. descending order, for example), such as to the "rear" or "last-listed" positions, without departing from the spirit of the present inventive concept.

This detailed description is to be construed as examples and does not describe every possible embodiment, as describing every possible embodiment would be impractical, if not impossible. One could implement numerous alternate embodiments, using either current technology or technology developed after the filing date of this application.

We claim:

1. A computer-implemented method for analyzing a subject file for sensitive information, the method comprising:
   accessing a reference table including a grid of data cells arranged in columns and rows and containing reference data elements, each of the rows relating to one of a plurality of data subjects;
   generating a list of reference subcombinations by—
      designating a primary column for uniquely identifying the data subjects;
      generating a plurality of first preliminary reference subcombinations, each first preliminary reference subcombination including reference data elements gathered from the primary column and a second column of a single row of the reference table;
   conducting a security review to identify a plurality of memory locations that are likely vulnerable to an attack vector;
   building the subject file by joining a plurality of precursor subject files stored at the plurality of memory locations;
   accessing the subject file having a plurality of data entries, each data entry including a plurality of logically-related and delimited subject data elements;
   identifying and generating a match record for each instance in which one of the data entries contains all reference data elements of one of the reference subcombinations, the match record being associated with the sensitive information; and
   revising the subject file based on the match record.

2. The computer-implemented method of claim 1, wherein the identifying step includes comparing each of the reference subcombinations against each of the data entries, in each case by comparing each of the reference data elements of the reference subcombination against each of the subject data elements of the data entry at least until one of the reference data elements fails to match any subject data element of the data entry.

3. The computer-implemented method of claim 1, comprising: generating a list of subject subcombinations by generating a plurality of first preliminary subject subcombinations, each first preliminary subject subcombination including two subject data elements from a single data entry;
   wherein the identifying step includes—
      combining the list of reference subcombinations with the list of subject subcombinations to generate a combined list,
      sorting the combined list to place like subcombinations together in groups,
      identifying groups that include at least one reference subcombination and at least one subject subcombination.

4. The computer-implemented method of claim 3, wherein the first preliminary subject subcombinations include all possible two subject data element combinations of each of the data entries.

5. The computer-implemented method of claim 4, wherein—
   the first preliminary reference subcombinations include all possible permutations of the reference data elements gathered from the primary column and the second column within each single row of the reference table,
   the first preliminary subject subcombinations include all possible two subject data element permutations of each of the data entries,
   the combined list is sorted to place like permutations together in groups.

6. The computer-implemented method of claim 3, comprising assigning a higher order control character to each of the reference subcombinations and a lower order control character to each of the subject subcombinations, wherein the identification step includes—
   subsorting the subcombinations within each group in ascending order of control character and removing groups having a first-listed reference subcombination from consideration for generation of match records,
   subsorting the subcombinations within each group in descending order of control character and removing groups having a first-listed subject subcombination from consideration for generation of match records.

7. The computer-implemented method of claim 1, comprising deleting duplicate first preliminary subject subcombinations to form the list of subject subcombinations.

8. The computer-implemented method of claim 7, wherein first preliminary subject subcombinations are not considered to be duplicate if arising from different data entries.

9. The computer-implemented method of claim 1, comprising—associating metadata with each reference subcombination including a unique row
identifier and column labels for the primary column and the second column;
associating metadata with each data entry including a unique data entry identifier, wherein each match record includes the metadata for each of the matched reference subcombination and data entry.

10. The computer-implemented method of claim 9, wherein the metadata for each data entry includes a column label for each subject data element of the data entry.

11. The computer-implemented method of claim 1, wherein generating the list of reference subcombinations includes—
designating a second primary column for uniquely identifying the data subjects, generating a plurality of second preliminary reference subcombinations, each
second preliminary reference subcombination including reference data elements gathered from the second primary column and another column of a single row of the reference table.

12. The computer-implemented method of claim 11, further comprising ordering the match records by data entry in descending order of total number of reference subcombinations matched.

13. The computer-implemented method of claim 1, wherein generating the list of reference subcombinations includes—
for each reference data element of the first preliminary subcombinations, searching the subject file for a preliminary match,
deleting each of the first preliminary subcombinations that includes a reference data element that does not have a preliminary match in the subject file.

14. The computer-implemented method of claim 1, wherein—the plurality of data subjects includes a plurality of individual customers;
the primary column includes reference data elements for one of: individual social security number, account number, customer id, and address;
the second column includes reference data elements for one of: individual social security number, account number, customer id, address, date of birth, first name, middle initial, and last name.

15. A system for analyzing a subject file for sensitive information, the system comprising: an electronic memory configured to store—
the subject file having a plurality of data entries, each data entry including a plurality of logically-related and delimited subject data elements;
a reference table including a grid of data cells arranged in columns and rows and containing reference data elements, each of the rows relating to one of a plurality of data subjects;
an electronic processor in communication with the electronic memory, the electronic processor configured to—
generate a list of reference subcombinations by—
designating a primary column of the reference table for uniquely identifying the data subjects;
generating a plurality of first preliminary reference subcombinations, each first preliminary reference subcombination including reference data elements gathered from the primary column and a second column of a single row of the reference table;
build the subject file by joining a plurality of precursor subject files stored at a plurality of memory locations, the plurality of memory locations being identified to be likely vulnerable to an attack vector based upon a security review;
identify and generate a match record for each instance in which one of the data entries contains all reference data elements of one of the reference subcombinations, the match record being associated with the sensitive information; and
revise the subject file based on the match record.

16. The system of claim 15, wherein the electronic processor is configured to—
generate a list of subject subcombinations by generating a plurality of first preliminary subject subcombinations, each first preliminary subject subcombination including two subject data elements from a single data entry, wherein the identifying step includes—
combining the list of reference subcombinations with the list of subject subcombinations to generate a combined list,
sorting the combined list to place like subcombinations together in groups,
identifying groups that include at least one reference subcombination and at least one subject subcombination.

17. The system of claim 16, wherein—
the electronic processor is configured to assign a higher order control character to each of the reference subcombinations and a lower order control character to each of the subject subcombinations,
the identifying step includes—
subsorting the subcombinations within each group in ascending order of control character and removing groups having a first-listed reference subcombination from consideration for generation of match records,
subsorting the subcombinations within each group in descending order of control character and removing groups having a first-listed subject subcombination from consideration for generation of match records.

18. The system of claim 15, wherein generating the list of reference subcombinations includes—
designating a second primary column for uniquely identifying the data subjects, generating a plurality of second preliminary reference subcombinations, each
second preliminary reference subcombination including reference data elements gathered from the second primary column and another column of a single row of the reference table.

19. The system of claim 15, wherein the electronic processor is configured to build the subject file by joining a plurality of precursor subject files stored at a plurality of subject data locations identified in a security review as likely vulnerable to an attack vector.

20. A non-transitory computer readable storage medium with a computer program stored thereon for analyzing a subject file for sensitive information, wherein the computer program is configured to instruct an electronic processor to perform the following:
access a reference table including a grid of data cells arranged in columns and rows and containing reference data elements, each of the rows relating to one of a plurality of data subjects;
generate a list of reference subcombinations by—
designating a primary column for uniquely identifying the data subjects;

generating a plurality of first preliminary reference subcombinations, each first preliminary reference subcombination including reference data elements gathered from the primary column and a second column of a single row of the reference table;

build the subject file by joining a plurality of precursor subject files stored at a plurality of memory locations, the plurality of memory locations being identified to be likely vulnerable to an attack vector based upon a security review;

access the subject file having a plurality of data entries, each data entry including a plurality of logically-related and delimited subject data elements;

identify and generate a match record for each instance in which one of the data entries contains all reference data elements of one of the reference subcombinations, the match record being associated with the sensitive information; and revise the subject file based on the match record.

* * * * *